US011019545B2

(12) United States Patent
Beck

(10) Patent No.: US 11,019,545 B2
(45) Date of Patent: May 25, 2021

(54) HANDOVER METHODS AND APPARATUS

(71) Applicant: Charter Communications Operating, LLC, St. Louis, MO (US)

(72) Inventor: Jody Beck, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/020,959

(22) Filed: Jun. 27, 2018

(65) Prior Publication Data

US 2020/0008120 A1   Jan. 2, 2020

(51) Int. Cl.
| | |
|---|---|
| *H04W 36/18* | (2009.01) |
| *H04W 36/08* | (2009.01) |
| *H04W 36/14* | (2009.01) |
| *H04W 36/30* | (2009.01) |
| *H04W 76/11* | (2018.01) |
| *H04W 76/15* | (2018.01) |
| *H04W 36/00* | (2009.01) |
| *H04W 36/36* | (2009.01) |

(52) U.S. Cl.
CPC ....... *H04W 36/18* (2013.01); *H04W 36/0022* (2013.01); *H04W 36/08* (2013.01); *H04W 36/14* (2013.01); *H04W 36/30* (2013.01); *H04W 76/11* (2018.02); *H04W 76/15* (2018.02); *H04W 36/36* (2013.01)

(58) Field of Classification Search
USPC ....................................................... 370/331
See application file for complete search history.

(56) References Cited

U.S. PATENT DOCUMENTS

| | | | |
|---|---|---|---|
| 8,275,377 B2 | 9/2012 | Nandia et al. | |
| 9,397,947 B2 | 7/2016 | Dunne et al. | |
| 9,397,948 B2 | 7/2016 | Assem Aly Salama et al. | |
| 10,091,281 B1 | 10/2018 | Lockhart et al. | |
| 10,178,569 B1 * | 1/2019 | Colwell | H04W 24/08 |

(Continued)

OTHER PUBLICATIONS

R. Hamilton, J. Iyengar, I. Swett & A. Wilk, QUIC: A UDP-Based Secure and Reliable Transport for HTTP/2 draft-tsvwg-quic-protocol-02, Dated Jan. 13, 2016, pp. 1-37, IETF Network Working Group Internet—Draft.

*Primary Examiner* — Alpus Hsu
*Assistant Examiner* — Hooman Houshmand
(74) *Attorney, Agent, or Firm* — Straub & Straub; Michael P. Straub; Stephen T. Straub

(57) ABSTRACT

A connection between two UEs is identified by a single connection identifier. Different streams are transmitted over different wireless links with potential redundancy between streams. Initially a first WiFi link is used to communicate with the second UE. After the first UE decides it will handoff to a second WiFi AP it establishes a connection with a cellular AP and then communicates a second stream corresponding to the same connection. The first and second streams initially communicate the same content. The first WiFi link is terminated, but the second stream continues to communicate content. The first UE then establishes a second WiFi connection with a second WiFi AP and communicates a third content stream of the first connection to second UE via second WiFi link. The third stream initially communicates information also communicated over second stream. The cellular link is terminated. The second WiFi link is used to communicate content.

16 Claims, 48 Drawing Sheets

(56) References Cited

U.S. PATENT DOCUMENTS

| | | | |
|---|---|---|---|
| 10,298,472 B2 | 5/2019 | Chaiyochlarb et al. | |
| 2007/0291648 A1 | 12/2007 | Pfleging et al. | |
| 2008/0002676 A1 | 1/2008 | Wiley et al. | |
| 2008/0079572 A1 | 4/2008 | Tsaba et al. | |
| 2011/0151864 A1* | 6/2011 | Byun | H04W 36/30 455/426.1 |
| 2013/0308597 A1* | 11/2013 | Murphy | H04L 12/4633 370/331 |
| 2015/0282013 A1* | 10/2015 | Kim | H04W 24/10 370/331 |
| 2015/0295856 A1 | 10/2015 | Karthikeyan et al. | |
| 2015/0350276 A1* | 12/2015 | Karlsson | H04L 65/60 709/231 |
| 2016/0174110 A1* | 6/2016 | Sharma | H04W 36/0022 370/331 |
| 2017/0325242 A1 | 11/2017 | Reijonen et al. | |
| 2018/0331947 A1 | 11/2018 | James et al. | |
| 2019/0014508 A1* | 1/2019 | Eriksson | H04W 36/0022 |
| 2019/0229903 A1* | 7/2019 | Balasubramanian | H04L 9/0631 |
| 2019/0268375 A1* | 8/2019 | Gundavelli | H04L 63/20 |
| 2019/0288935 A1* | 9/2019 | Sen | H04L 47/283 |
| 2019/0312798 A1 | 10/2019 | Chaiyochlarb et al. | |

\* cited by examiner

HANDOVER METHODS AND APPARATUS

FIELD

The present invention relates to communication methods and apparatus, and more particularly, to methods and apparatus for efficient handoffs.

BACKGROUND

With the rapid expansion of small access points, using both licensed and unlicensed spectrum, and new technologies such as 5G cellular, in many instances a mobile wireless device will have the opportunity to connect to alternative wireless networks. A client device may receive multiple IP addresses from different networks and need to communicate through IP address transition.

Some approaches for leveraging multiple networks, allow a device to retain the same IP address while roaming such as with Locator/ID Separation Protocol (LISP). The LISP approach depends on using a 4 tuple identifier (source and destination IP, port). This approach may be relatively slow, may involve a relatively high amount of overhead, and may result in gaps in communications when transitioning between networks.

In an attempt to address some of the problems with existing protocols some protocols have been designed with support of multiplexed communications in mind. QUIC (Quick UDP Internet Connections) is a relatively recent transport layer network protocol which supports a set of multiplexed connections between two end points. QUIC connections are identified by a 64 bit connection ID, randomly generated by the client. In contrast, TCP connections are identified by a 4-tuple of source address, source port, destination address and destination port. This means that in the case of TCP connections if a client changes IP addresses (for example, by moving out of Wi-Fi range and switching over to cellular) or ports (if a NAT box loses and rebinds the port association), any active TCP connections are no longer valid. In contrast, when a QUIC client changes IP addresses, it can continue to use the old connection ID from the new IP address without interrupting any in-flight requests.

In a QUIC system a client is the endpoint initiating a QUIC connection. A QUIC Server is the endpoint accepting incoming QUIC connection. An Endpoint is the client or server end of a connection. A QUIC stream is a bi-directional flow of bytes across a logical channel within a QUIC connection. In a QUIC system a connection is a conversation between two QUIC endpoints with a single encryption context that multiplexes streams within it. A QUIC Connection ID is the identifier for a QUIC connection. As should be appreciated multiple streams may correspond to the same connection and thus use the same connection ID. For a discussion of the QUIC protocol see IETF Network Working Group Internet-Draft dated Jan. 13, 2016 and titled: "QUIC: A UDP-Based Secure and Reliable Transport for HTTP/2".

Which connection ID based protocols like QUIC can facilitate the use of multiple links with different streams potentially going over different links. The protocols fail to address many problems associated with the use of different links including the technical problem of determining the quality of individual links at a given time, which link or links should be used at a given time. Without knowledge of link quality it is difficult to determine how to efficiently use one or more alternative links that may be available for a given connection.

While some protocols support multiple links for a connection, devices are often limited by their physical hardware and/or the availability of access points. WiFi is favored for many communications because it can take advantage of unlicensed spectrum. While WiFi has benefits from a cost and possibly bandwidth perspective due to the use of unlicensed spectrum, WiFi signals are often relatively limited in range as compared to cellular connections. In the case of a moving user equipment device such as a cell phone, the moving UE may leave the range of one WiFi access point and attach to another WiFi access point. Unfortunately, due to a gap in the coverage area between WiFi access points and/or because a UE device with a single WiFi receiver/transmitted chain might not be able to support communication with two different WiFi access points at the same time, communication with one WiFi access point may be terminated before communication with another WiFi access point is achieved. This "break" before attachment to a new WiFi access point can result in a break in communications. For example an ongoing voice call may be interrupted, suffer from dropped packets and/or be terminated as a UE reaches the edge of the coverage area of one WiFi access point and needs to attach to another access point if communication is to continue.

In view of the above, it should be appreciated that there is a need for methods and/or apparatus which would allow a communications session to continue smoothly as a connection with one WiFi access point ends and a connection with a new WiFi access point is established. While not necessary for all embodiments it would be desirable if the method and apparatus would allow communication for a session to be conducted primarily via WiFi to obtain the cost and other advantages of WiFi such as the use of unlicensed spectrum for a large part of a communications session, e.g., voice call or data session.

SUMMARY

A connection between two user equipment devices (UEs) is identified by a single connection identifier. Different streams are transmitted over different wireless links with potential redundancy between the streams. Initially a first WiFi link is used to communicate with the second UE, e.g., as part of a voice call. After the first UE decides it will handoff to a second WiFi access point it establishes a connection with a cellular base station, e.g., a LTE or GSM base station. The first UE then communicates a second stream corresponding to the same connection. The first and second streams initially communicate the same content. After establishment of the cellular communications link, the first WiFi link and thus first stream are terminated. Depending on the amount of time before the second WiFi connection is established there may be a period of time in which the cellular connection is the only connection in use for communicating packets corresponding to the first connection. During this period of time the second packet stream will normally communicate some unique content which is not transmitted over a WiFi link. The first UE then establishes a second WiFi connection with a second WiFi access point and communicates a third content stream of the first connection to the second UE via the second WiFi link. The third content stream initially communicates information also communicated over the second packet stream that is sent over the cellular link. The cellular link is then terminated, and the second WiFi link is used to communicate unique content which is not sent over the cellular or another link.

The handoff method allows a UE device with WiFi and cellular capabilities to establish a handover without loss of packets or communication and with the cellular network being used only briefly during handover. The WiFi links may and often are used for the majority of the voice call or data session which is being supported, e.g., with the cellular link being used for only a small part of the communication, e.g., 10% or less of the total transmitted data in some but not necessarily all embodiments. The connection ID of the connection allows the second UE to maintain communication over the multiple links and multiplex or otherwise combine information communicated in packets of different streams of the connection. In some embodiments, the WiFi packet streams include more redundancy, e.g., duplication of packet content and/or more error correcting coding than the communications over the cellular network. This allows for efficient and cost effective use of the cellular network which can be more reliable than the WiFi links in at least some cases. In some cases the UE includes a single WiFi transmitter and/or received and can not support simultaneous WiFi communications with two different WiFi access points. However the methods and apparatus are not limited solely to a UE device with a single WiFi receiver chain. By briefly using the cellular capabilities of a device in combination with the connection identifier based communications protocol, seamless handoffs between WiFi access points can be supported even where a connection with one WiFi access point needs to be terminated prior to establishing a communications link with a new WiFi access point.

An exemplary method of operating a user equipment device (UE), in accordance with some embodiments, includes: communicating a first packet stream of a first connection with a second UE device via a first WiFi communications link to a first WiFi access point, e.g. WiFi router, over which the first packet stream is communicated, said first packet stream being communicated using a connection identifier based protocol that identifies a connection between the first UE and the second UE to which the first stream belongs by a first connection identifier; establishing as part of a handover of the first connection from the first WiFi access point to a second WiFi access point a cellular communications link with a cellular access point, e.g. LTE base station; communicating a second packet stream of said first connection to the second UE device via the cellular communications link; establishing as part of the handover of the first connection from the first WiFi access point to the second WiFi access point a second WiFi communications link with the second WiFi access point; and communicating packets of a third packet stream of said first connection to the second UE device via the second WiFi communications link.

While various features and methods have been described, all embodiments need not include all features or steps mentioned in the summary. Numerous additional features and embodiments are discussed in the detailed description which follows.

BRIEF DESCRIPTION OF THE FIGURES

FIG. 4 comprises the combination of FIG. 4A, FIG. 4B, FIG. 4C, FIG. 4D, FIG. 4E, FIG. 4F and FIG. 4G.

DETAILED DESCRIPTION

Figure 1:
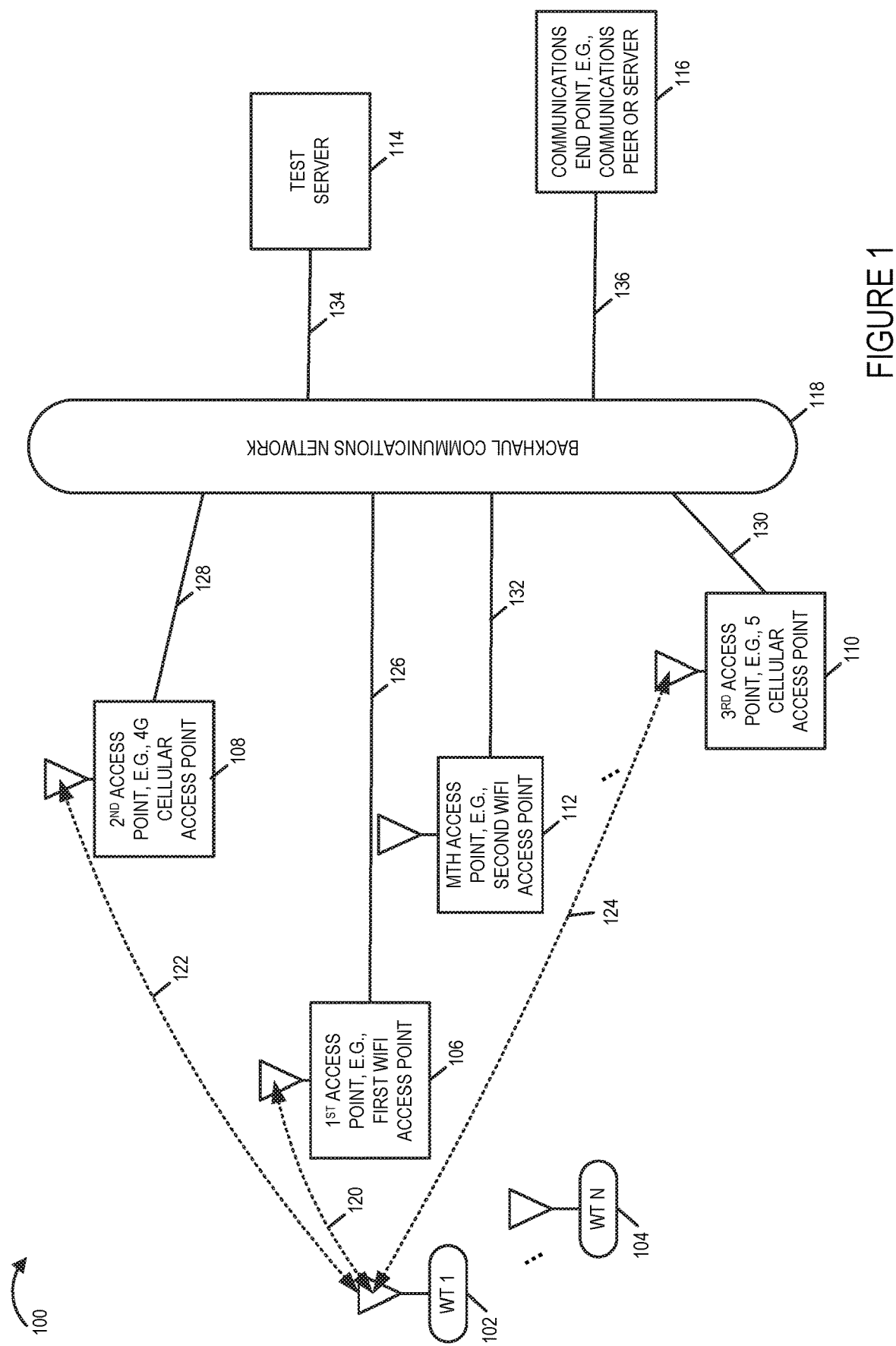
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a plurality of wireless terminals (WT 1 102, . . . , WT N 104), a plurality of wireless access points (first access point 106, e.g. a first WiFi access point, second access point 108, e.g., a 4G cellular access point, third access point 110, e.g., a 5 G cellular access point, . . . , Mth access point 112, e.g., a second WiFi access point.) The wireless terminals (WT 1 102, . . . , WT N 104), e.g., mobile WTs, may move around the communications system and may communicate via one or more of the wireless access points (first access point 106, second access point 108, third access point 110, . . . , Mth access point 112, e.g., a second WiFi access point), e.g., depending upon its current location and wireless channel conditions. A WT, e.g., WT 1 102 may, and sometimes does, have alternative wireless communications channels available from which it may select to use for communications with a communications end point. In FIG. 1, WT 1 102 is shown to have wireless links (120, 122, 124) to access points (106, 108, 110), respectively. Wireless links are sometimes referred to as wireless connections.

Exemplary communications system 100 further includes a test server 114, a communications end point 116, e.g., a communications peer of WT 1 102 or a server which is an end point for a communications session with WT 1 102. Exemplary communications system 100 further includes a backhaul communications network 118, which may include multiple network nodes, e.g., routers, and wired and/or optical network communications links. Each of the access points (106, 108, 110, . . . , 112) is coupled to backhaul network 118 via a network communications link (126, 128, 130, . . . , 132), respectively. Test server 114 is coupled to the backhaul network via communications link 134; and communications end point 116 is coupled to the backhaul communications network via link 136. In some embodiments link 134 and/or link 136 include an access point, e.g., a wired and/or wireless access point.

Figure 2:
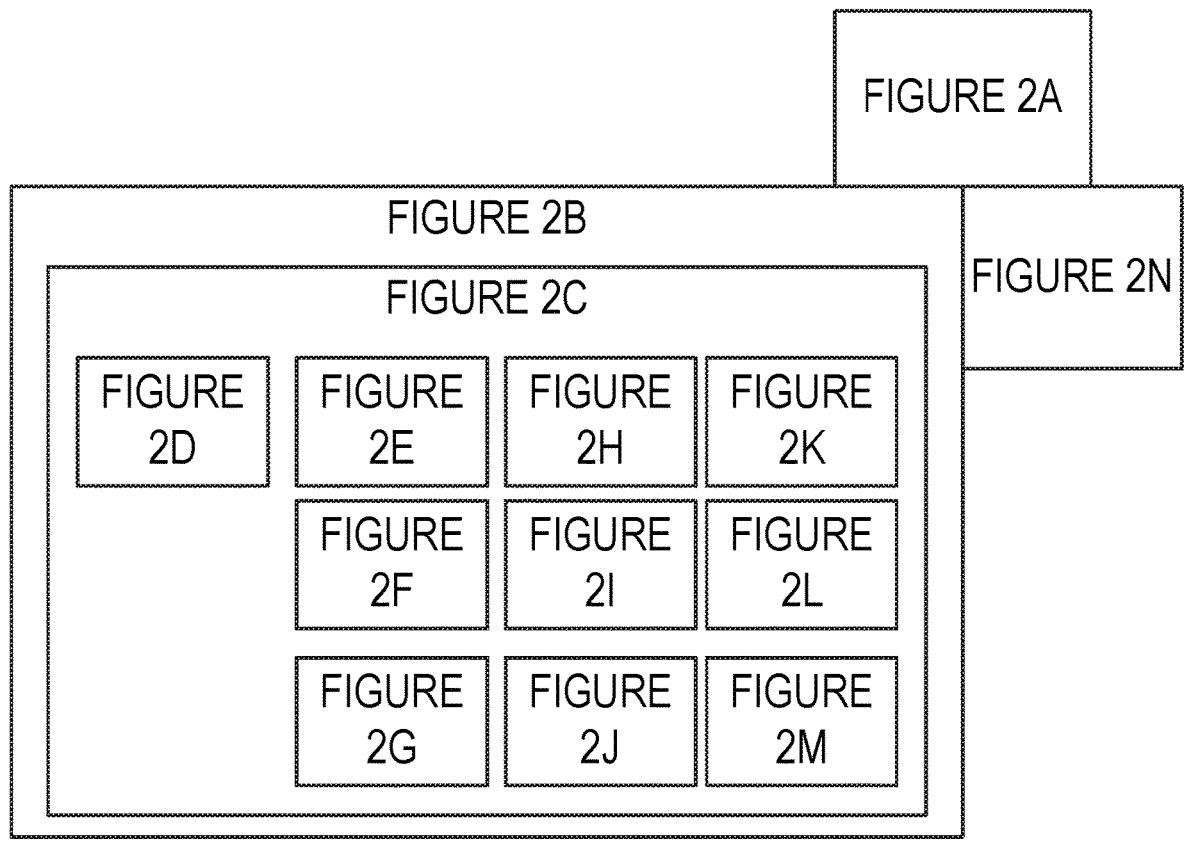
FIG. 2, comprises the combination of FIG. 2A, FIG. 2B, FIG. 2C, FIG. 2D, FIG. 2E, FIG. 2F, FIG. 2G, FIG. 2H, FIG. 2I, FIG. 2J, FIG. 2K, FIG. 2L, FIG. 2M and FIG. 2N.
Figure 2A:
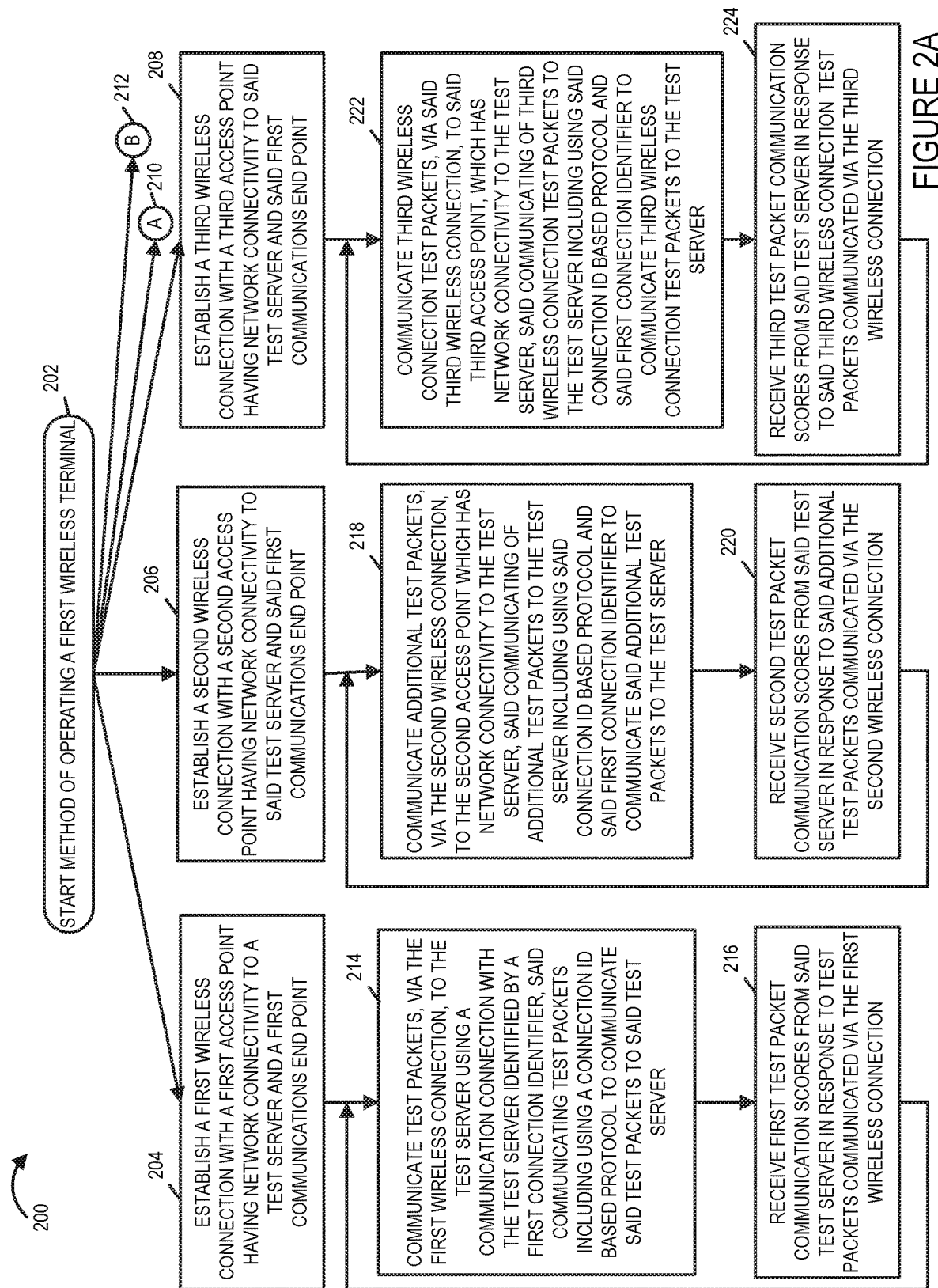
FIG. 2A is a first part of a flowchart of an exemplary method of operating a first wireless terminal in accordance with an exemplary embodiment.
Figure 2B:
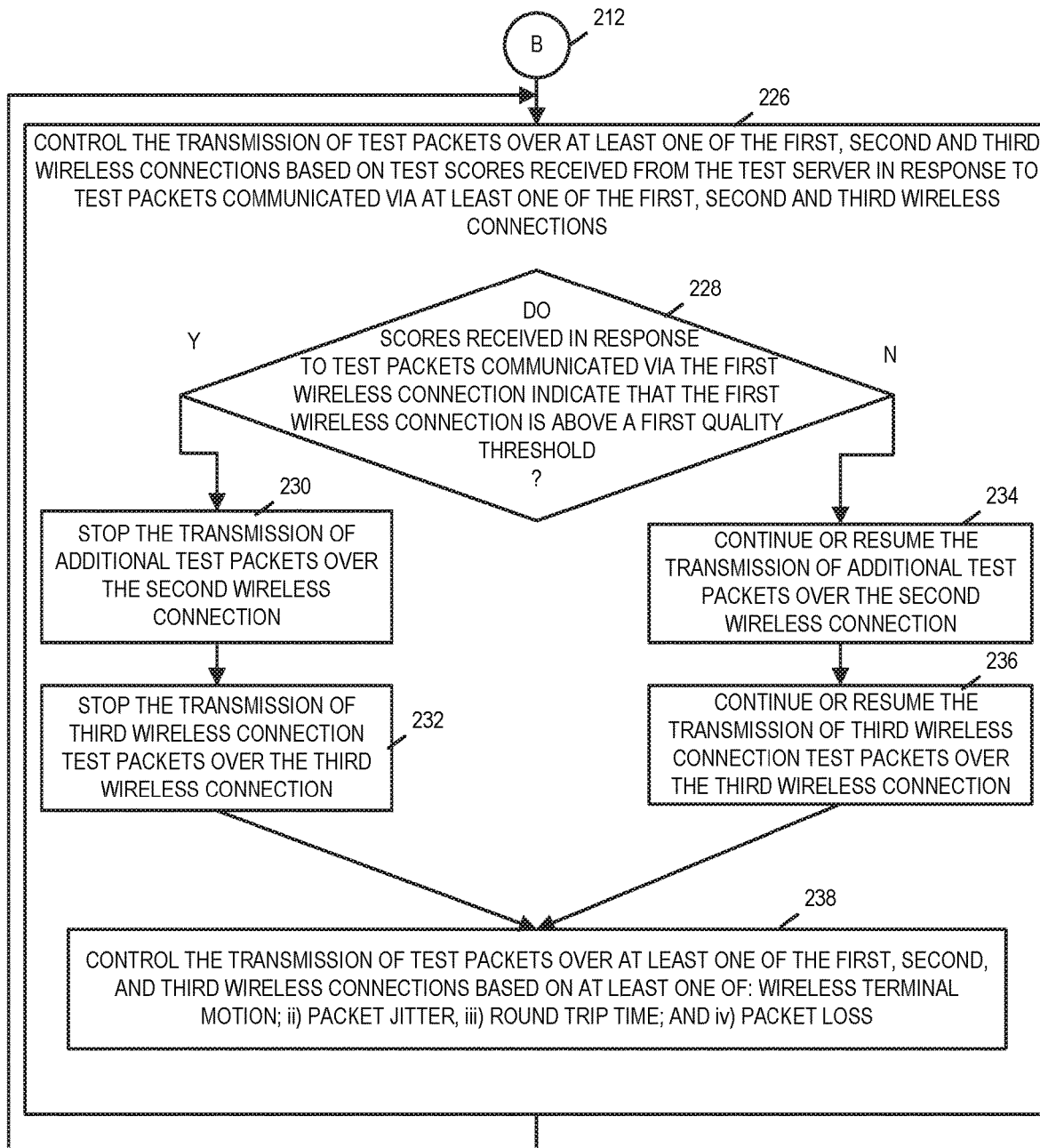
FIG. 2B is a second part of a flowchart of an exemplary method of operating a first wireless terminal in accordance with an exemplary embodiment.
Figure 2C:
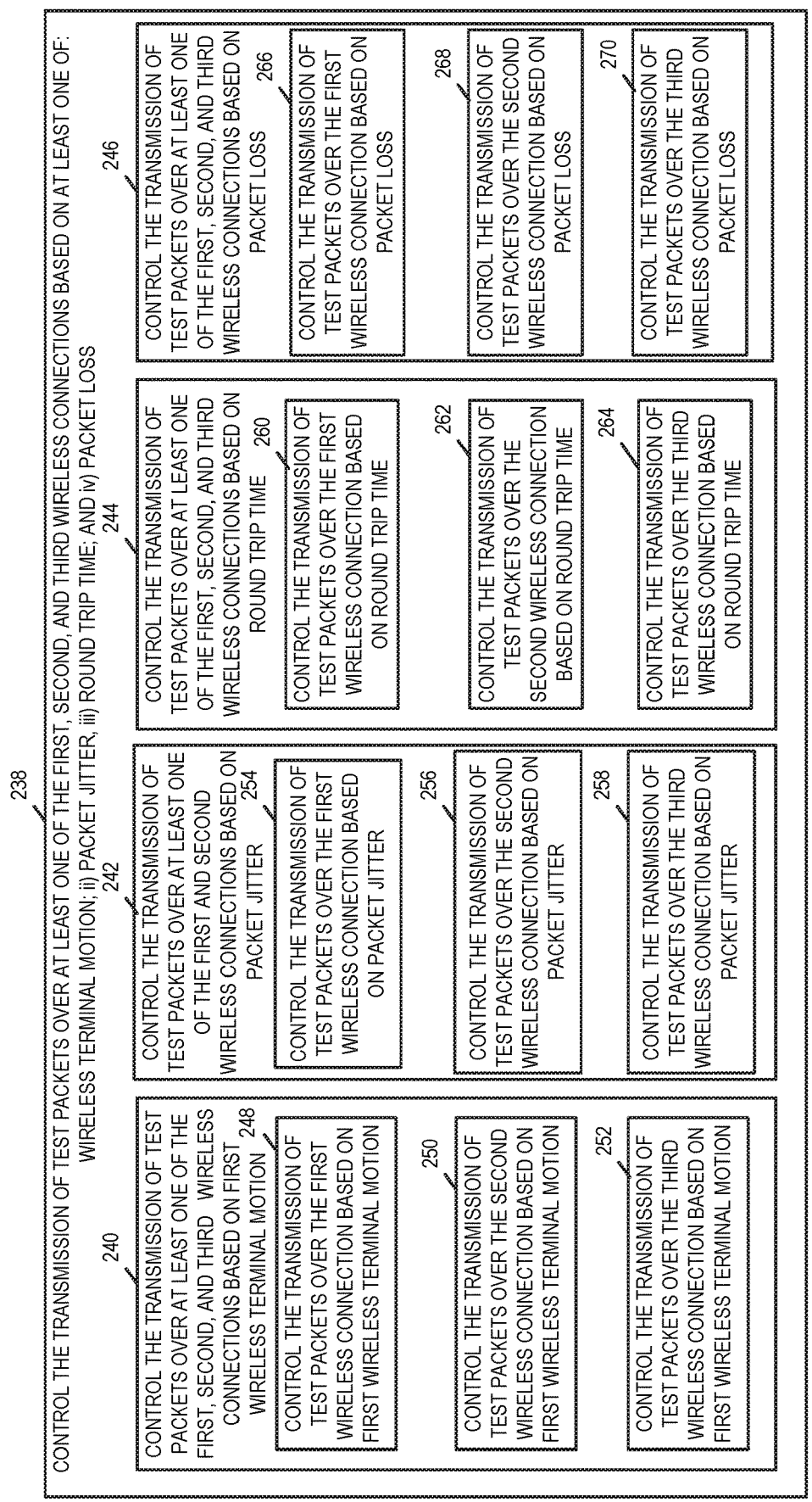
FIG. 2C is a third part of a flowchart of an exemplary method of operating a first wireless terminal in accordance with an exemplary embodiment.
Figure 2D:
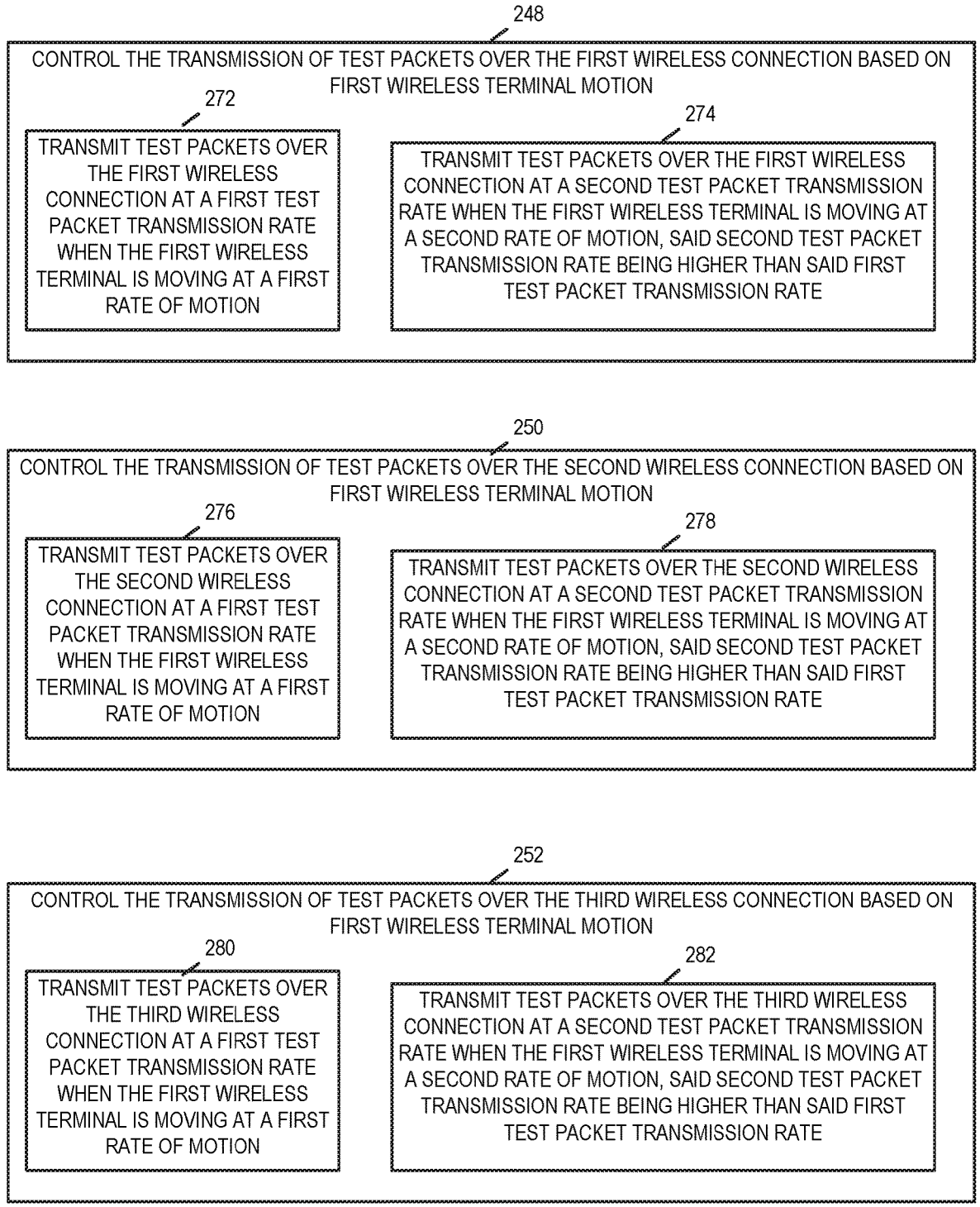
FIG. 2D is a fourth part of a flowchart of an exemplary method of operating a first wireless terminal in accordance with an exemplary embodiment.

FIG. 2, comprising the combination of FIG. 2A, FIG. 2B, FIG. 2C, FIG. 2D, FIG. 2E, FIG. 2F, FIG. 2G, FIG. 2H, FIG. 2I, FIG. 2J, FIG. 2K, FIG. 2L, FIG. 2M and FIG. 2M is a flowchart 200 of an exemplary method of operating a first wireless terminal in accordance with an exemplary embodiment.

Operation starts in step 202 in which the first wireless terminal is powered on and initialized. Operation proceeds from step 202 to step 204, step 206, step 208, step 432 via connecting node A 210, and step and 226, via connecting node B 212.

In step 204 the first wireless device establishes a first wireless connection with a first access point, e.g., a WiFi access point using non-licensed spectrum, having network connectivity to a test server and a first communications end point. In step 206 the first wireless device establishes a second wireless connection with a second access point having network connecting to the test server and said first communications end point. In step 208 the first wireless device establishes a third wireless connection with a third access point having network connecting to the test server and said first communications end point.

Operation proceeds from step 204 to step 214. In step 214 the first wireless terminal communicates test packets, via the first wireless connection, to a test server using a communications connection with the test server identified by a first connection identifier, said communicating test packets including using a connection ID based protocol, e.g. QUIC, to communicate said test packets to said test server. Operation proceeds from step 214 to step 216, in which the first wireless terminal receives first test packet communication scores from said test server in response to test packets communicated via the first wireless connection. Operation proceeds from step 216 to the input of step 214.

Returning to step 206, operation proceeds from step 206 to step 218. In step 218 the first wireless terminal communicates additional test packets, e.g., second wireless connection test packets since they are used to test connectivity via the second wireless link, via the second wireless connection, to a second access point, e.g., a 4G or 5G cellular access point, which has network connectivity to the test server, said communicating additional test packets to the test server including using said connection ID based protocol to communicate said additional test packets to said test server. Operation proceeds from step 218 to step 220, in which the first wireless terminal receives second test packet communication scores from said test server in response to said additional test packets communicated via the second wireless connection. Operation proceeds from step 218 to the input of step 218.

Returning to step 208, operation proceeds from step 208 to step 222. In step 222 the first wireless terminal communicates third wireless connection test packets, via the third wireless connection to a third access point, e.g., a 5G access point when the second access point is a 4G access point, which has network connectivity to the test server, said communicating third wireless connection test packets to the test server including using said connection ID based protocol, e.g., QUIC, and said first connection identifier to communicate said third wireless connection test packets to said test server. Operation proceeds from step 222 to step 224, in which the first wireless terminal receives third test packet communication scores from said test server in response to said third wireless connection test packets communicated via the third wireless connection. Operation proceeds from step 222 to the input of step 224.

Returning to step 226, in step 226, the first wireless terminal controls the transmission of test packets over at least one of the first, second and third wireless connections based on test scores received from the test server in response to test packets communicated via at least one of the first, second, and third wireless connections. Step 226 includes step 228, 230, 232, 234, 236 and 238.

In step 228 the first wireless terminal determines if the scores received in response to test packets communicated via the first wireless connection indicate that the first wireless connection is above a first quality threshold. If the determination of sep 228, is that the scores received in response to test packets communicated via the first wireless connection indicate that the first wireless connection is above a first quality threshold, then operation proceeds from step 228 to step 230; otherwise, operation proceeds from step 228 to step 234.

In step 230, the first wireless terminal stops the transmission of additional test packets over the second wireless connection. Operation proceeds from step 230 to step 232, in which the first wireless terminal stops the transmission of third wireless connection test packets over the third wireless connection. For example, in some embodiments, the second and third wireless links are only tested when the scores corresponding to the first wireless connection indicates that the first wireless connection is below a quality threshold which would correspond to the utilization of the first wireless link without aid of the second or third wireless links to communication data packets to a communications endpoint such as a peer in a communications session with the first wireless terminal that is identified by another connection identifier but which sends packets over the first wireless connection to the first access point.

Returning to step 234, in step 234 the first wireless terminal continues or resumes the transmission of additional test packets over the second wireless connection. Operation proceeds from step 234 to step 236. In step 236 the first wireless terminal continues or resumes the transmission of third wireless connection test packets over the third wireless connection. Operation proceeds from step 232 or step 236 to step 238.

In step 238, the first wireless terminal controls the transmission of test packets over at least one of the first, second and third wireless connections based on at least one of: i) wireless terminal motion, ii) packet jitter, iii) round trip time, and iv) packet loss. Step 238 includes steps 240, 242, 244 and 246. In step 240 the first wireless terminal controls the transmission of test packets over at least one of the first, second and third wireless connections based on first wireless terminal motion. In step 242 the first wireless terminal controls the transmission of test packets over at least one of the first, second and third wireless connections based on packet jitter. In step 244 the first wireless terminal controls the transmission of test packets over at least one of the first, second and third wireless connections based on round trip time. In step 246 the first wireless terminal controls the transmission of test packets over at least one of the first, second and third wireless connections based on packet loss.

Step 240 includes steps 248, 250 and 252. In step 248 the first wireless terminal controls the transmission of test packets over the first wireless connection based on first wireless terminal motion. In step 250 the first wireless terminal controls the transmission of test packets over the second wireless connection based on first wireless terminal motion. In step 252 the first wireless terminal controls the transmission of test packets over the third wireless connection based on first wireless terminal motion.

Step 248 includes steps 272 and 274. In step 272 the first wireless terminal transmits test packets over the first wireless connection at a first test packet transmission rate when the first wireless terminal is moving at a first rate of motion, e.g., a zero rate of motion or a first non-zero rate of motion. Alternatively, in step 274, the first wireless terminal transmits test packets over the first wireless connection at a second test packet transmission rate when the first wireless terminal is moving at a second rate of motion, e.g., a higher speed than the speed of the first rate of motion, said second test packet transmission rate being higher than said first test packet transmission rate.

Step 250 includes steps 276 and 278. In step 276 the first wireless terminal transmits test packets over the second wireless connection at a first test packet transmission rate when the first wireless terminal is moving at a first rate of motion. Alternatively, in step 276, the first wireless terminal transmits test packets over the second wireless connection at a second test packet transmission rate when the first wireless terminal is moving at a second rate of motion, said second test packet transmission rate being higher than said first test packet transmission rate.

Step 252 includes steps 280 and 282. In step 280 the first wireless terminal transmits test packets over the third wireless connection at a first test packet transmission rate when the first wireless terminal is moving at a first rate of motion. Alternatively, in step 282, the first wireless terminal transmits test packets over the third wireless connection at a second test packet transmission rate when the first wireless terminal is moving at a second rate of motion, said second test packet transmission rate being higher than said first test packet transmission rate.

Figure 2E:
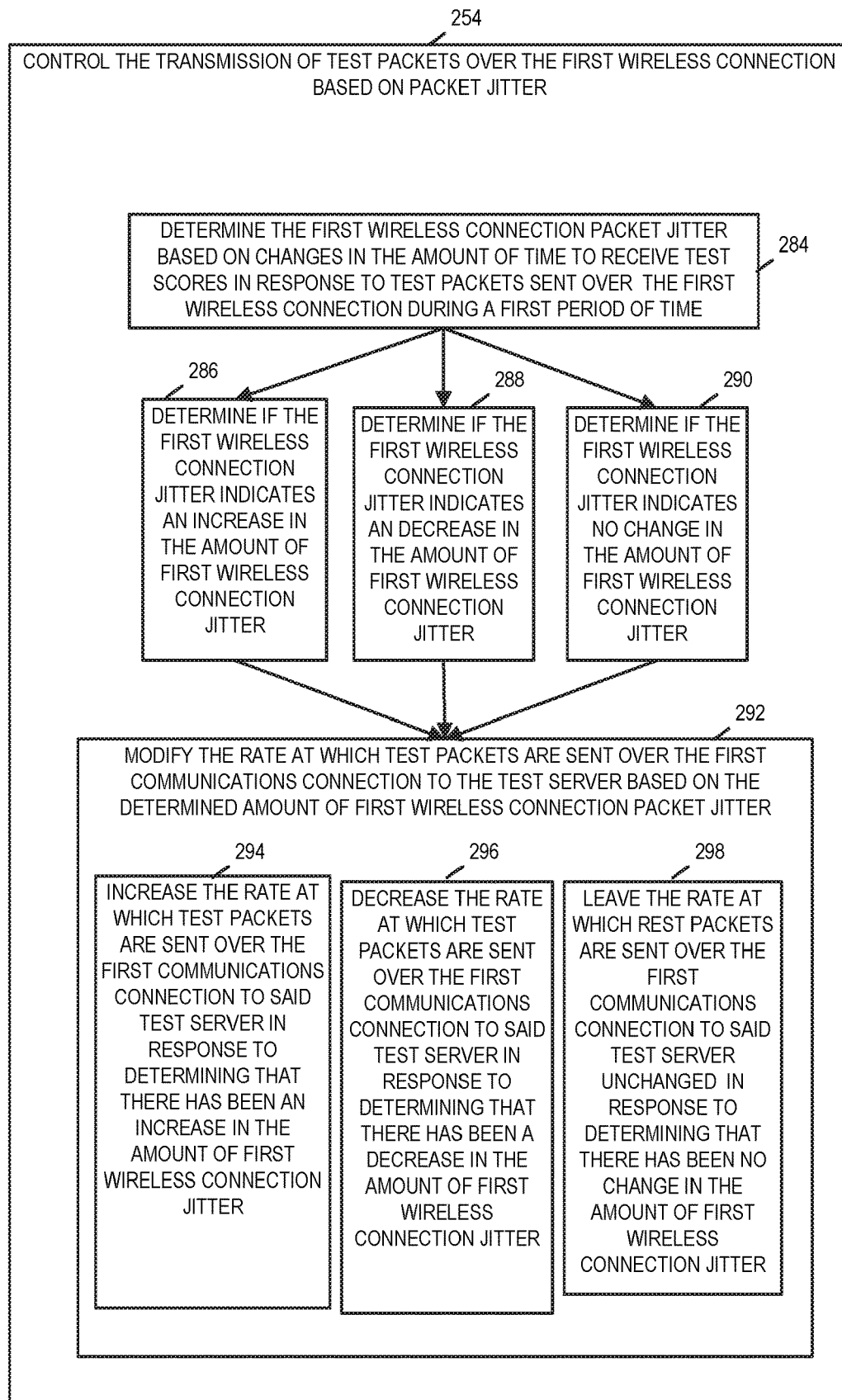
FIG. 2E is a fifth part of a flowchart of an exemplary method of operating a first wireless terminal in accordance with an exemplary embodiment.

Step 242 includes steps 254, 256 and 258. In step 254 the first wireless terminal controls the transmission of test packets over the first wireless connection based on packet jitter. Step 254 includes steps 284, 286, 288, 290 and 292, as shown in FIG. 2E. In step 284 the first wireless terminal determines first wireless connection packet jitter based on changes in the amount of time to receive test scores in response to test packets sent over the first wireless connection during a first period of time. Operation proceeds from step 284 to steps 286, 288 and 290. In step 286 the first wireless terminal determines if the first wireless connection jitter indicates an increase in the amount of first wireless connection jitter. In step 288 the first wireless terminal determines if the first wireless connection jitter indicates a decrease in the amount of first wireless connection jitter. In step 290 the first wireless terminal determine if the first wireless connection jitter indicates no change in the amount of first wireless connection jitter. Operation proceeds from steps 286, 288 and 290 to step 292. In step 292 the first wireless terminal modifies the rate at which test packets are sent over the first communications connection to the test server based on the determined amount of first wireless connection packet jitter. Step 292 includes steps 294, 296 and 298. In step 294 the first wireless terminal increases the rate at which test packets are sent over the first communications connection to the test server in response to determining that there has been an increase in the amount of first wireless connection packet jitter. In step 296 the first wireless terminal decreases the rate at which test packets are sent over the first communications connection to the test server in response to determining that there has been a decrease in the amount of first wireless connection packet jitter. In step 298 the first wireless terminal leaves the rate at which test packets are sent over the first communications connection to the test server unchanged in response to determining that there has been no change in the amount of first wireless connection packet jitter.

Figure 2F:
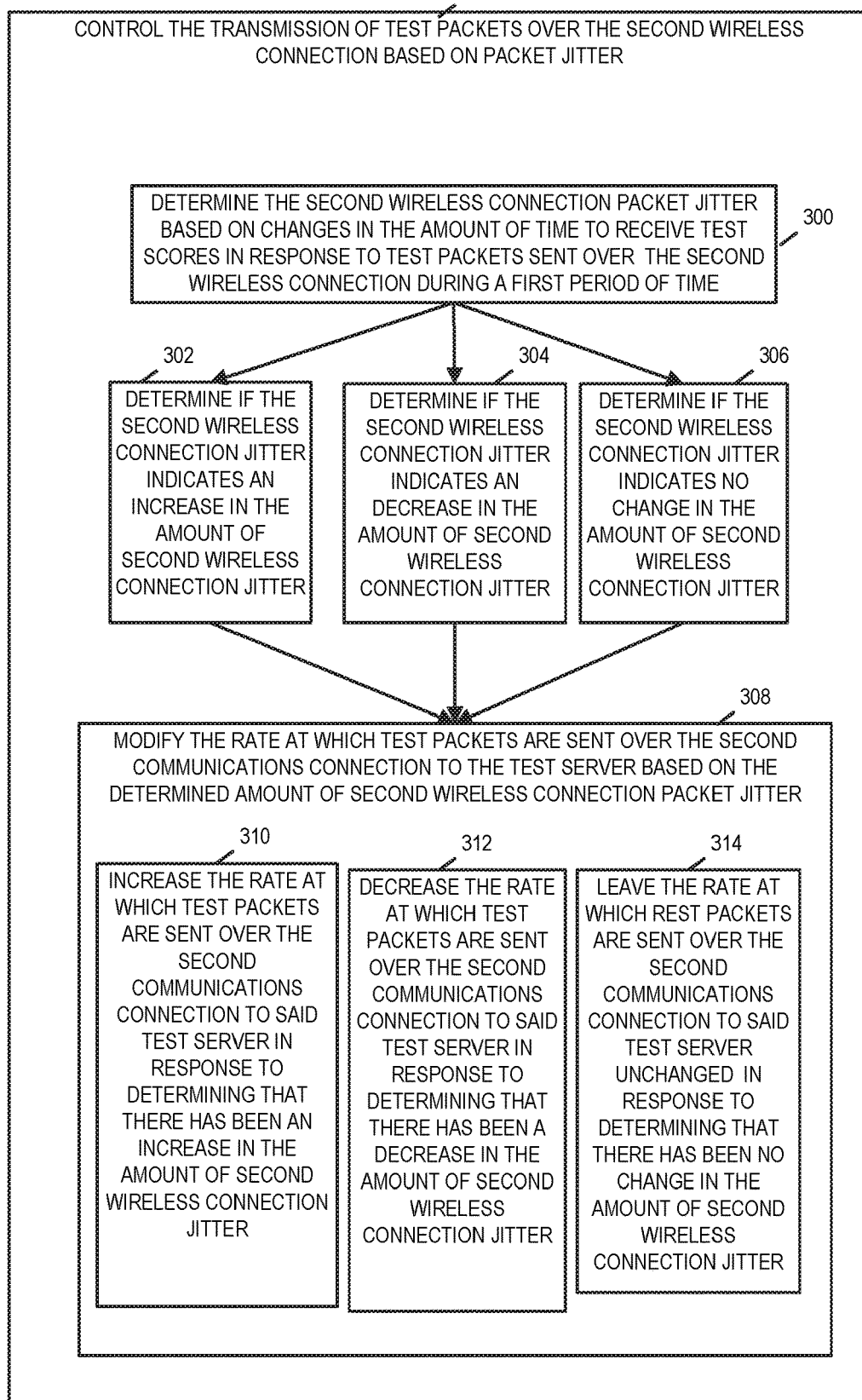
FIG. 2F is a sixth part of a flowchart of an exemplary method of operating a first wireless terminal in accordance with an exemplary embodiment.

In step 256 the first wireless terminal controls the transmission of test packets over the second wireless connection based on packet jitter. Step 256 includes steps 300, 302, 304, 306 and 308, as shown in FIG. 2F. In step 300 the first wireless terminal determines second wireless connection packet jitter based on changes in the amount of time to receive test scores in response to test packets sent over the second wireless connection during a first period of time. Operation proceeds from step 300 to steps 302, 304 and 306. In step 302 the first wireless terminal determine if the second wireless connection jitter indicates an increase in the amount of second wireless connection jitter. In step 304 the first wireless terminal determines if the second wireless connection jitter indicates a decrease in the amount of second wireless connection jitter. In step 306 the first wireless terminal determine if the second wireless connection jitter indicates no change in the amount of second wireless connection jitter. Operation proceeds from steps 302, 304 and 306 to step 308. In step 308 the first wireless terminal modifies the rate at which test packets are sent over the second communications connection to the test server based on the determined amount of second wireless connection packet jitter. Step 308 includes steps 310, 312 and 314. In step 310 the first wireless terminal increases the rate at which test packets are sent over the second communications connection to the test server in response to determining that there has been an increase in the amount of second wireless connection packet jitter. In step 312 the first wireless terminal decreases the rate at which test packets are sent over the second communications connection to the test server in response to determining that there has been a decrease in the amount of second wireless connection packet jitter. In step 314 the first wireless terminal leaves the rate at which test packets are sent over the second communications connection to the test server unchanged in response to determining that there has been no change in the amount of second wireless connection packet jitter.

Figure 2G:
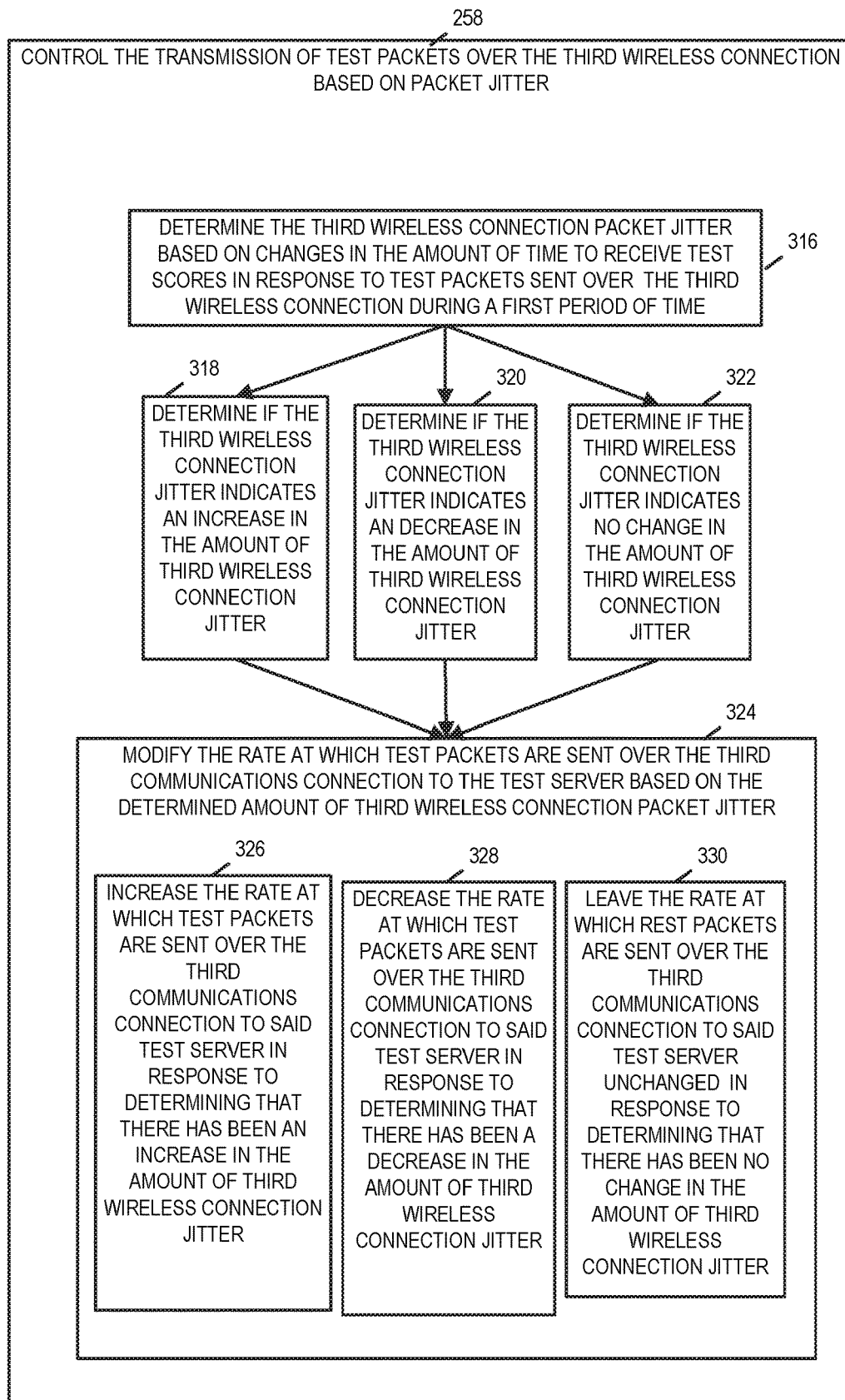
FIG. 2G is a seventh part of a flowchart of an exemplary method of operating a first wireless terminal in accordance with an exemplary embodiment.

In step 258 the first wireless terminal controls the transmission of test packets over the third wireless connection based on packet jitter. Step 258 includes steps 316, 318, 320, 322 and 324, as shown in FIG. 2G. In step 316 the first wireless terminal determines third wireless connection packet jitter based on changes in the amount of time to receive test scores in response to test packets sent over the third wireless connection during a first period of time. Operation proceeds from step 316 to steps 318, 320 and 322. In step 318 the first wireless terminal determine if the third wireless connection jitter indicates an increase in the amount of third wireless connection jitter. In step 320 the first wireless terminal determine if the third wireless connection jitter indicates a decrease in the amount of third wireless connection jitter. In step 322 the first wireless terminal determine if the third wireless connection jitter indicates no change in the amount of second wireless connection jitter. Operation proceeds from steps 318, 320 and 322 to step 324. In step 324 the first wireless terminal modifies the rate at which test packets are sent over the third communications connection to the test server based on the determined amount of third wireless connection packet jitter. Step 324 includes steps 326, 328 and 330. In step 326 the first wireless terminal increases the rate at which test packets are sent over the third communications connection to the test server in response to determining that there has been an increase in the amount of third wireless connection packet jitter. In step 328 the first wireless terminal decreases the rate at which test packets are sent over the third communications connection to the test server in response to determining that there has been a decrease in the amount of third wireless connection packet jitter. In step 330 the first wireless terminal leaves the rate at which test packets are sent over the third communications connection to the test server unchanged in response to determining that there has been no change in the amount of third wireless connection packet jitter.

Figure 2H:
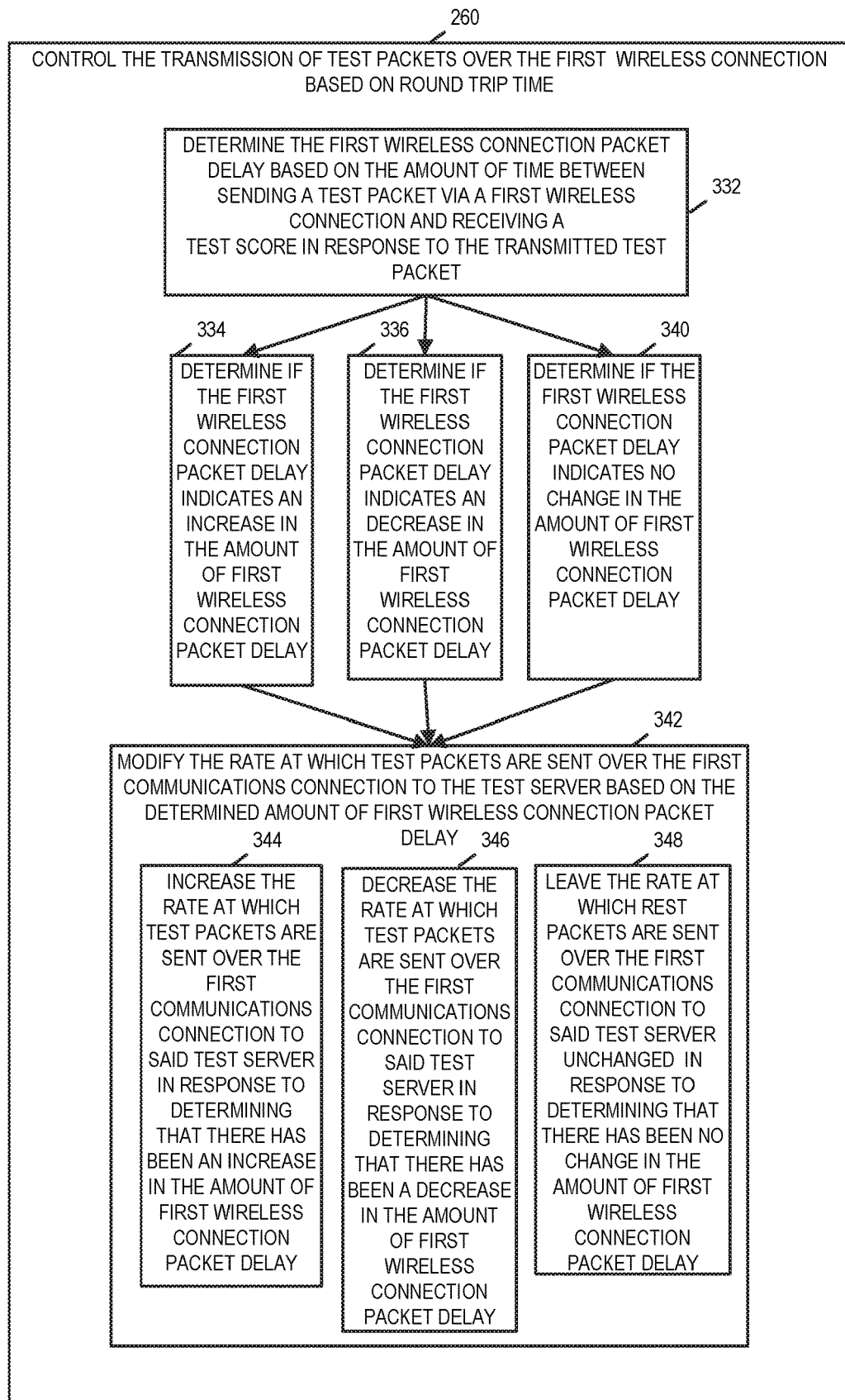
FIG. 2H is an eight part of a flowchart of an exemplary method of operating a first wireless terminal in accordance with an exemplary embodiment.

Step 244 includes steps 260, 262 and 264. In step 260 the first wireless terminal controls the transmission of test packets over the first wireless connection based on round trip time. Step 260 includes steps 332, 334, 336, 340 and 342, as shown in FIG. 2H. In step 332 the first wireless terminal determines first wireless connection packet delay based on changes in the amount of time to between sending a test packet via the first wireless connection and receiving a test score in response to the transmitted test packet. Operation proceeds from step 332 to steps 334, 336 and 340. In step 334 the first wireless terminal determines if the first wireless connection packet delay indicates an increase in the amount of first wireless connection packet delay. In step 336 the first wireless terminal determines if the first wireless connection packet delay indicates a decrease in the amount of first wireless connection packet delay. In step 340 the first wireless terminal determines if the first wireless connection packet delay indicates no change in the amount of first wireless connection packet delay. Operation proceeds from steps 334, 336 and 340 to step 342. In step 342 the first wireless terminal modifies the rate at which test packets are sent over the first communications connection to the test server based on the determined amount of first wireless connection packet delay. Step 342 includes steps 344, 346 and 348. In step 344 the first wireless terminal increases the rate at which test packets are sent over the first communications connection to the test server in response to determining that there has been an increase in the amount of first wireless connection packet delay. In step 346 the first wireless terminal decreases the rate at which test packets are sent over the first communications connection to the test server in response to determining that there has been a decrease in the amount of first wireless connection packet delay. In step 348 the first wireless terminal leaves the rate at which test packets are sent over the first communications connection to the test server unchanged in response to determining that there has been no change in the amount of first wireless connection packet delay.

Figure 2I:
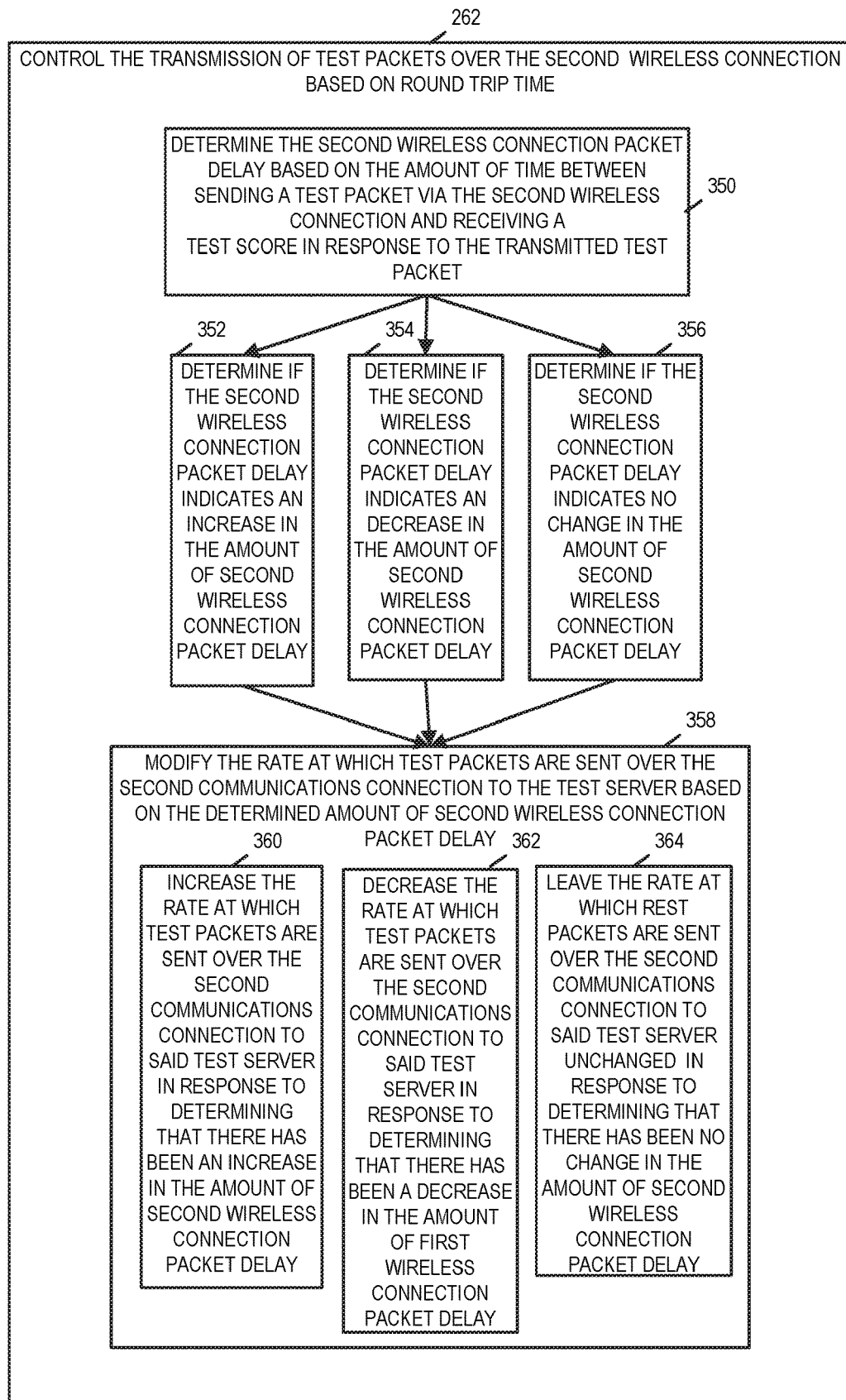
FIG. 2I is a ninth part of a flowchart of an exemplary method of operating a first wireless terminal in accordance with an exemplary embodiment.

In step 262 the first wireless terminal controls the transmission of test packets over the second wireless connection based on round trip time. Step 262 includes steps 350, 352, 354, 356 and 358, as shown in FIG. 2I. In step 350 the first wireless terminal determines second wireless connection packet delay based on changes in the amount of time to between sending a test packet via the second wireless connection and receiving a test score in response to the transmitted test packet. Operation proceeds from step 350 to steps 352, 354 and 356. In step 352 the first wireless terminal determines if the second wireless connection packet delay indicates an increase in the amount of second wireless connection packet delay. In step 354 the first wireless terminal determines if the second wireless connection packet delay indicates a decrease in the amount of second wireless connection packet delay. In step 356 the first wireless terminal determines if the second wireless connection packet delay indicates no change in the amount of second wireless connection packet delay. Operation proceeds from steps 352, 354 and 356 to step 358. In step 358 the first wireless terminal modifies the rate at which test packets are sent over the second communications connection to the test server based on the determined amount of second wireless connection packet delay. Step 358 includes steps 360, 362 and 364. In step 360 the first wireless terminal increases the rate at which test packets are sent over the second communications connection to the test server in response to determining that there has been an increase in the amount of second wireless connection packet delay. In step 362 the first wireless terminal decreases the rate at which test packets are sent over the second communications connection to the test server in response to determining that there has been a decrease in the amount of second wireless connection packet delay. In step 364 the first wireless terminal leaves the rate at which test packets are sent over the second communications connection to the test server unchanged in response to determining that there has been no change in the amount of second wireless connection packet delay.

Figure 2J:
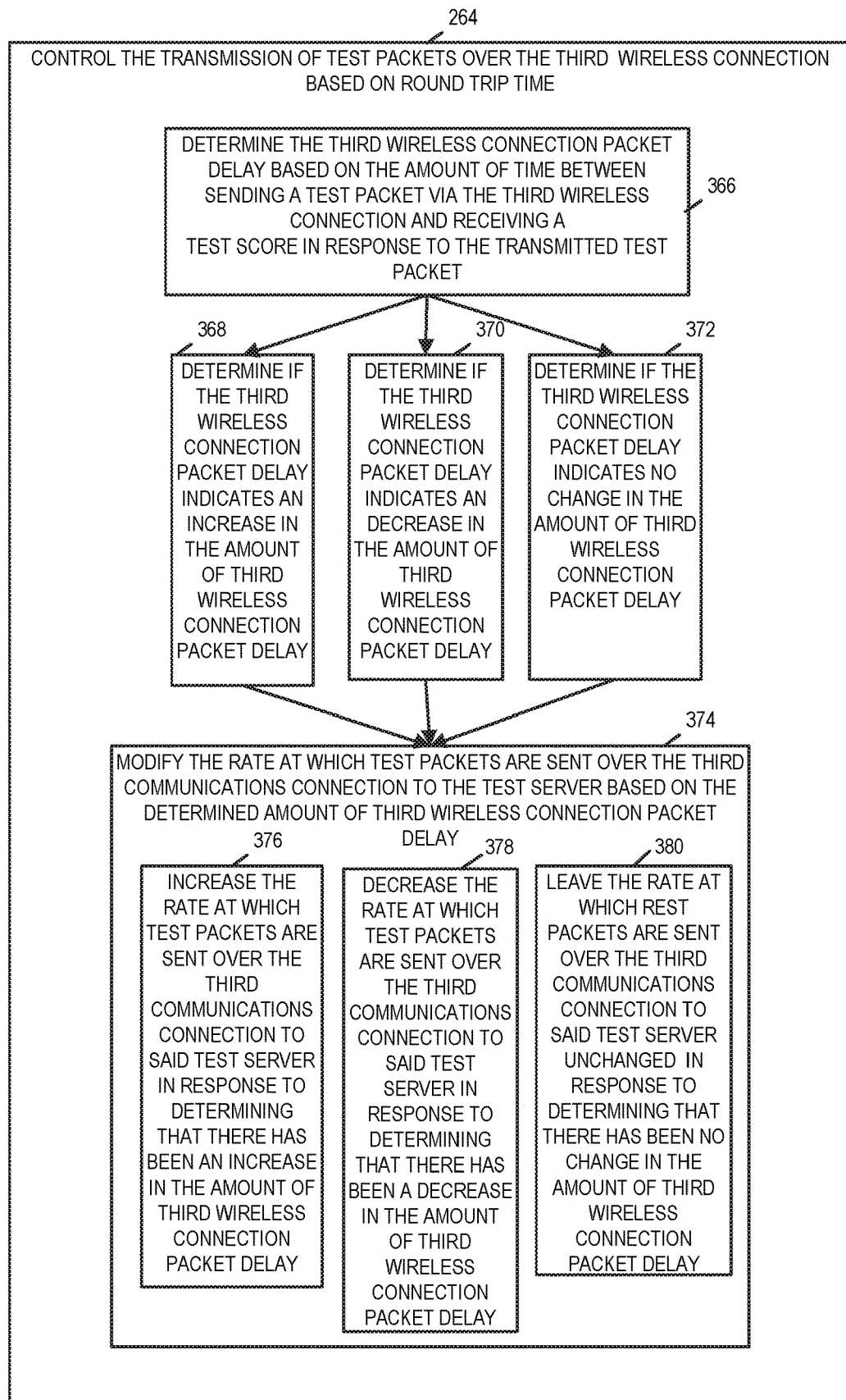
FIG. 2J is a tenth part of a flowchart of an exemplary method of operating a first wireless terminal in accordance with an exemplary embodiment.

In step 264 the first wireless terminal controls the transmission of test packets over the third wireless connection based on round trip time. Step 264 includes steps 366, 368, 370, 372 and 374, as shown in FIG. 2J. In step 366 the first wireless terminal determines third wireless connection packet delay based on changes in the amount of time to between sending a test packet via the third wireless connection and receiving a test score in response to the transmitted test packet. Operation proceeds from step 366 to steps 368, 370 and 372. In step 368 the first wireless terminal determines if the third wireless connection packet delay indicates an increase in the amount of third wireless connection packet delay. In step 370 the first wireless terminal determines if the third wireless connection packet delay indicates a decrease in the amount of third wireless connection packet delay. In step 372 the first wireless terminal determines if the third wireless connection packet delay indicates no change in the amount of third wireless connection packet delay. Operation proceeds from steps 368, 370 and 372 to step 374. In step 374 the first wireless terminal modifies the rate at which test packets are sent over the third communications connection to the test server based on the determined amount of third wireless connection packet delay. Step 374 includes steps 376, 378 and 380. In step 376 the first wireless terminal increases the rate at which test packets are sent over the third communications connection to the test server in response to determining that there has been an increase in the amount of third wireless connection packet delay. In step 378 the first wireless terminal decreases the rate at which test packets are sent over the third communications connection to the test server in response to determining that there has been a decrease in the amount of third wireless connection packet delay. In step 380 the first wireless terminal leaves the rate at which test packets are sent over the third communications connection to the test server unchanged in response to determining that there has been no change in the amount of third wireless connection packet delay.

Figure 2K:
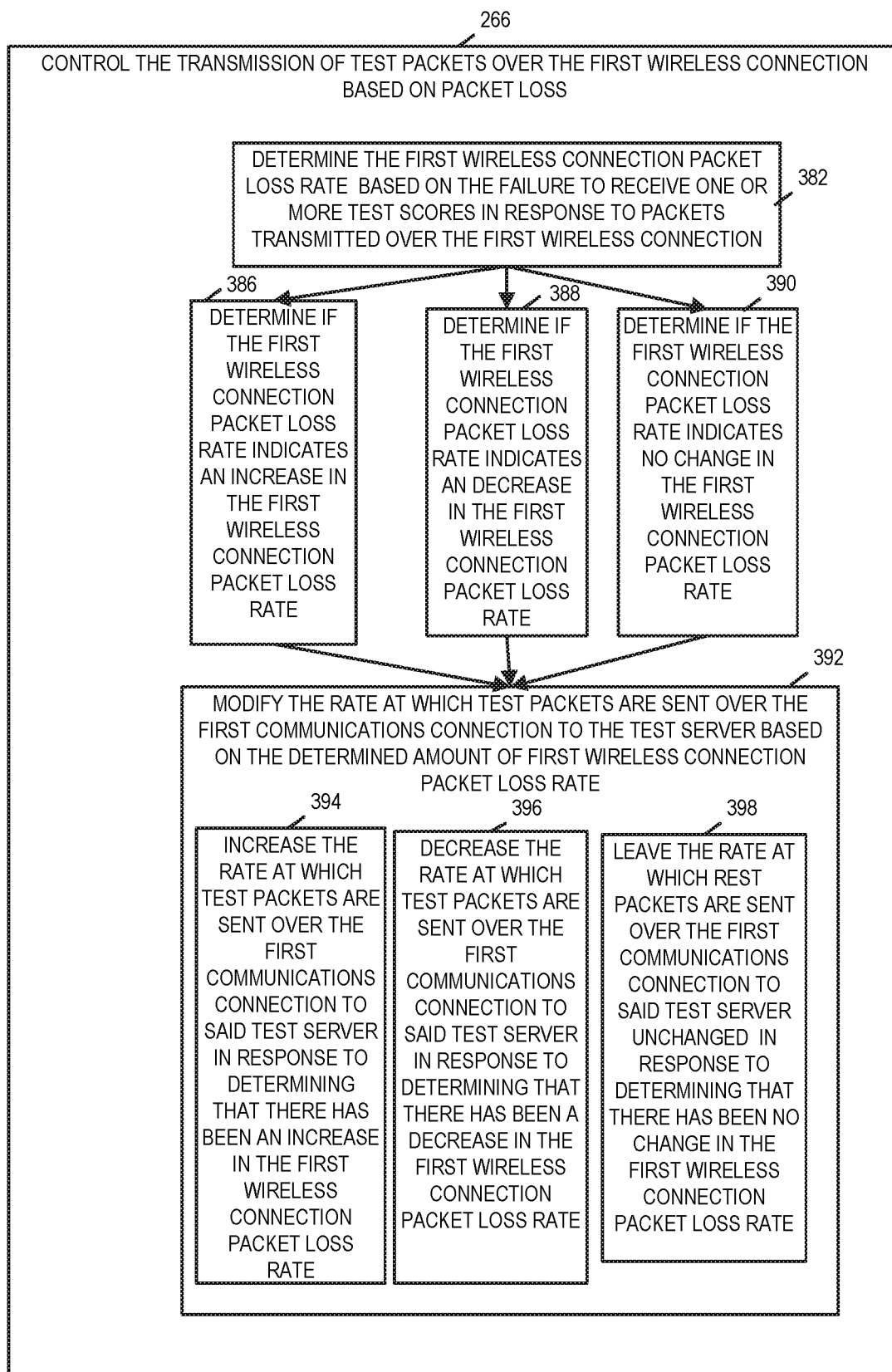
FIG. 2K is an eleventh part of a flowchart of an exemplary method of operating a first wireless terminal in accordance with an exemplary embodiment.

Step 246 includes steps 266, 268 and 270. In step 266 the first wireless terminal controls the transmission of test packets over the first wireless connection based on packet loss. Step 266 includes steps 382, 386, 388, 390 and 392, as shown in FIG. 2K. In step 382 the first wireless terminal determines first wireless connection packet loss rate based on the failure to receive one or more test scores in response to packets transmitted over the first wireless connection. Operation proceeds from step 382 to steps 386, 388 and 390. In step 386 the first wireless terminal determines if the first wireless connection packet loss rate indicates an increase in the first wireless connection packet loss rate. In step 388 the first wireless terminal determines if the first wireless connection packet loss rate indicates a decrease in the first wireless connection packet loss rate. In step 390 the first wireless terminal determines if the first wireless connection packet loss rate indicates no change in the first wireless connection packet loss rate. Operation proceeds from steps 386, 388 and 390 to step 392. In step 392 the first wireless terminal modifies the rate at which test packets are sent over the first communications connection to the test server based on the determined amount of first wireless connection packet loss rate. Step 392 includes steps 394, 396 and 398. In step 394 the first wireless terminal increases the rate at which test packets are sent over the first communications connection to the test server in response to determining that there has been an increase in the first wireless connection packet loss rate. In step 396 the first wireless terminal decreases the rate at which test packets are sent over the first communications connection to the test server in response to determining that there has been a decrease in the first wireless connection packet loss rate. In step 398 the first wireless terminal leaves the rate at which test packets are sent over the first communications connection to the test server unchanged in response to determining that there has been no change in the first wireless connection packet loss rate.

Figure 2L:
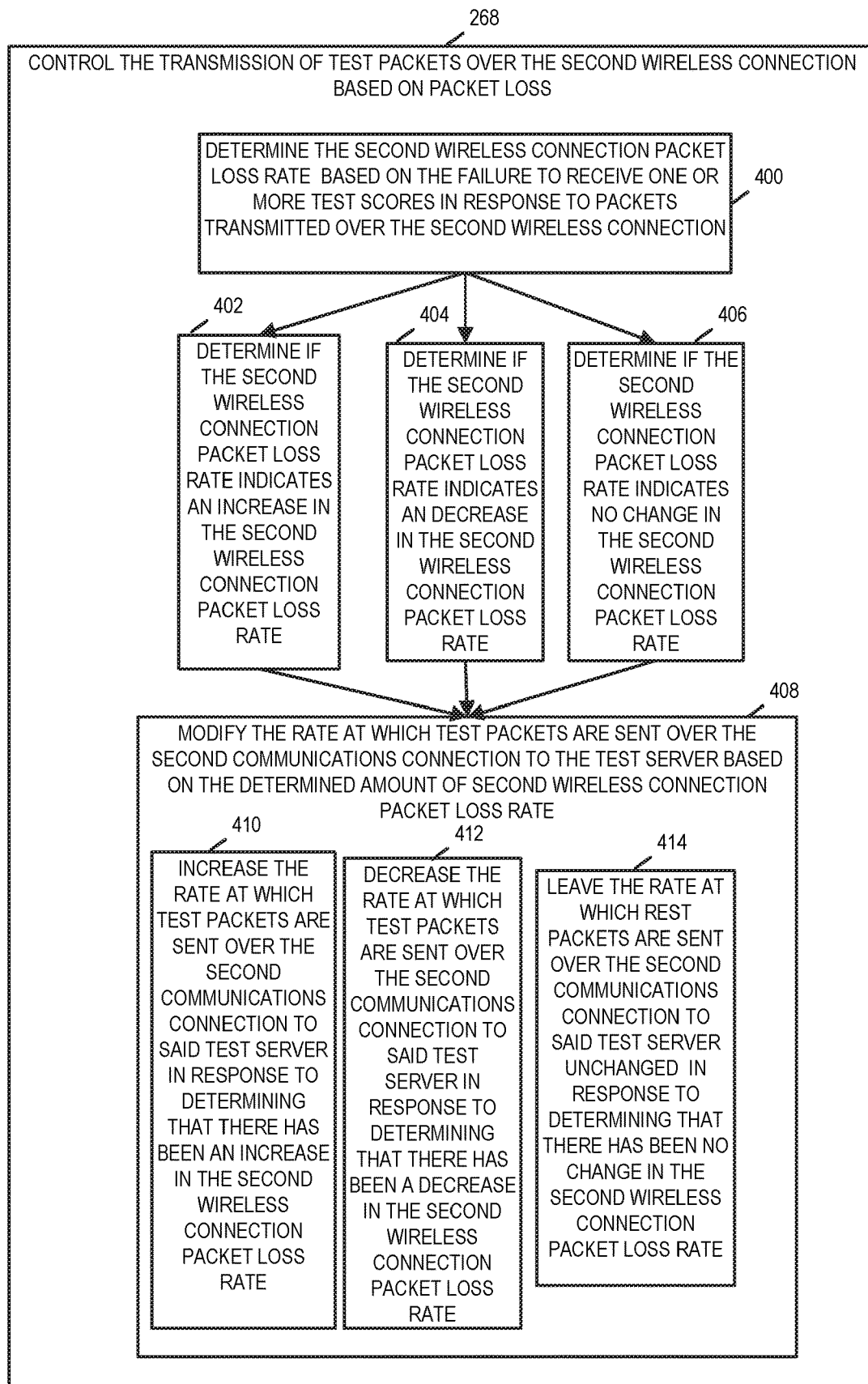
FIG. 2L is a twelfth part of a flowchart of an exemplary method of operating a first wireless terminal in accordance with an exemplary embodiment.

In step 268 the first wireless terminal controls the transmission of test packets over the second wireless connection based on round packet loss. Step 268 includes steps 400, 402, 404, 406 and 408, as shown in FIG. 2L. In step 400 the first wireless terminal determines second wireless connection packet loss rate based on the failure to receive one or more test scores in response to packets transmitted over the second wireless connection. Operation proceeds from step 400 to steps 402, 404 and 406. In step 402 the first wireless terminal determines if the second wireless connection packet loss rate indicates an increase in the second wireless connection packet loss rate. In step 404 the first wireless terminal determines if the second wireless connection packet loss rate indicates a decrease in the second wireless connection packet loss rate. In step 406 the first wireless terminal determines if the second wireless connection packet loss rate indicates no change in the second wireless connection packet loss rate. Operation proceeds from steps 402, 404 and 406 to step 408. In step 408 the first wireless terminal modifies the rate at which test packets are sent over the second communications connection to the test server based on the determined amount of second wireless connection packet loss rate. Step 408 includes steps 410, 412 and 414. In step 410 the first wireless terminal increases the rate at which test packets are sent over the second communications connection to the test server in response to determining that there has been an increase in the second wireless connection packet loss rate. In step 412 the first wireless terminal decreases the rate at which test packets are sent over the second communications connection to the test server in response to determining that there has been a decrease in the second wireless connection packet loss rate. In step 414 the first wireless terminal leaves the rate at which test packets are sent over the second communications connection to the test server unchanged in response to determining that there has been no change in the second wireless connection packet loss rate.

Figure 2M:
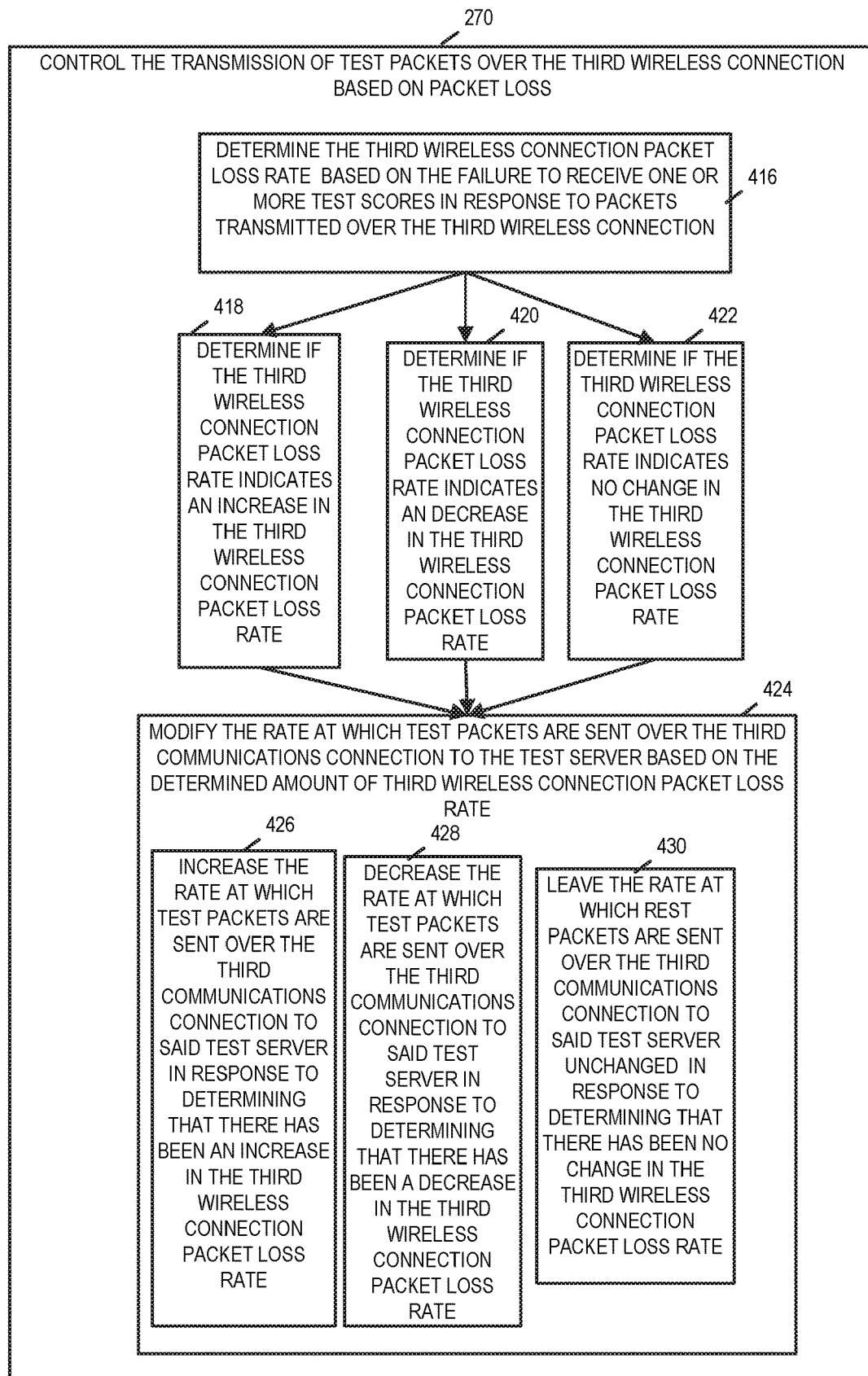
FIG. 2M is a thirteenth part of a flowchart of an exemplary method of operating a first wireless terminal in accordance with an exemplary embodiment.
Figure 2N:
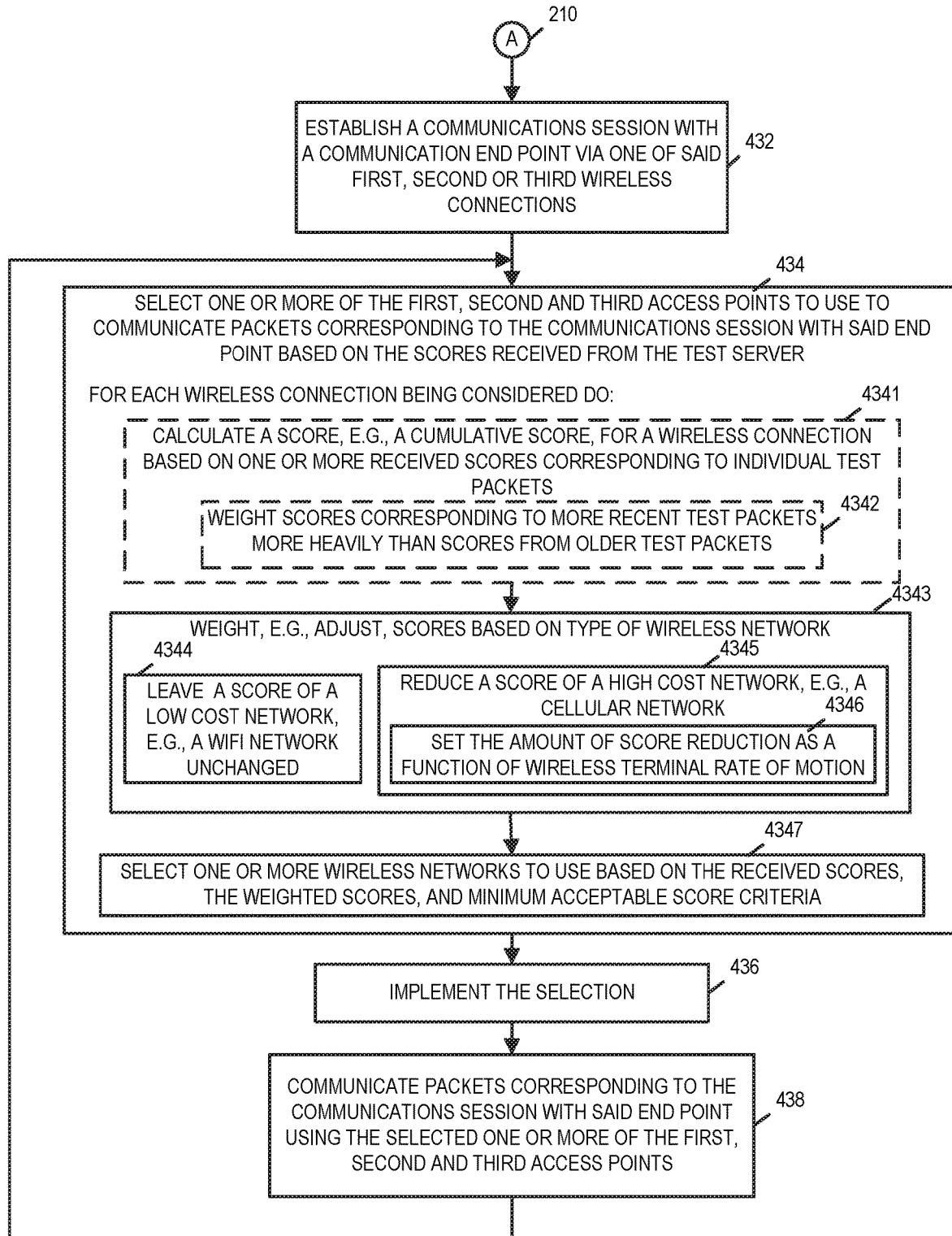
FIG. 2N is a fourteenth part of a flowchart of an exemplary method of operating a first wireless terminal in accordance with an exemplary embodiment.

In step 270 the first wireless terminal controls the transmission of test packets over the third wireless connection based on packet loss. Step 270 includes steps 416, 418, 420, 422 and 424, as shown in FIG. 2M. In step 416 the first wireless terminal determines third wireless connection packet loss rate based on the failure to receive one or more test scores in response to packets transmitted over the third wireless connection. Operation proceeds from step 416 to steps 418, 420 and 422. In step 418 the first wireless terminal determines if the third wireless connection packet loss rate indicates an increase in the third wireless connection packet loss rate. In step 420 the first wireless terminal determines if the third wireless connection packet loss rate indicates a decrease in the third wireless connection packet loss rate. In step 422 the first wireless terminal determines if the third wireless connection packet loss rate indicates no change in the third wireless connection packet loss rate. Operation proceeds from steps 418, 420 and 422 to step 424. In step 424 the first wireless terminal modifies the rate at which test packets are sent over the third communications connection to the test server based on the determined amount of third wireless connection packet loss rate. Step 424 includes steps 426, 428 and 430. In step 426 the first wireless terminal increases the rate at which test packets are sent over the third communications connection to the test server in response to determining that there has been an increase in the third wireless connection packet loss rate. In step 428 the first wireless terminal decreases the rate at which test packets are sent over the third communications connection to the test server in response to determining that there has been a decrease in the third wireless connection packet loss rate. In step 430 the first wireless terminal leaves the rate at which test packets are sent over the third communications connection to the test server unchanged in response to determining that there has been no change in the third wireless connection packet loss rate.

Operation proceeds from the output of step 226 to the input of step 226, e.g., step 226 is performed on a recurring basis.

Returning to step 432, in step 432 the first wireless terminal establishes a communications session with a communications end point, e.g., a communications peer which may participate in a voice, data or game session in which both the wireless terminal and the communications end point participate, via one of said first, second or third wireless connections. Operation proceeds from step 432 to step 434. In step 434 the first wireless terminal selects one or more of the first, second and third access points to use to communicate packets corresponding to the communications session with said end point based on the scores received from the test server.

In some embodiments, e.g., some embodiments in which each received score of steps 216, 220 and 224, is a score which scores an individual test packet communication, step 434 includes step 4341. Step 4341 is performed for each wireless connection being considered. In step 4341 the wireless terminal calculates a score, e.g., a cumulative score, for a wireless connection based on one or more scores corresponding to individual test packets. Step 4341 includes step 4342 in which the wireless terminal weights scores corresponding to more recent test packets more heavily than scores from older test packets. For example in one embodiment, after startup, scores from 20 packets are used to generate a cumulative score, with 50% weighting being given to scores corresponding to the 5 most recent packets and 50% weighting being given to scores corresponding to the 15 previous packets prior to the 5 most recent packets.

Operation proceeds from step 4341 to step 4343.

In some embodiments, e.g., some embodiments in which each received score of steps 216, 220 and 224, is a score generated from one or more individual test packets, e.g., the test server generates and sends a cumulative weighted score based on the individual scores of one or more test packets, step 4341 is omitted.

In step 4343 the wireless terminal weights, e.g., adjusts scores based on the type of wireless network. Step 4343 includes step 4344 and step 4345. In step 4344 the wireless terminal leaves a score of a low cost network, e.g., a score of a wireless connection of a WiFi network, unchanged. In step 4345, the wireless terminal reduces a score of a high cost network, e.g., a score of a wireless connection of a 4G cellular network is reduced. In some embodiments, step 4345 includes step 4346 in which the wireless terminal sets the amount of score reduction as a function of wireless terminal rate of motion, e.g., if the WT is moving at a high speed the reduction is less than if the WT is moving at a low speed. Operation proceeds from step 4343 to step 4347.

In step 4347 the wireless terminal selects one or more wireless networks to use based on the received scores, the weighted scores and minimum acceptable score criteria. In some embodiments, the selection of step 4347 is further based on the calculated scores of step 4341. In some embodiments, when each of the alternative wireless connections under consideration for selection has a score below a minimum threshold, e.g. 5, prior to step 4343, the cost adjusted scores from step 4345 are not used in the selection.

Operation proceeds from step 434 to step 436. In step 436 the first wireless terminal implements the selection of step 434, e.g., in step 436 the first wireless terminal configures the wireless terminal to use the selected one or more of the first, second and third access points when communicating packets corresponding to the communications session with said end point. Operation proceeds from step 436 to step 438. In step 438 the first wireless terminal communicates packets corresponding to the communications session with the end point using the selected one or more of the first, second and third access points. In various embodiments, communicating test packets via the first wireless connection may be, and sometimes is, performed while said communications session with the communications endpoint is ongoing. In various embodiments, communicating test packets via the second wireless connection may be, and sometime is, performed while said communications session with the communications endpoint is ongoing. In various embodiments, communicating test packets via the third wireless connection may be, and sometimes is, performed while said communications session with the communications endpoint is ongoing. In various embodiments, a connection between the wireless terminal and the communications end point is identified by a second connection identifier, said second connection identifier being different than said first connection identifier.

Operation proceeds from step 438 to the input of step 434, in which the selection of one or more of the first, second and third access point to communicate packets corresponding to the communications session with said end point is repeated at a later point in time, e.g., based on new scores received from the test server.

Figure 3:
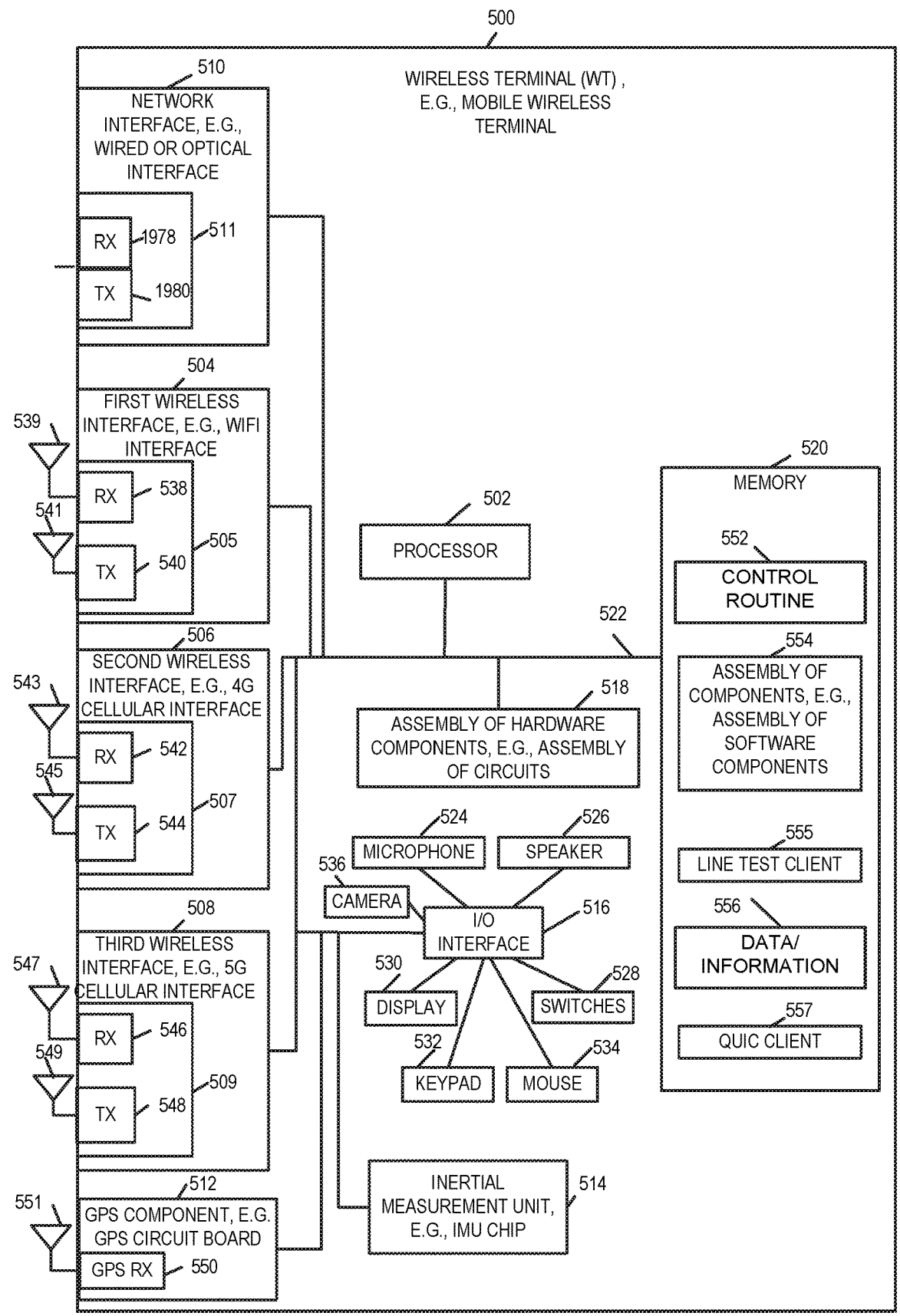
FIG. 3 is a drawing of an exemplary wireless terminal (WT), e.g., a mobile WT, in accordance with an exemplary embodiment.
Figure 4G:
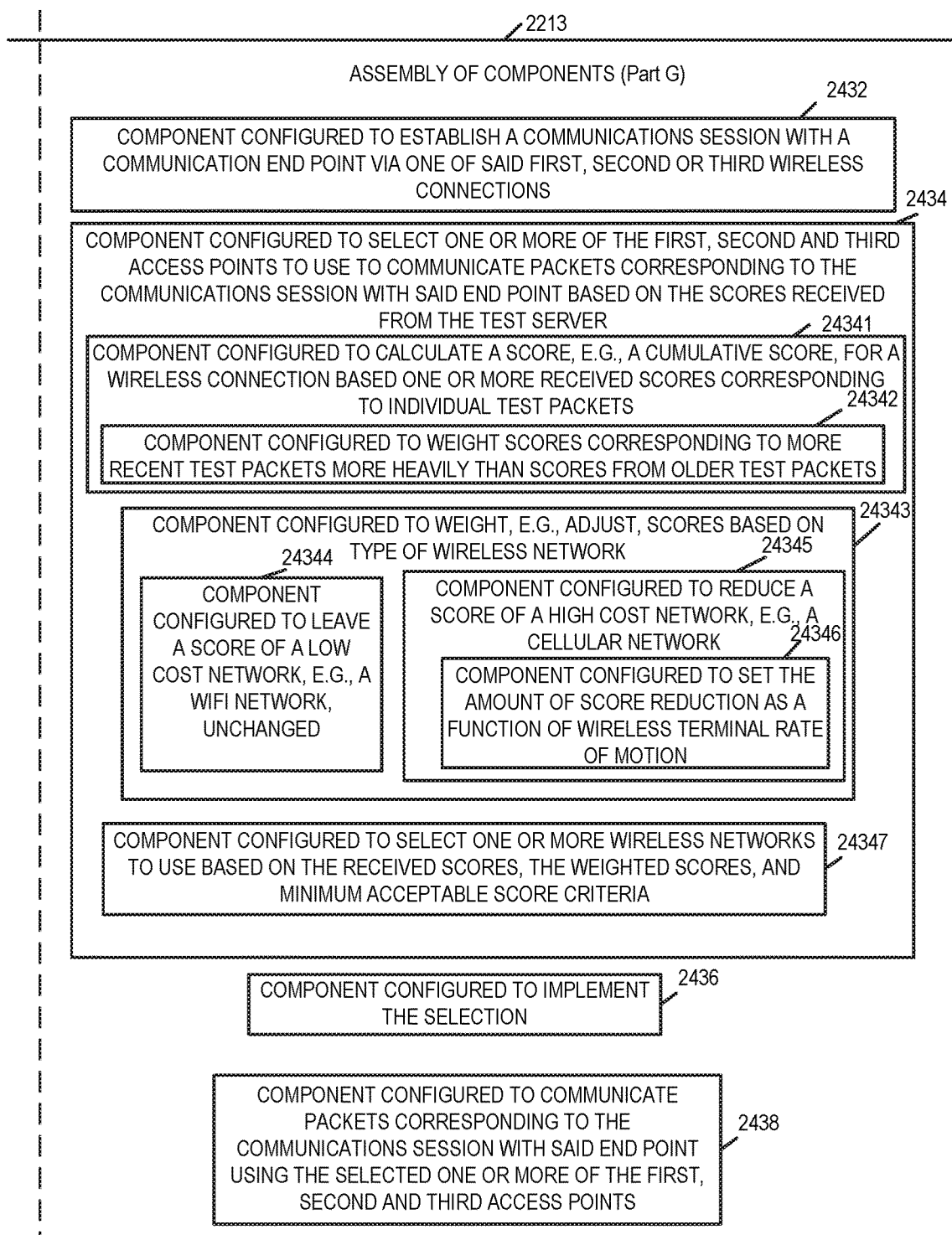
FIG. 4G is a drawing of a seventh part of an assembly of components in accordance with an exemplary embodiment.
Figure 4A:
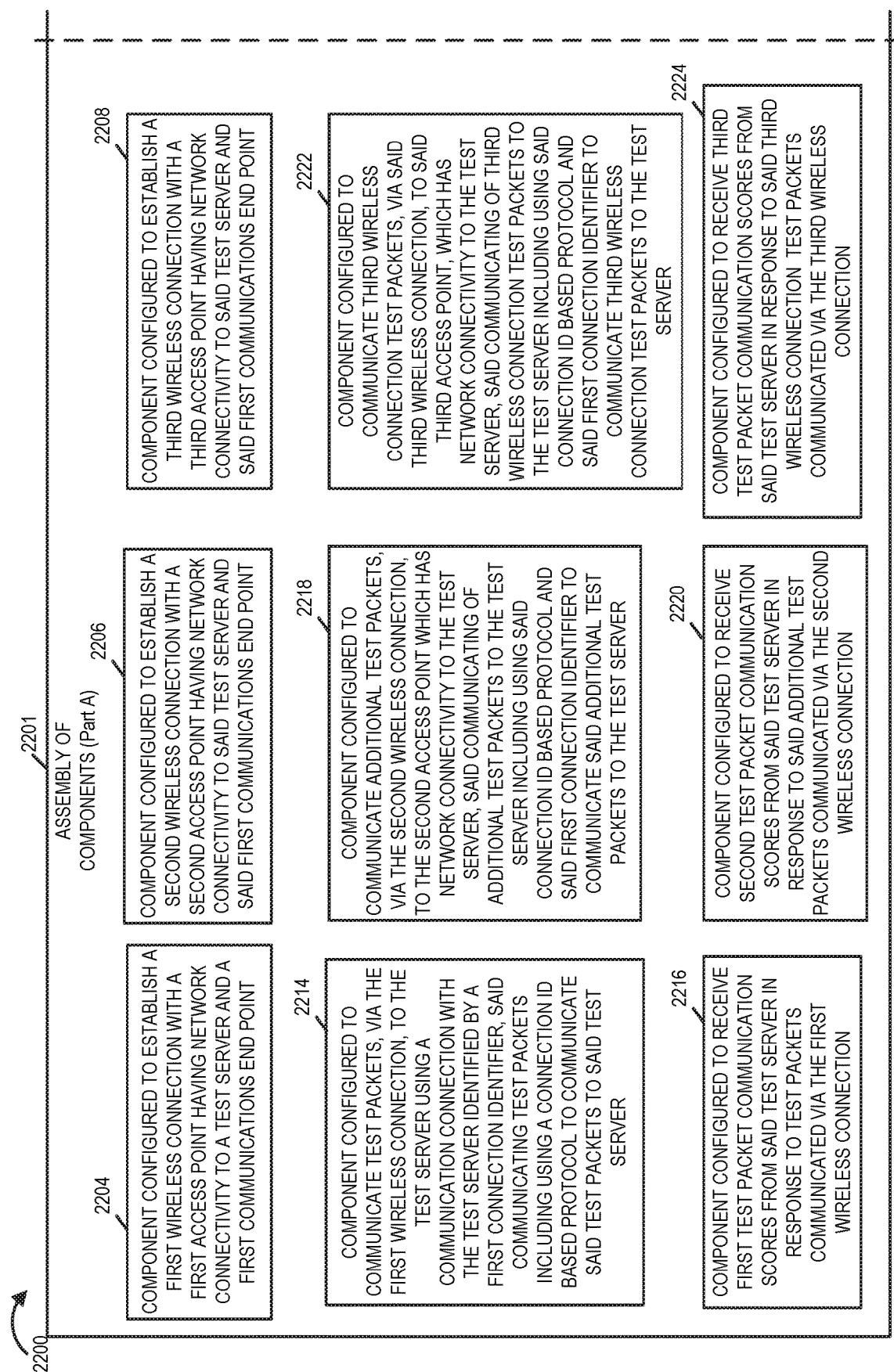
FIG. 4A is a drawing of a first part of an assembly of components in accordance with an exemplary embodiment.
Figure 4B:
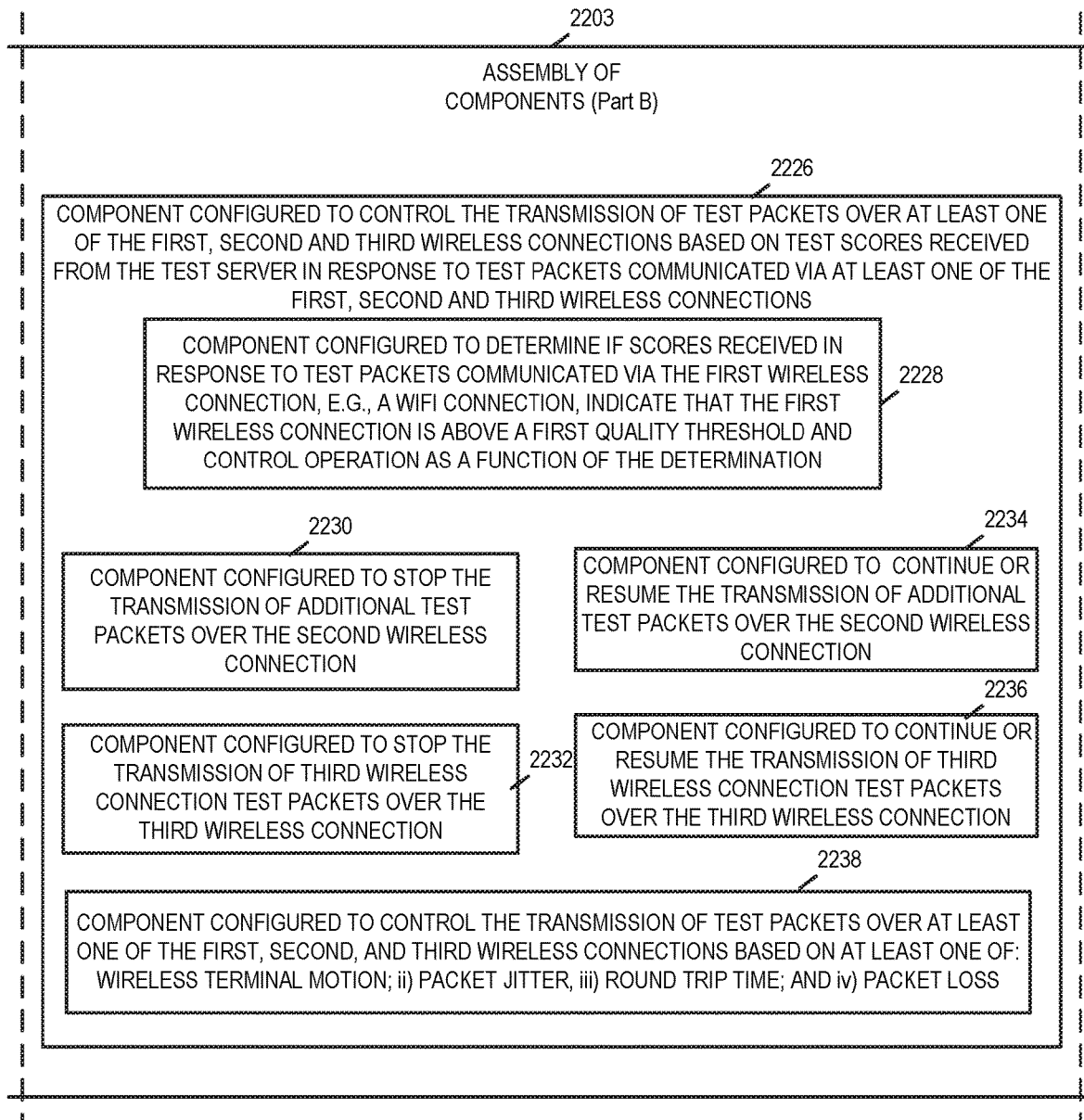
FIG. 4B is a drawing of a second part of an assembly of components in accordance with an exemplary embodiment.
Figure 4C:
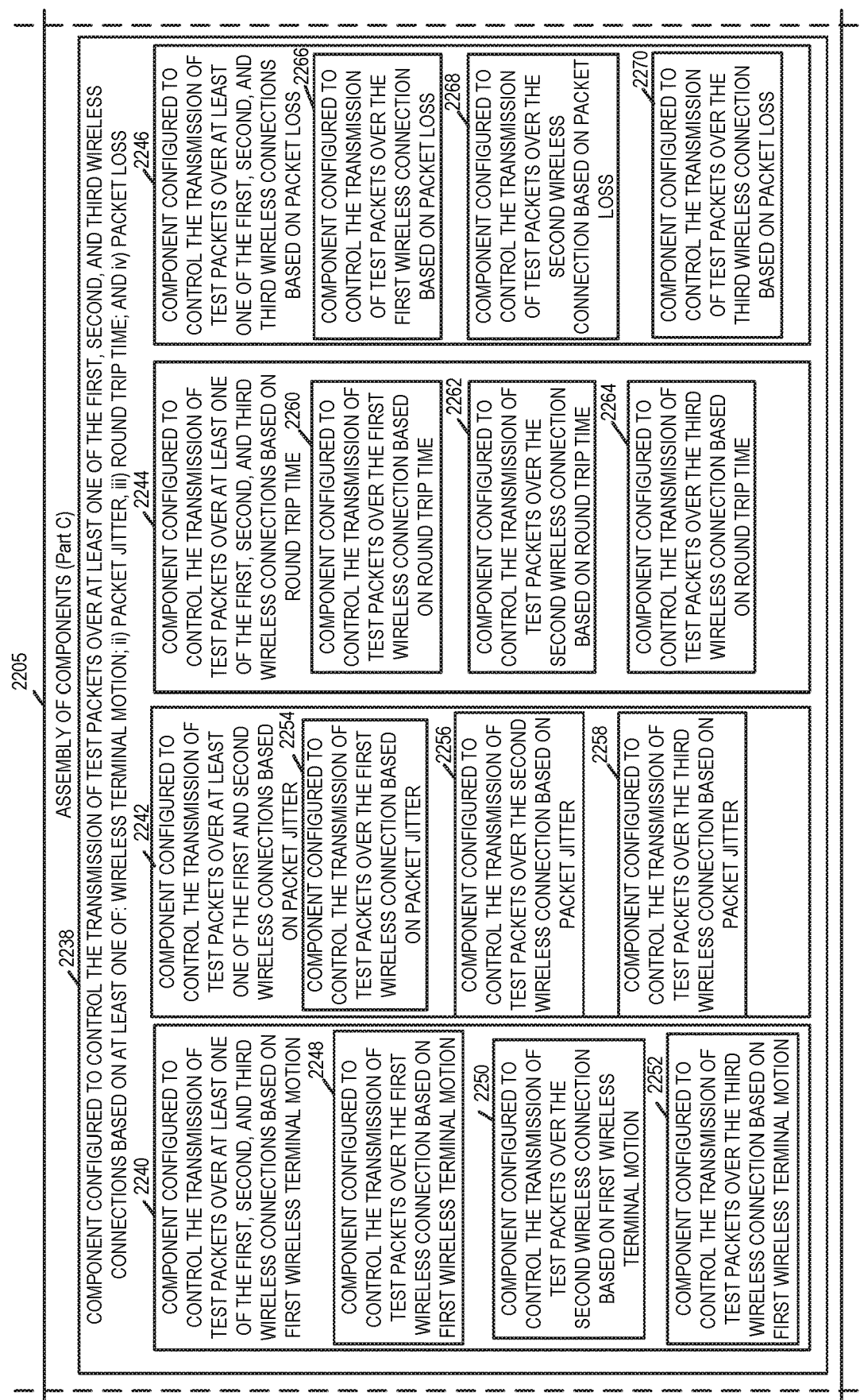
FIG. 4C is a drawing of a third part of an assembly of components in accordance with an exemplary embodiment.
Figure 4D:
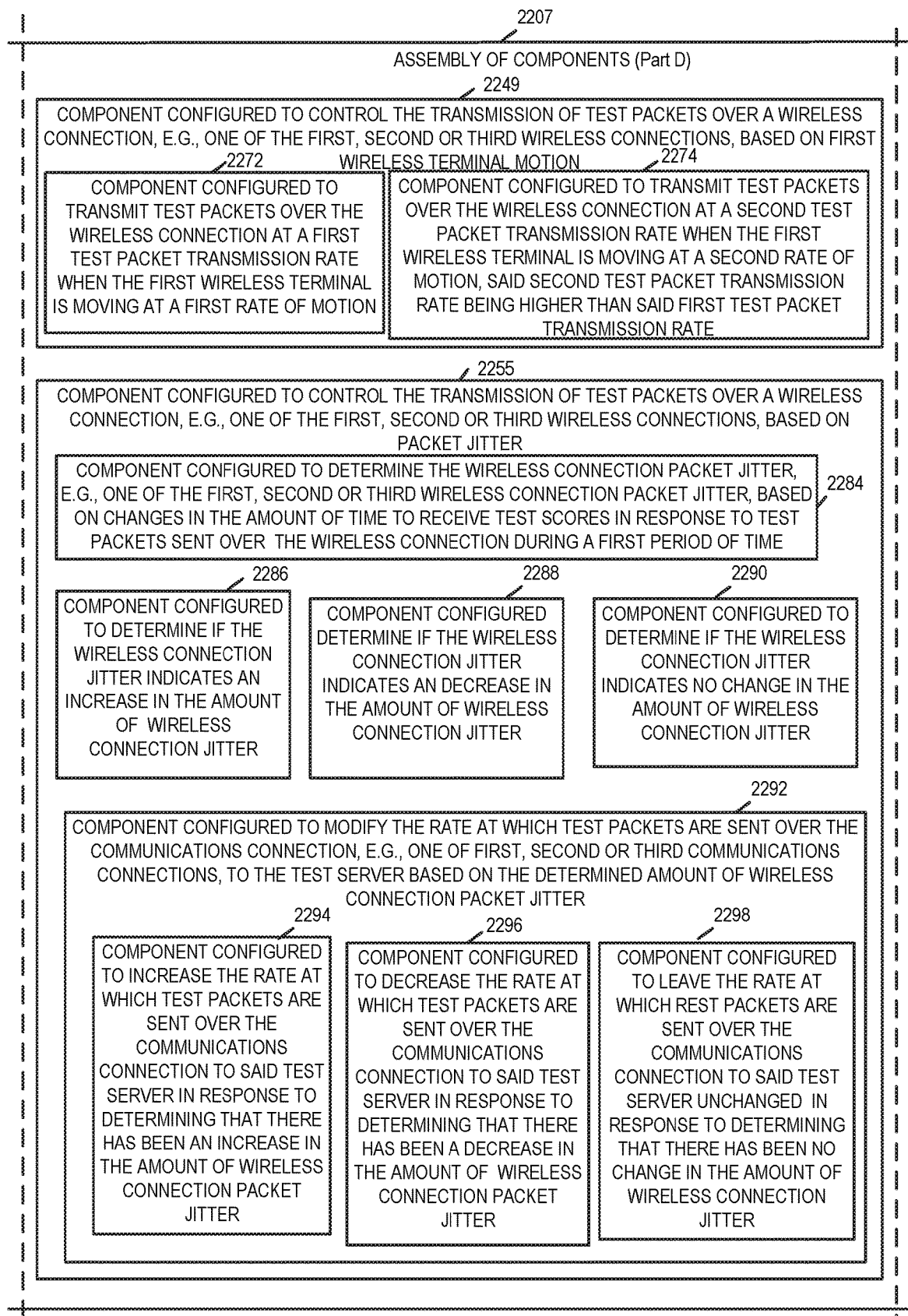
FIG. 4D is a drawing of a fourth part of an assembly of components in accordance with an exemplary embodiment.
Figure 4E:
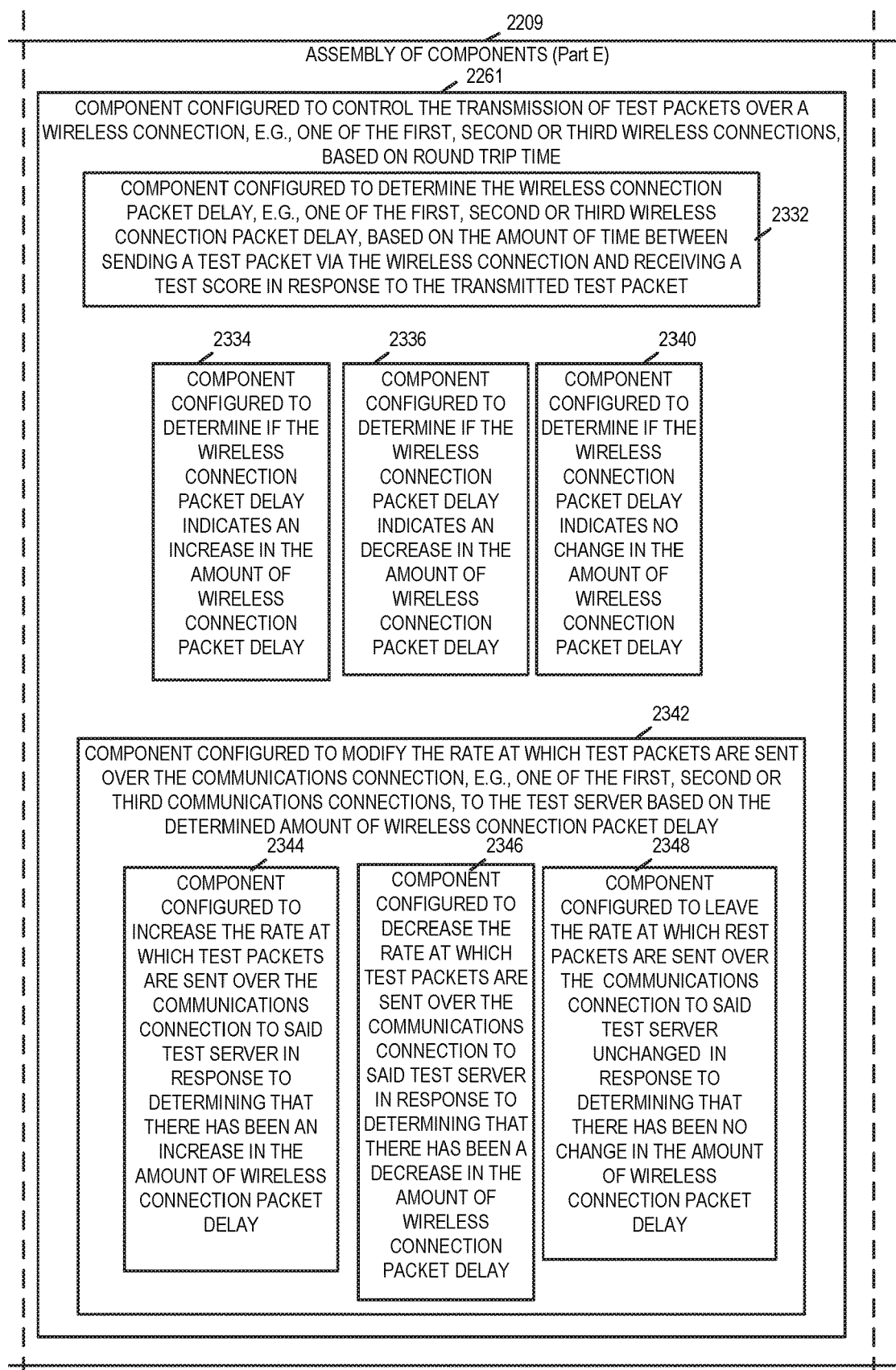
FIG. 4E is a drawing of a fifth part of an assembly of components in accordance with an exemplary embodiment.
Figure 4F:
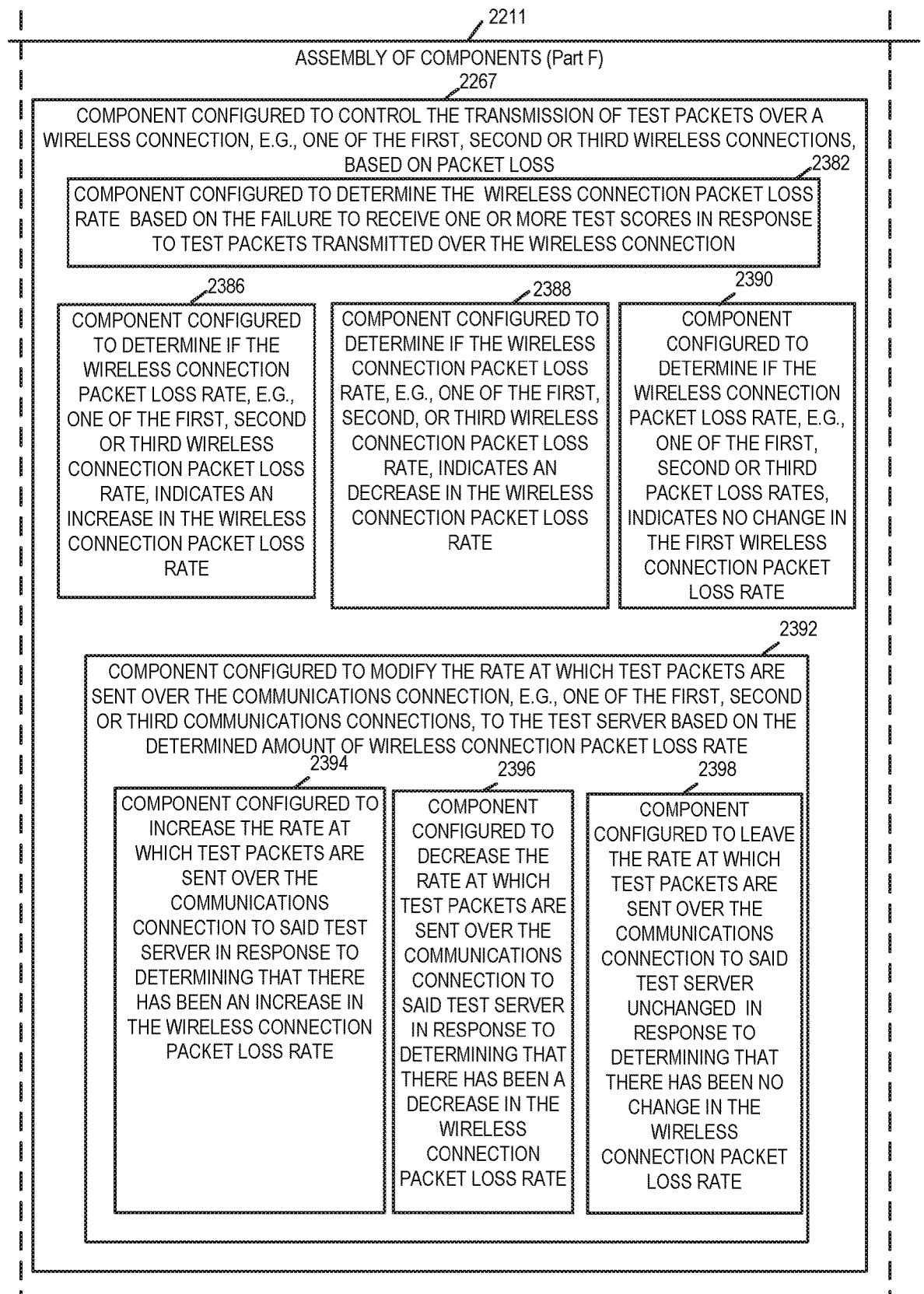
FIG. 4F is a drawing of a sixth part of an assembly of components in accordance with an exemplary embodiment.

FIG. 3 is a drawing of an exemplary wireless terminal (WT) 500, e.g., a mobile WT, in accordance with an exemplary embodiment. In some embodiments WT 102, WT 104 or WT 902 is a WT implemented in accordance with WT 500. Wireless terminal 500 includes a processor 502, e.g., a CPU, a first wireless interface 504, e.g., a WIFI interface, a second wireless interface 506, e.g., a 4G cellular interface, a third wireless interface 508, e.g., a 5G cellular interface, a network interface 510, e.g., a wired or optical interface, a GPS component 512, e.g., a GPS circuit board, an inertial measurement unit (IMU) 514, e.g., an IMU on a chip, an I/O interface 516, an assembly of hardware components 518, e.g., an assembly of circuits, and memory 520 coupled together via a bus 522 over which the various elements may interchange data and information.

First wireless interface 504, e.g., a WiFi interface, includes a receiver (RX) 538 and a transmitter (TX) 540. In some embodiments, the receiver 538 and transmitter 540 are part of a transceiver chip or transceiver circuit 505 included in first wireless interface 504. Receiver 538 is coupled to receive antenna 539 via which the wireless terminal 500 receives first type wireless signals, e.g., WiFi wireless signals. Transmitter 540 is coupled to transmit antenna 541 via which the wireless terminal 500 transmits first type wireless signals, e.g., WiFi wireless signals.

Second wireless interface 506, e.g., a 4G cellular interface, includes a receiver (RX) 542 and a transmitter (TX) 544. In some embodiments, the receiver 542 and transmitter 544 are part of a transceiver chip or transceiver circuit 507 included in second wireless interface 506. Receiver 542 is coupled to receive antenna 543 via which the wireless terminal 500 receives second type wireless signals, e.g., 4G cellular wireless signals. Transmitter 544 is coupled to transmit antenna 545 via which the wireless terminal 500 transmits second type wireless signals, e.g., 4G cellular wireless signals.

Third wireless interface 508, e.g., a 5G cellular interface, includes a receiver (RX) 546 and a transmitter (TX) 548. In some embodiments, the receiver 546 and transmitter 548 are part of a transceiver chip or transceiver circuit 509 included in third wireless interface 508. Receiver 546 is coupled to receive antenna 547 via which the wireless terminal 500 receives third type wireless signals, e.g., 5G cellular wireless signals. Transmitter 548 is coupled to transmit antenna 549 via which the wireless terminal 500 transmits third type wireless signals, e.g., 5G cellular wireless signals.

Network interface 510 includes a receiver 1978 and a transmitter 1980. In some embodiments, receiver 1978 and transmitter 1980 are included as part of a transceiver chip or circuit 511.

GPS component 512 includes a GPS receiver 550 coupled to a GPS antenna 551 via which the WT 500 receives GPS signals from GPS satellites. GPS component 512 and/or IMU 514 are used, in some embodiments, to determine WT 500 motion, e.g., the velocity of WT 500. In some embodiments, determining the velocity of WT 500 includes determining the speed of WT 500 to be within one or a predetermined number speed ranges, e.g., a stationary or substantially stationary range, a human motion range, a land vehicle, e.g., automobile, motion range or an air vehicle, e.g., aircraft, motion range. In some such embodiments, different test packet sending rates are used as a function of a determined WT 500 speed range.

Wireless terminal 500 further includes a plurality of I/O devices including a microphone 524, a speaker 526, switches 528, a display 530, e.g., a touch screen display, a keypad 532, a mouse 534, and a camera 536. The various I/O devices (524, 526, 528, 530, 532, 534, 536) are coupled to I/O interface 516 which couples the various I/O devices to bus 522 and to the other components (502, 504, 506, 508, 510, 512, 514, 518, 520) included in WT 500.

Memory 520 includes a control routine 552, which controls functions and operation of WT 500, an assembly of components 554, e.g., an assembly of software components, a line test client 555, a QUIC client 557, and data/information 556. In some embodiments, one or more of the components in assembly of components 554 is included as part of the line test client 555. In some embodiments, one or more of the components in assembly of components 554 is included as part of QUIC client 557.

FIG. 4, comprising the combination of FIG. 4A, FIG. 4B, FIG. 4C, FIG. 4D, FIG. 4E, FIG. 4F and FIG. 4G, is a drawing of an assembly of components 2200, comprising the combination of Part A 2201, Part B 2203, Part C 2205, Part D 2207, Part E 2209, Part F 2211 and Part G 2213, in accordance with an exemplary embodiment. FIG. 4 is a drawing of an exemplary assembly of components 2200, which may be included in a wireless terminal 300 in accordance with an exemplary embodiment. Assembly of components 2200 can be, and in some embodiments is, used in WT 500, WT 102, WT 104, and/or WT 902. The components in the assembly of components 2200 can, and in some embodiments are, implemented fully in hardware within the processor 502, e.g., as individual circuits. The components in the assembly of components 2200 can, and in some embodiments are, implemented fully in hardware within the assembly of components 518, e.g., as individual circuits corresponding to the different components. In other embodiments some of the components are implemented, e.g., as circuits, within the processor 502 with other components being implemented, e.g., as circuits within assembly of components 518, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 520 of the WT 500, with the components controlling operation of WT 500 to implement the functions corresponding to the components when the components are executed by a processor, e.g., processor 502. In some such embodiments, the assembly of components 2200 is included in the memory 520 as assembly of components 554. In still other embodiments, various components in assembly of components 2200 are implemented as a combination of hardware and software, e.g., with another circuit external to the processor providing input to the processor 502 which then under software control operates to perform a portion of a component's function. While processor 502 is shown in the FIG. 3 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 2200 is stored in the memory 520, the memory 520 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the WT 500 or elements therein such as the processor 502, to perform the functions of corresponding steps illustrated and/or described in the method of one or more of the flowcharts, signaling diagrams and/or described with respect to any of the Figures. Thus the assembly of components 2200 includes various components that perform functions of corresponding one or more described and/or illustrated steps of an exemplary method, e.g., steps of the method of flowchart 200 of FIG. 2 and/or described or shown with respect to nay of the other figures.

Assembly of components 2200 includes a component 2204 configured to establish a first wireless connection with a first access point having connectivity to a test server and a first communications end point, a component 2206 configured to establish a second wireless connection with a second access point having connectivity to said test server and said first communications end point, a component 2208 configured to establish a third wireless connection with a third access point having connectivity to said test server and said first communications end point, a component 2214 configured to communicate test packets, via the first wireless connection, to the test server using a communications connection with the test server identified by a first connection identifier, said communicating test packets including using a connection ID based protocol to communicate said test packets to said test server, a component 2218 configured to communicate additional test packets, via the second wireless connection, to the second access point which has network connectivity to the test server, said communicating of additional test packets to the test server including using said connection ID based protocol and said first connection identifier to communicate said additional test packets to the test server, a component 2222 configured to communicate third wireless connection test packets, via said third wireless connection, to said third access point, which has network connectivity to the test server, said communicating of third wireless connection test packets to the test server including using said connection ID based protocol and said first connection identified to communicate third wireless connection test packets to the test server, a component 2216 configured to receive first test packet communication scores from said test server in response to test packets communicated via the first wireless connection, a component 2220 configured to receive second test packets communication scores from said test server in response to said additional test packets communicated via the second wireless connection, and a component 2224 configured to receive third test packet communication scores from said test server in response to said third wireless connection test packets communicated via the third wireless connection.

Assembly of components 2200 further includes a component 2226 configure to control the transmission of test packets over at least one of the first, second and third wireless connections based on test scores received from the test server in response to test packets communicated via at least one of the first, second, and third wireless connection. Component 2226 includes a component 2228 configured to determine if scores received in response to test packets communicated via the first wireless connection, e.g., a WiFi connection, indicate the first wireless connection is above a first quality threshold and to control operation as a function of the determination, a component 2230 configured to stop the transmission of additional test packets over the second wireless connection, e.g., a 4G cellular wireless connection, e.g., in response to a determination that the first wireless connection is above the first quality threshold, a component 2232 configured to stop the transmission of third wireless connection test packets over the third wireless connection, e.g., a 5G cellular wireless connection, e.g., in response to a determination that the first wireless connection is above the first quality threshold, a component 2234 configured to continue or resume the transmission of additional test packets over the second wireless connection, e.g., in response to a determination that the first wireless connection is not above the first quality threshold, a component 2236 configured to continue or resume the transmission of third wireless connection test packets over the third wireless connection, e.g., in response to a determination that the first wireless connection is not above the first quality threshold, and a component 2238 configured to control the transmission of test packets over at least one of the first, second and third wireless connection based on at least one of: wireless terminal motion, ii) packet jitter, iii) round trio time, and iv) packet loss.

Component 2238 includes a component 2240 configured to control the transmission of test packets over at least one of the first, second and third wireless connections based on first wireless terminal motion, a component 2242 configured to control the transmission of test packets over at least one of the first, second and third wireless connections based on packet jitter, a component 2244 configured to control the transmission of test packets over at least one of the first, second and third wireless connections based on round trip time, and a component 2246 configured to control the transmission of test packets over at least one of the first, second and third wireless connections based on packet loss. Component 2240 includes a component 2248 configured to control the transmission of test packets over the first wireless connection based on first wireless terminal motion, a component 2250 configured to control the transmission of test packets over the second wireless connection based on first wireless terminal motion, and a component 2252 configured to control the transmission of test packets over the third wireless connection based on first wireless terminal motion. Component 2242 includes a component 2254 configured to control the transmission of test packets over the first wireless connection based on packet jitter, a component 2256 configured to control the transmission of test packets over the second wireless connection based on packet jitter, and a component 2258 configured to control the transmission of test packets over the third wireless connection based on packet jitter. Component 2244 includes a component 2260 configured to control the transmission of test packets over the first wireless connection based on round trip time, a component 2262 configured to control the transmission of test packets over the second wireless connection based on round trip time, and a component 2264 configured to control the transmission of test packets over the third wireless connection based on round trip time. Component 2246 includes a component 2266 configured to control the transmission of test packets over the first wireless connection based on packet loss, a component 2268 configured to control the transmission of test packets over the second wireless connection based on packet loss, and a component 2270 configured to control the transmission of test packets over the third wireless connection based on packet loss.

Assembly of components 2200 further includes a component 2249 configured to control the transmission of test packets over a wireless connection, e.g., one of first, second or third wireless connections, based on first wireless terminal motion. Component 2249 includes a component 2272 configured to transmit test packets over the wireless connection at a first test packet transmission rate when the first wireless terminal is moving at a first rate of motion, and a component 2274 configured to transmit test packets over the wireless connection at a second test packet transmission rate when the first wireless terminal is moving at a second rate of motion, said second test packet transmission rate being higher than said first test packet transmission rate. In some embodiments, component 2249 is controlled to operate by component 2248, 2250 or 2252, e.g., component 2249 implements a subroutine called by and used by any one of components 2248, 2250, 2252.

Assembly of components 2200 further includes a component 2255 configured to control the transmission of test packets over a wireless connection, e.g., one of the first, second or third wireless connections, based on packet jitter. Component 2255 includes a component 2284 configured to determine the wireless connection packet jitter, e.g., one of first, second, or third wireless connection packet jitter, based on changes in the amount of time to receive test scores in response to test packets sent over the wireless connection during a first period of time, a component 2286 configured to determine if the wireless connection packet jitter indicate an increase in the amount of wireless connection packet jitter, a component 2288 configured to determine if the wireless connection packet jitter indicate a decrease in the amount of wireless connection packet jitter, a component 2290 configured to determine if the wireless connection packet jitter indicates no change in the amount of wireless connection packet jitter, and a component 2292 configured to modify the rate at which test packets are sent over the communications connection, e.g., one of the first, second or third communications connections, to the test server based on the amount of wireless connection packet jitter. Component 2292 includes a component 2294 configured to increase a rate at which test packets are sent over the communications connection to the test server in response to determining that there has been an increase in the amount of wireless connection packet jitter, a component 2296 configured to decrease a rate at which test packets are sent over the communications connection to the test server in response to determining that there has been a decrease in the amount of wireless connection packet jitter, and a component 2298 configured to leave the rate at which test packets are sent over the communications connection to the test server unchanged in response to determining that there has been no change in the amount of wireless connection packet jitter. In some embodiments, component 2255 is controlled to operate by component 2254, 2256 or 2258, e.g., component 2255 implements a subroutine called by and used by any one of components 2254, 2256, 2258.

Assembly of components 2200 further includes a component 2261 configured to control the transmission of test packets over a wireless connection, e.g., one of the first, second or third wireless connections, based on round trip time. Component 2261 includes a component 2332 configured to determine the wireless connection packet delay, e.g., one of first, second, or third wireless connection packet delay, based on the amount of time between sending a test packet via the wireless connection and receiving a test score in response to the transmitted test packet, a component 2334 configured to determine if the wireless connection packet delay indicate an increase in the amount of wireless connection packet delay, a component 2336 configured to determine if the wireless connection packet delay indicate a decrease in the amount of wireless connection packet delay, a component 2340 configured to determine if the wireless connection packet delay indicates no change in the amount of wireless connection packet delay, and a component 2342 configured to modify the rate at which test packets are sent over the communications connection, e.g., one of the first, second or third communications connections, to the test server based on the amount of wireless connection packet delay. Component 2342 includes a component 2344 configured to increase a rate at which test packets are sent over the communications connection to the test server in response to determining that there has been an increase in the amount of wireless connection packet delay, a component 2346 configured to decrease a rate at which test packets are sent over the communications connection to the test server in response to determining that there has been a decrease in the amount of wireless connection packet delay, and a component 2348 configured to leave the rate at which test packets are sent over the communications connection to the test server unchanged in response to determining that there has been no change in the amount of wireless connection packet delay. In some embodiments, component 2261 is controlled to operate by component 2260, 2262 or 2264, e.g., component 2261 implements a subroutine called by and used by any one of components 2260, 2262, 2264.

Assembly of components 2200 further includes a component 2267 configured to control the transmission of test packets over a wireless connection, e.g., one of the first, second or third wireless connections, based on packet loss. Component 2267 includes a component 2382 configured to determine the wireless connection packet loss rate, e.g., one of first, second, or third wireless connection packet loss rates, based on the failure to receive one or more test scores in response to test packets transmitted over the wireless connection, a component 2386 configured to determine if the wireless connection packet loss rate, e.g., one of the first, second, or third wireless connection packet loss rates, indicates an increase in the wireless connection packet loss rate, a component 2388 configured to determine if the wireless connection packet loss rate indicate a decrease in the wireless connection packet loss rate, a component 2390 configured to determine if the wireless connection packet loss rate indicates no change in the wireless connection packet loss rate, and a component 2392 configured to modify the rate at which test packets are sent over the communications connection, e.g., one of the first, second or third communications connections, to the test server based on the determined amount of wireless connection packet loss rate. Component 2392 includes a component 2394 configured to increase a rate at which test packets are sent over the communications connection to the test server in response to determining that there has been an increase in the wireless connection packet loss rate, a component 2396 configured to decrease a rate at which test packets are sent over the communications connection to the test server in response to determining that there has been a decrease in the wireless connection packet loss rate, and a component 2398 configured to leave the rate at which test packets are sent over the communications connection to the test server unchanged in response to determining that there has been no change in the wireless connection packet loss rate. In some embodiments, component 2398 is controlled to operate by component 2266, 2268 or 2270, e.g., component 2267 implements a subroutine called by and used by any one of components 2266, 2268, 2270.

Assembly of components 2200 further includes a component 2432 configured to establish a communications session with a communications end point via one of said first, second or third wireless connections, and a component 2434 configured to select one or more of the first, second and third access point to use to communicate packets corresponding to the communications session with said end point based on the scores received from the test server. Component 2434 includes a component 24341 configured to calculate a score, e.g., a cumulative score, for a wireless connection based on one or more received scores corresponding to individual test packets. Component 24341 includes a component 24342 configured to weight scores corresponding to more recent test packets more heavily than scores from older test packets. Component 2434 further includes a component 24343 configured to weight, e.g., adjust, received scores based on type of wireless network. Component 24343 includes a component 24344 configured to leave a score of a low cost network, e.g., a WiFi network, unchanged, and a component 24345 configured to reduce a score of a high cost network, e.g., a cellular network such as a 4G network. Component 24345 includes a component 24346 configured to set the amount of score reduction as a function of wireless terminal motion. Component 2434 further includes a component 24347 configured to select one or more wireless networks to use based on the received scores, weighted scores, and minimum acceptable score criteria. In some embodiments, component 24347 further based the selection upon calculated scores.

Assembly of components 2200 further includes a component 2436 configured to implement the selection of component 2434, and a component 2438 configured to communicate packets corresponding to the communications session with said end point using the selected one or more of the first, second and third access points.

Figure 5:
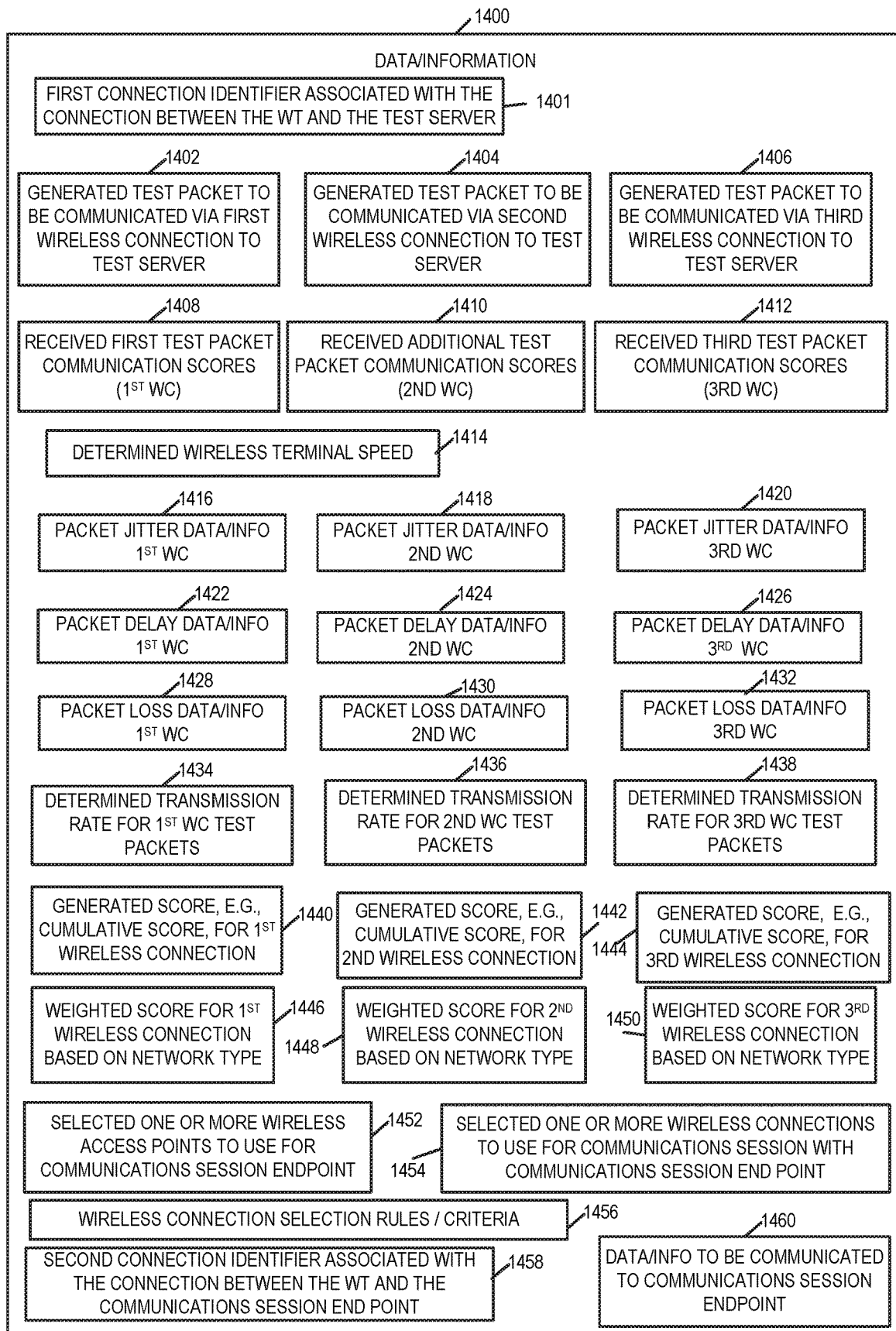
FIG. 5 is a drawing of exemplary data/information included in a wireless terminal in accordance with an exemplary embodiment.

FIG. 5 is a drawing of exemplary data/information 1400 in accordance with an exemplary embodiment. Data/information 1400 may be included in data/information 556 of memory 520 of wireless terminal 500 of FIG. 3.

Data information 1400 includes a first connection identifier associated with the connection between the wireless terminal and the test server 1401, a generated test packet to be communicated via the first wireless connection to the test server 1402, a generated test packet to be communicated via the second wireless connection to the test server 1404, a generated test packet to be communicated via the third wireless connection to the test server 1406, received first test packet communication scores corresponding to the first wireless connection 1408, e.g., a set of received test scores one for each transmitted test packet communicated over the first wireless connection, received additional test packet communication scores corresponding to the second wireless connection 1410, e.g., a set of received test scores one for each transmitted test packet communicated over the second wireless connection, received third test packet communication scores corresponding to the third wireless connection 1412, e.g., a set of received test scores one for each transmitted test packet communicated over the third wireless connection, determined wireless terminal speed 1414, e.g., based on GPS or IMU accelerometer information, packet jitter data/information for the 1st wireless connection 1416, packet jitter data/information for the 2nd wireless connection 1418, packet jitter data/information for the 3rd wireless connection 1420, packet delay data/information for the 1st wireless connection 1422, packet delay data/information for the 2nd wireless connection 1424, packet delay data/information for the 3rd wireless connection 1426, packet loss data/information for the 1st wireless connection 1428, packet loss data/information for the 2nd wireless connection 1430, and packet loss data/information for the 3rd wireless connection 1432. Data/information 1400 further includes a determined transmission rate for test packets transmitted over the 1st wireless connection 1434, a determined transmission rate for test packets transmitted over the 2nd wireless connection 1436, a determined transmission rate for test packets transmitted over the 3rd wireless connection 1438.

Data/information 1400 further includes a generated score, e.g., a cumulative score, for the first wireless connection 1440, a generated score, e.g., a cumulative score, for the second wireless connection 1442, a generated score, e.g., a cumulative score, for the third wireless connection 1444, a weighted score for the first wireless connection based on network type 1446, a weighted score for the second wireless connection based on network type 1448, and a weighted score for the third wireless connection based on network type 1450.

Data/information 1400 further includes a selected one or more wireless access points to use for the communications session with the endpoint 1452, a selected one or more wireless connections to use for the communications session with the communications session endpoint 1454, wireless connection selection rules/criteria 1456, a second connection identifier associated with the connection between the wireless terminal and the communications session endpoint 1458, and data/information 1450 to be communicated to the communications session endpoint 1460.

Figure 6:
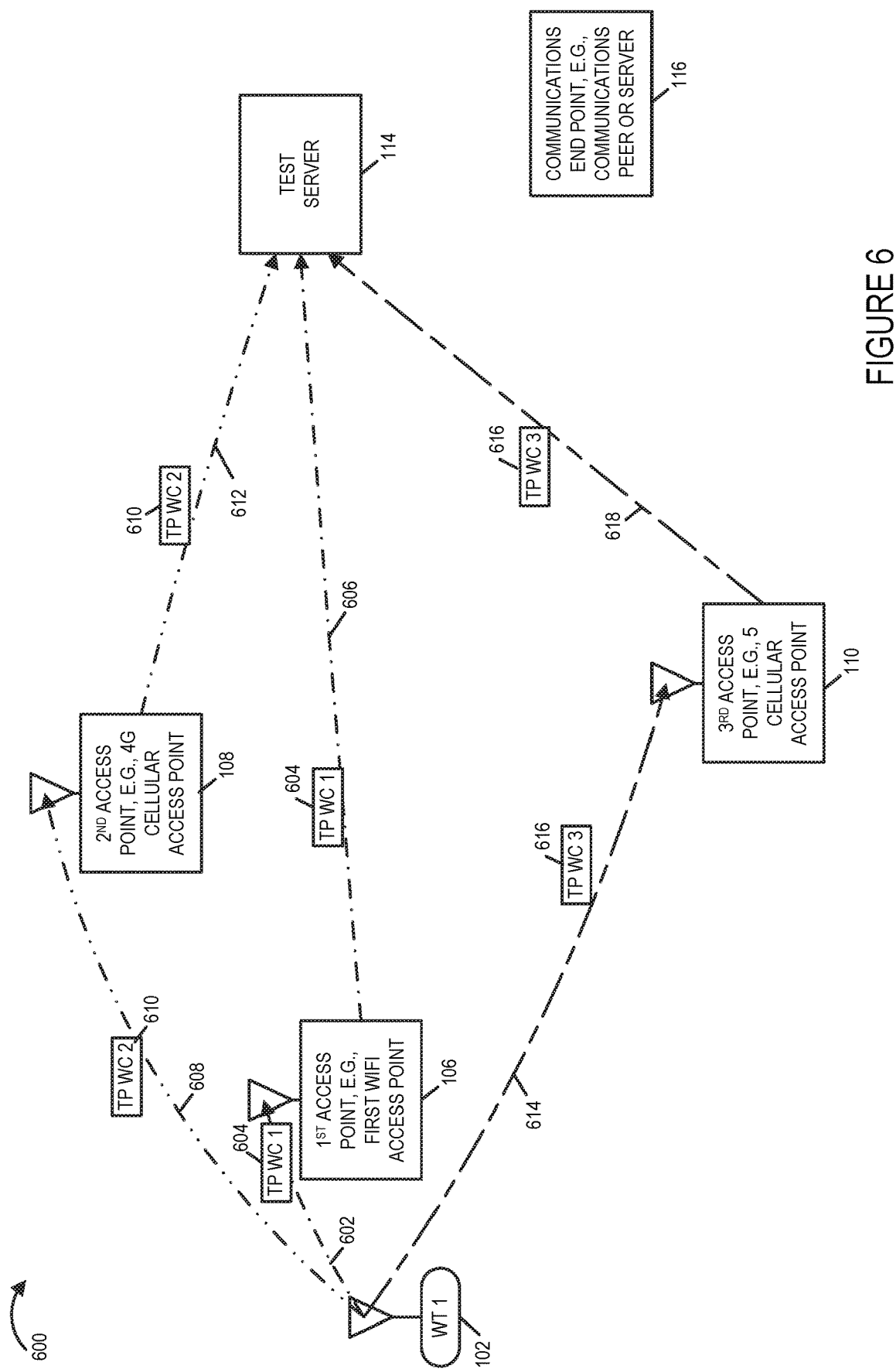
FIG. 6 is a drawing illustrating exemplary test packets being sent from a wireless terminal to test server in accordance with an exemplary embodiment.

FIG. 6 is a drawing 600 illustrating exemplary test packets being sent from WT 1 102 to test server 114 of the system 100 of FIG. 1 in accordance with an exemplary embodiment. WT 1 102 generates and transmits wireless signal 602 communicating test packet TP WC 1 604 for testing the wireless communications connection between WT 1 102 and 1st access point 106, e.g., a WiFi access point. The test packet TP WC1 is being sent by WT 1 102 to test server 114, via a first wireless connection, which is being evaluated. First access point 106 receives wireless signal 602 and generates signal 606 communicating the test packet 604 to test server 114.

WT 1 102 generates and transmits wireless signal 608 communicating test packet TP WC 2 610 for testing the wireless communications connection between WT 1 102 and 2nd access point 108, e.g., a 4G cellular access point. The test packet TP WC2 610 is being sent by WT 1 102 to test server 114, via a second wireless connection, which is being evaluated. Second access point 108 receives wireless signal 608 and generates signal 612 communicating the test packet 610 to test server 114.

WT 1 102 generates and transmits wireless signal 614 communicating test packet TP WC 3 616 for testing the wireless communications connection between WT 1 102 and 3rd access point 110, e.g., a 5G cellular access point. The test packet TP WC 3 616 is being sent by WT 1 102 to test server 114, via a third wireless connection, which is being evaluated. Third access point 110 receives wireless signal 614 and generates signal 618 communicating the test packet 616 to test server 114.

WT 1 102 expects a response from the test server in response to each transmitted test packet. In some embodiments, the test server 114 generates and sends a test score for a wireless communications connection is response to a received test packet. In some embodiments a generated test score may be, and sometimes, is based on a set of previously received test messages communicated over the wireless communications connection being evaluated.

In some embodiments, the test server 114 generates and sends a response message, e.g., an ack, for a wireless communications connection is response to a received test packet, and WT 1 102 generates a test score for the wireless communications channel based on: one or more of: information in the received response message and/or characteristics associated with or derived from the received response message.

Figure 7:
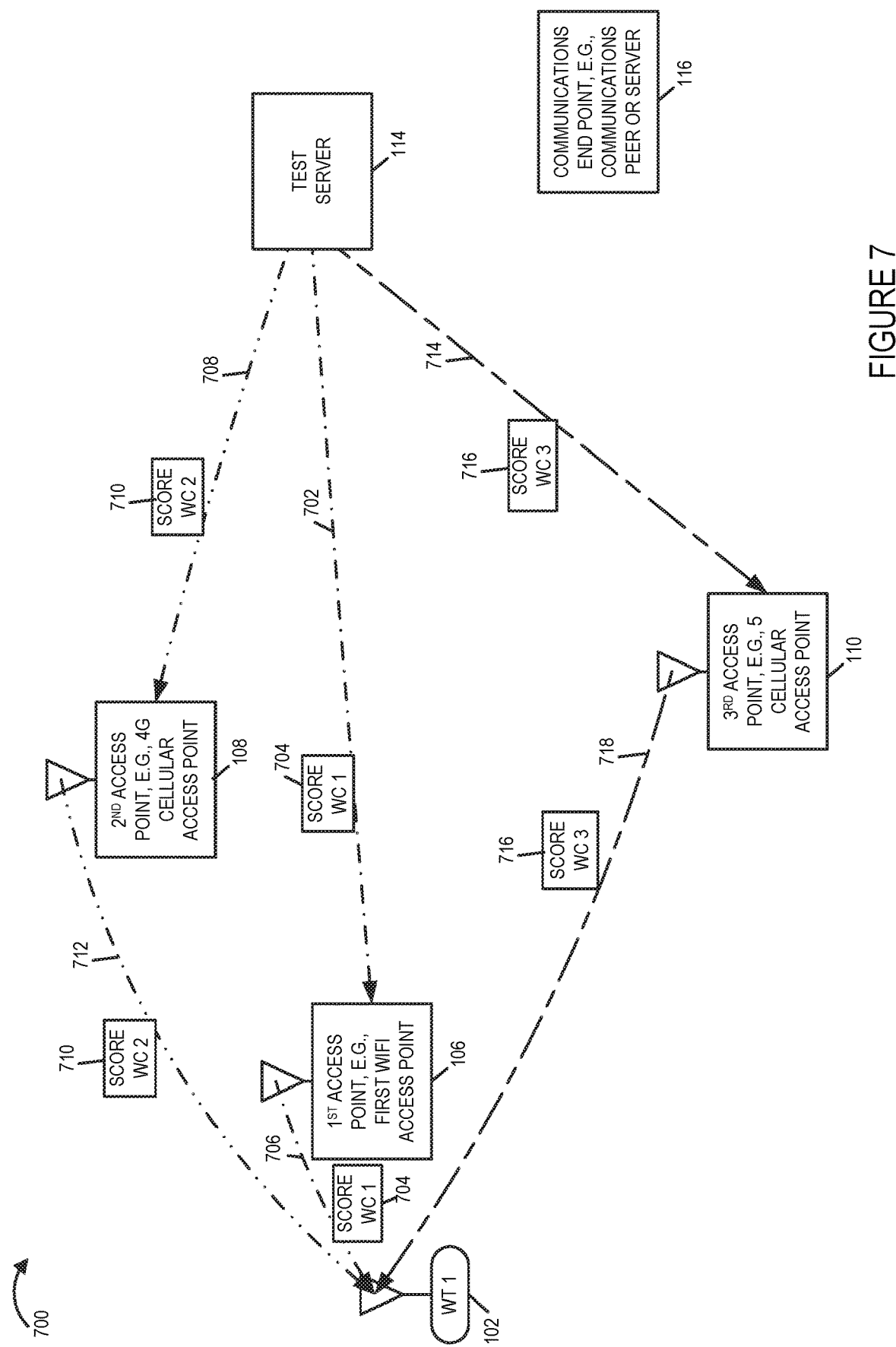
FIG. 7 is a drawing illustrating exemplary response messages, optionally including test scores, being sent from test server to a wireless terminal in accordance with an exemplary embodiment.

FIG. 7 is a drawing 700 illustrating exemplary response messages, optionally including test scores, being sent from test server 114 to WT 1 102 of the system 100 of FIG. 1 in response to test packets, in accordance with an exemplary embodiment. In response to received TP WC 1 604, test server generates and sends a response message 702 to WT 1. In some embodiments, the response message 702 communicates a test server generated score for the first wireless connection, which is score WC 1 704. The first AP 106 receives message 702 and communicates the message 702 via wireless signal 706. In some embodiments, wireless signal 706 includes score WC 1 704, which is recovered by WT 1 102.

In response to received TP WC 2 610, test server 114 generates and sends a response message 708 to WT 1 102. In some embodiments, the response message 708 communicates a test server generated score for the second wireless connection, which is score WC 2 710. The second AP 108 receives message 708 and communicates the message 708 via wireless signal 712. In some embodiments, wireless signal 712 includes score WC 2 710, which is recovered by WT 1 102.

In response to received TP WC 3 616, test server 114 generates and sends a response message 714 to WT 1 102. In some embodiments, the response message 714 communicates a test server generated score for the third wireless connection, which is score WC 3 716. The third AP 110 receives message 714 and communicates the message 714 via wireless signal 718. In some embodiments, wireless signal 718 includes score WC 3 716, which is recovered by WT 1 102.

Figure 8:
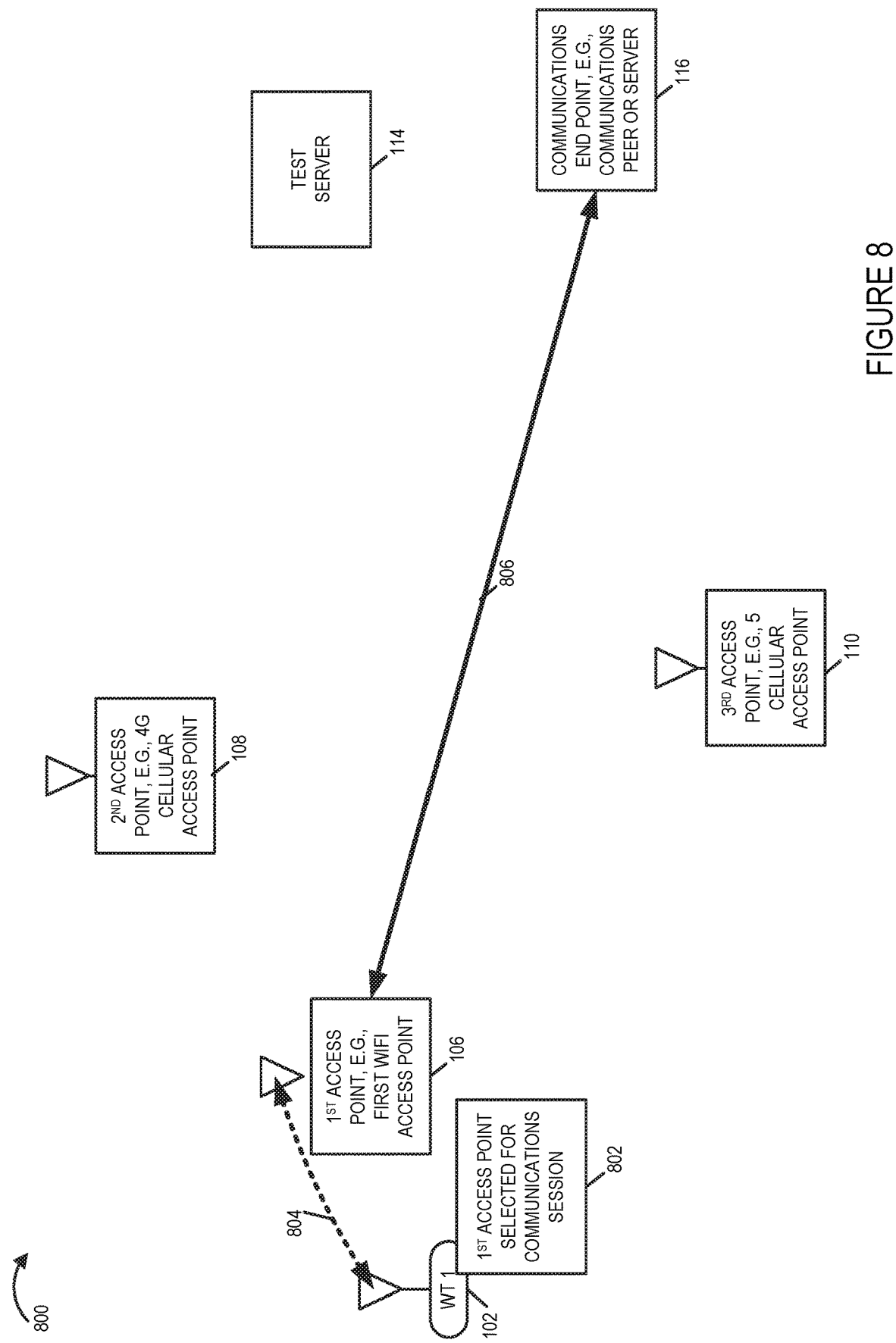
FIG. 8 is a drawing illustrating an exemplary wireless terminal selecting an access point to use from a plurality of alternative access point for a communications session with a communications end point, the selection being based on scores characterizing the alternative wireless communications connections which were tested, in accordance with an exemplary embodiment.

FIG. 8 is a drawing 800 illustrating an exemplary wireless terminal 102 selecting an access point 106 to use from a plurality of alternative access point (106, 108, 110) for a communications session with a communications end point 116 in accordance with an exemplary embodiment. In the example, of FIG. 8, based on the wireless connection scores (704, 710, 712) received by the WT 1 102 or the scores derived from the received response messages of FIG. 7, and WT score adjustment information, e.g., based on type of wireless network, in step 802 WT 1 102 selects to use first access point 106 for the communications session with end point 116. Dashed line 804 and solid line 806 are used to represent the communications path for the communications session between WT 1 102 and end point 116.

Various aspects and/or features of some embodiments of the present invention are further discussed below.

In a communications system, with multiple available radios, e.g., 4G, 5G, Wi-Fi, etc., a wireless terminal, e.g., a mobile WT, can, and sometime does, negotiate multiple network connection each with a unique IP address tied to the infrastructure. In some embodiments, in order to determine which available network to use, a WT, e.g., WT including a client, performs, e.g., continuously performs, line quality testing to score each of the available alternative wireless links. The WT, e.g., WT including the client, performs quality testing to an available network endpoint, e.g. a test server. In some embodiments, the score of each wireless link is based on the performance of a previous number, e.g., a predetermined previous number, of test packets, communicated over the wireless link being evaluated, such that more recent performance carries more weight in the scoring. In some such embodiments, the predetermined previous number of test packets used to generate a score for a wireless link is 20.

In some embodiments, 50% of a generated score for a wireless connection, e.g., wireless link, is based on the last 5 test packets, and 50% of the score is based on the 15 test packets before the last 5 test packets.

Because many wireless devices may be, and usually are, mobile, and the infrastructure, e.g., including alternative access points, is fixed, in accordance with a feature of some embodiments, the WT test packet transmission rate is controlled to be slow when the wireless device is stationary, and the WT test packet transmission rate is controlled to be increased based on the speed of the mobile WT including the client, e.g., 0.1 packets per second (PPS)*speed meters/sec, to prevent scoring data from becoming stale during periods of high mobility and to save bandwidth.

In some embodiments, a score is assigned for a wireless connection, e.g. wireless link, being evaluated, based on one or more of all of: packet loss, packet latency, packet jitter, etc. In some embodiments, the test server generates a score for the wireless connections and communications the score to the WT. In other embodiments, the WT generates the score based on a received response message from the test server, in response to a transmitted test packet. In still other embodiments, both the WT and test server contribute to the generated score for the wireless connection being evaluated. In one exemplary embodiment, a score of 10 is perfect, and a score of approximately 5 is considered acceptable.

In some embodiments, to intentionally prefer less expensive networks, e.g. WiFi networks to more expensive networks, e.g., cellular networks such as 4G cellular networks, the score of a wireless connection corresponding to a network is weighted by the network cost. In one such embodiment, the network cost for WiFi is 0, and the network cost of a 4G cellular network is −3. In such an embodiments, if a WT including a client has a performance score of 8 for wireless communications over a WiFi network and a score of 8 for wireless communications over a 4G cellular network, the WT would adjust the scores, such that the adjusted score for the WiFi network is 8 and the adjusted score for the 4G network is 5. Therefore, the WT selects to use the WiFi network which has a higher adjusted score.

In some embodiments, if each of the unadjusted scores is below a predetermined acceptable performance score, e.g., below a score of 5, then the WT including the client prefers and selects the best performing network ignoring cost, e.g., the WT selects the network which corresponds to the highest unadjusted score.

Figure 9:
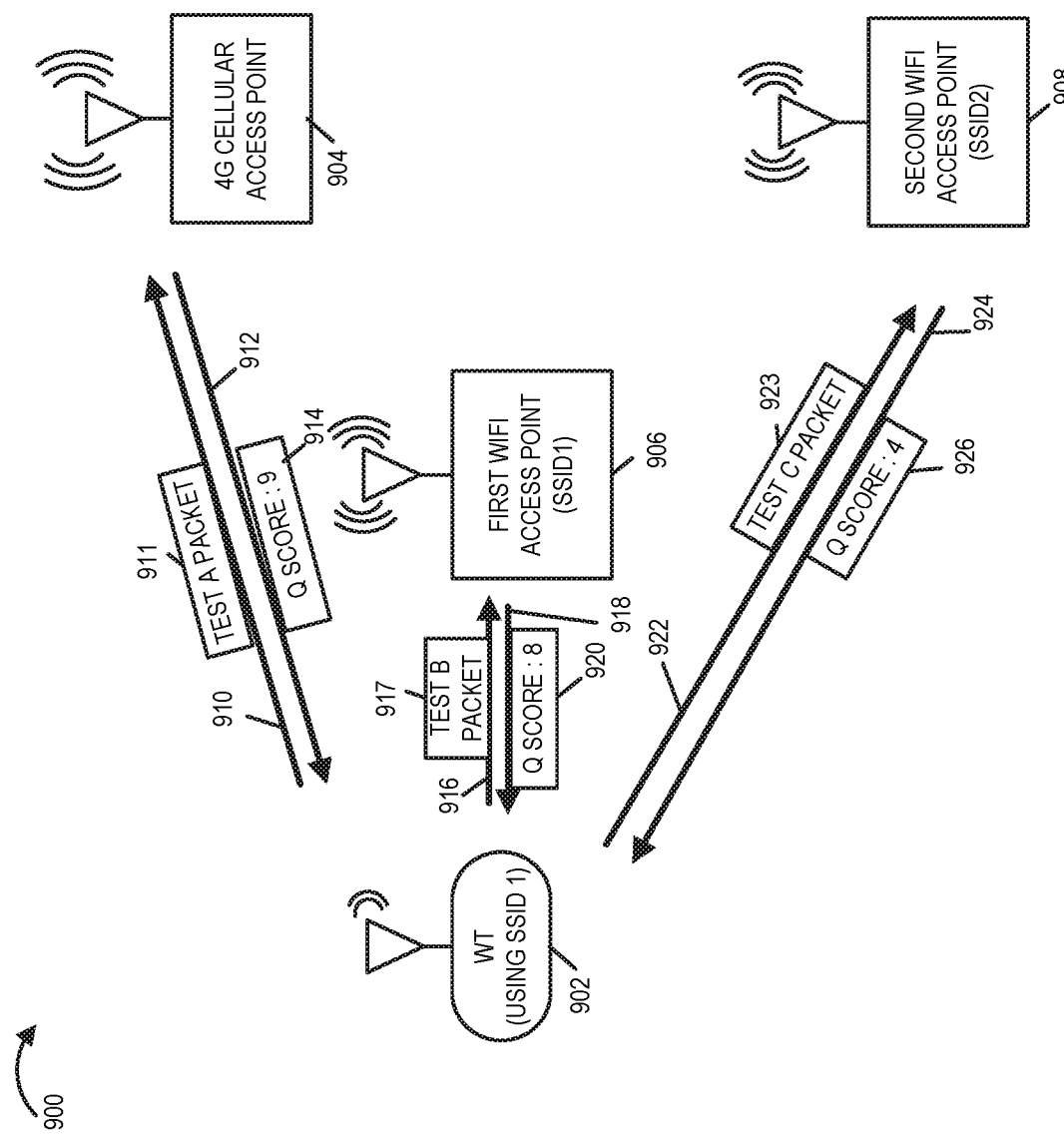
FIG. 9 is a drawing illustrating a mobile wireless terminal selecting to use a first WiFi access point from among a plurality of alternative wireless access points in accordance with an exemplary embodiment.

FIG. 9 is a drawing 900 illustrating a mobile wireless terminal 902 selecting to use a first WiFi access point 906 from among a plurality of alternative wireless access points in accordance with an exemplary embodiment. The communications system of FIG. 9 includes a 4G cellular access point 904, a first WiFi access point 906 with SSID1, and a second WiFi access point 908 with SSID2. WT 902 has wireless connections with each of the alternative wireless access points (904, 906, 908).

WT 902 transmits signal 910 including a test packet 911 to 4G access point 904. WT 902 receives a signal 912 from 4G cellular access point 904 communicating a wireless communications connection quality score 914. In this example the quality score 914 is 9 for the wireless connection between WT 1 902 and 4G cellular access point 904.

WT 902 transmits signal 916 including a test packet 917 to first WiFi access point 906. WT 902 receives a signal 918 from first WiFi access point 906 communicating a wireless communications connection quality score 920. In this example the quality score 920 is 8 for the wireless connection between WT 1 902 and first WiFi access point 906.

WT 902 transmits signal 922 including a test packet 923 to second WiFi access point 908. WT 902 receives a signal 924 from second WiFi access point 908 communicating a wireless communications connection quality score 926. In this example the quality score 926 is 4 for the wireless connection between WT 1 902 and second WiFi access point 908.

In this example WT 902 selects to use first WiFi access point 906 with SSID 1 for communications with a communications end point for a communications session based on the received scores (9, 8, and 4) from the access points (904, 906, 908), respectively and score processing criteria, e.g., weighting criteria. In various embodiments, scores from different types of wireless access points are treated differently, e.g., based on network cost. In one exemplary embodiment, a received score corresponding to a WiFi network is unchanged; and a received score greater than or equal to 5 corresponding to a 4G cellular network is reduced by 3. Thus WT 1 902 processes the received scores (9, 8, and 4) corresponding to (a 4G network, a first WiFi network, and a second WiFi network), respectively, and obtains processed scores of: (6, 8, and 4), respectively. If at least one of the processed scores is greater than or equal to 5, then WT 902 selects the highest processed score. Thus, in this example WT 902 selects the first WiFi network with SSID1 corresponding to first WiFi access point 906 to use, since it has the highest processed score, which is a value of 8. In some embodiment, if none of the processed scores are greater than or equal to 5, then WT 9 selects the wireless network corresponding to the highest received score to use.

Figure 10:
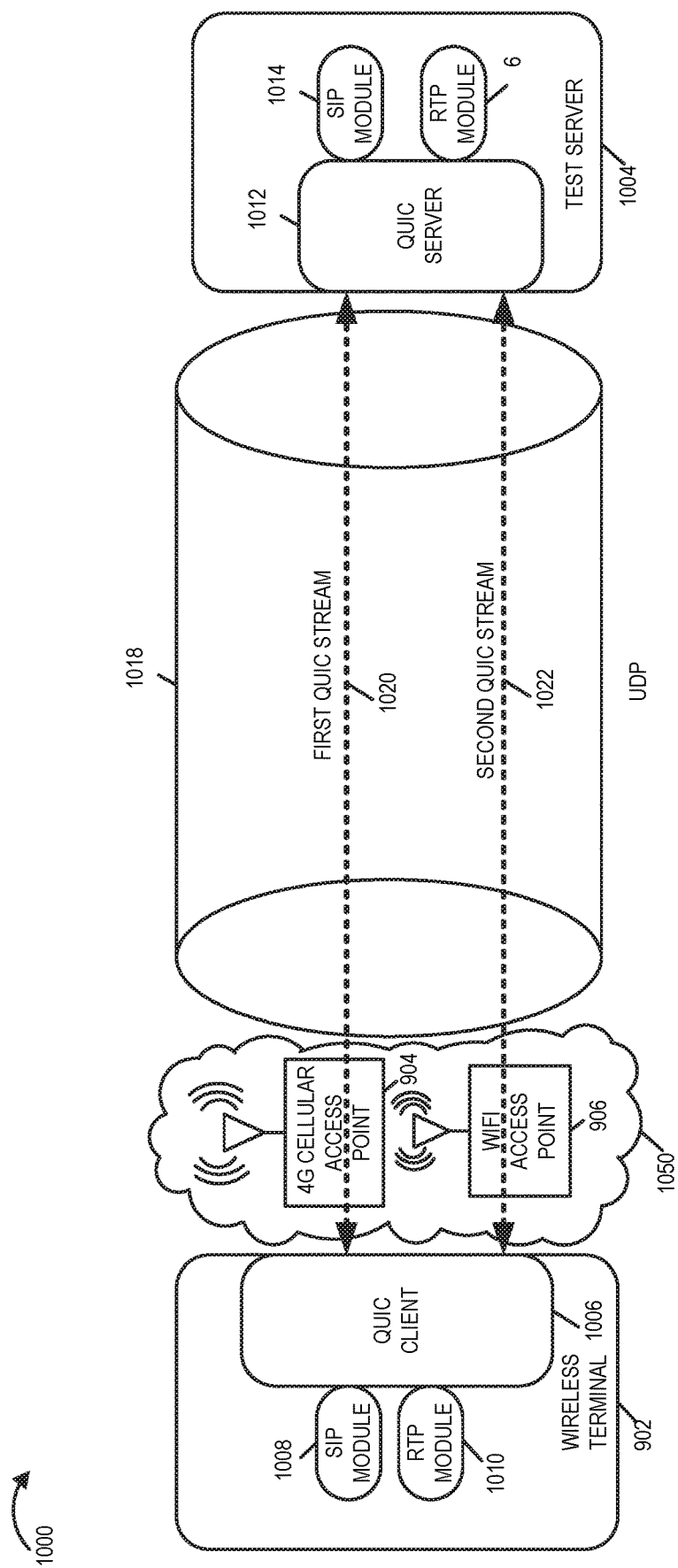
FIG. 10 is a diagram illustrating SIP+QUIC usage in accordance with an exemplary embodiment.

FIG. 10 is a diagram 1000 illustrates Session Initiation Protocol (SIP)+Quick Internet Connection (QUIC) usage in accordance with an exemplary embodiment. Drawing 1000 illustrates exemplary wireless terminal 902, which supports a plurality of alternative wireless interfaces, e.g., WiFi, 4G cellular, 5G cellular, etc., and a test server 1004 implemented in accordance with an exemplary embodiment. WT 902 includes a QUIC client 1006, a SIP module 1008 and an Real Time Transport Protocol (RTP) module 1010. Test server 1004 includes a QUIC server 1012, a SIP module 1014 and an RTP module 1016. Wireless networks 1050 includes 4G cellular access point 904 and WiF access point 906. A first communications connection is established between WT 901 and test server 1004 over which a first QUIC stream 1020 is communicated, via 4G cellular access point 1020. A second communications connection is established between WT 901 and test server 1004 over which a second QUIC stream 1022 is communicated, via WiFi access point 906. Test packets are sent by WT 902 directed to test server 1004 over first QUIC stream 1020 and responses and/or scores are returned in response to the test packets over the first QUIC stream, said test packets and corresponding responses and/or scores being used to evaluate and characterize the quality of wireless communications link between WT 1 902 and the 4G cellular access point 904. Similarly, test packets are sent by WT 902 directed to test server 1004 over second QUIC stream 1022 and response and/or scores are returned in response to the test packets over the second QUIC stream, said test packets and corresponding responses and/or scores being used to evaluate and characterize the quality of wireless communications link between WT 1 902 and the WiFi access point 906. In various embodiments, the first QUIC stream 1020 communicates User Datagram Protocol (UDP) packets, and the second QUIC stream 1022 communicates UDP packets.

In various embodiments, QUIC is used for testing the alternative wireless communication links, e.g., sending test packets and receiving responses and/or quality scores. Various advantageous features of QUIC are described below. Application proto can be, and sometimes is, encapsulated inside a QUIC tunnel, e.g. QUIC tunnel 1018. QUIC uses Connection ID to identify traffic independent of the IP address used. QUIC supports multiplexing (sent over multiple links). QUIC supports Forward Error Correction (data assembled through packet loss without retransmit.) QUIC has minimal setup time compared to TCP and supports 0 RTT TLS (security without handshake).

Figure 11:
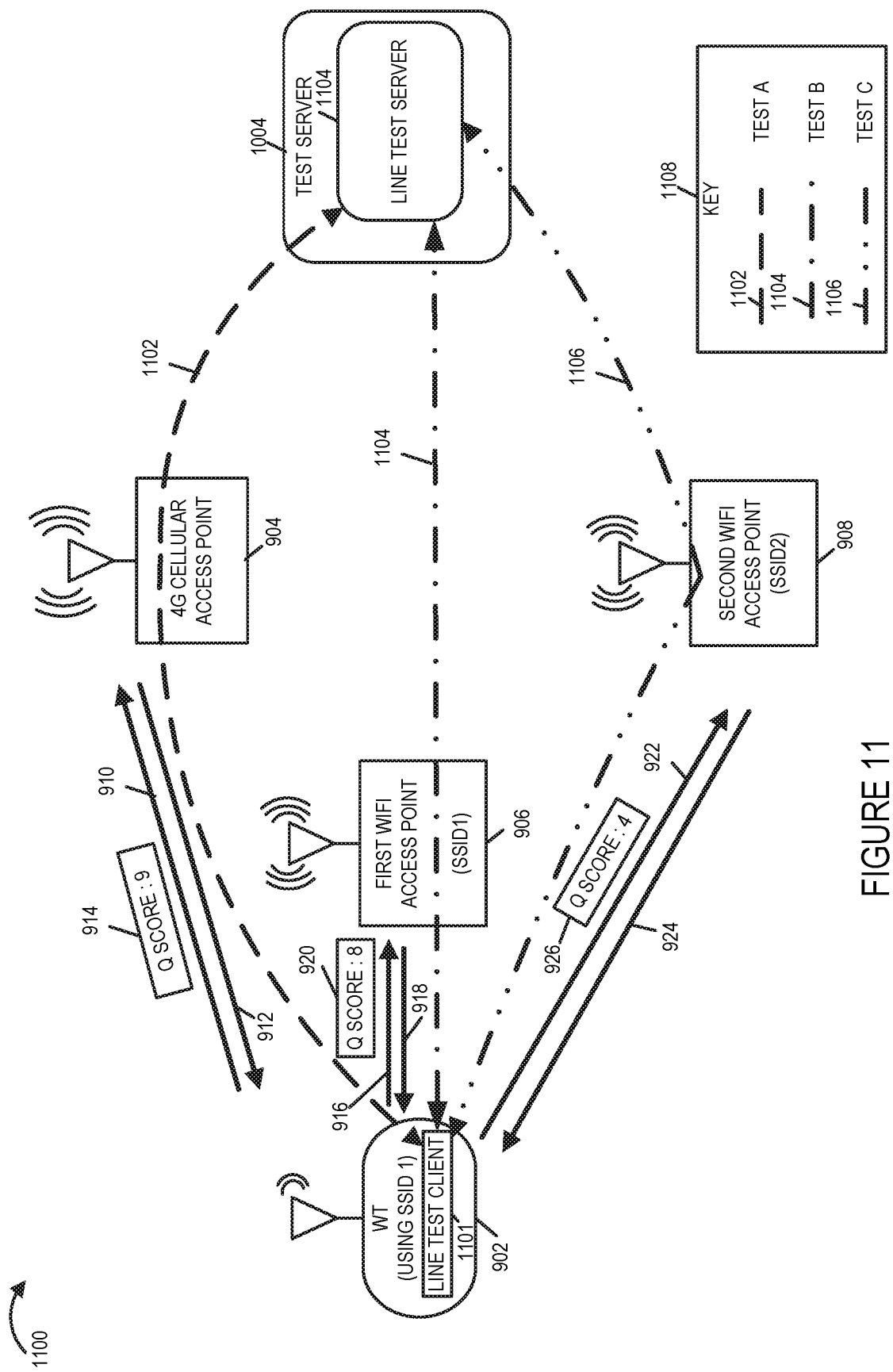
FIG. 11 is a drawing illustrating exemplary simultaneous testing to determine a path in accordance with an exemplary embodiment.

FIG. 11 is a drawing 1100 illustrating exemplary simultaneous testing to determine a path in accordance with an exemplary embodiment. FIG. 11 includes the elements and signaling of the example of FIG. 9 and further includes test server 1004 including line test server 1104. WT 902 includes line test client 1101. Key 1108, indicates that dashed line 1102 corresponds to test A, dot/dash line 1104 corresponds to test B, and dash/dot/dot line 1106 corresponds to test C.

Dashed line 1102 represented a communications connection between line test client 1101 of WT 902 and line test server 1004, said communications connection including a wireless connection between WT 1 902 and 4G cellular access point 904. A test A test packet is sent over connection 1102 via 4G cellular access point 904 to test server 1004, which is response sends back a test score or a response message used to derive a test score over connection 1102.

Dot/Dash line 1104 represents a communications connection between line test client 1101 of WT 902 and line test server 1004, said communications connection including a wireless connection between WT 1 902 and first WiFi access point 906. A test B test packet is sent over connection 1104 via first WiFi access point 906 to test server 1004, which is response sends back a test score or a response message used to derive a test score over connection 1104.

Dash/Dot/Dot line 1106 represents a communications connection between line test client 1101 of WT 902 and line test server 1004, said communications connection including a wireless connection between WT 1 902 and second WiFi access point 908. A test C test packet is sent over connection 1106 via second WiFi access point 908 to test server 1004, which is response sends back a test score or a response message used to derive a test score over connection 1106.

The received test scores or test scores generated by WT 1 902 based on received response messages are used by WT 1 902, e.g., as described with respect to FIG. 9, to select which of the plurality of alternative wireless links to use for a communications session with an end point. In this example, WT 902 selects to use the wireless link to first WiFi AP 906, with SSID 1.

Figure 12:
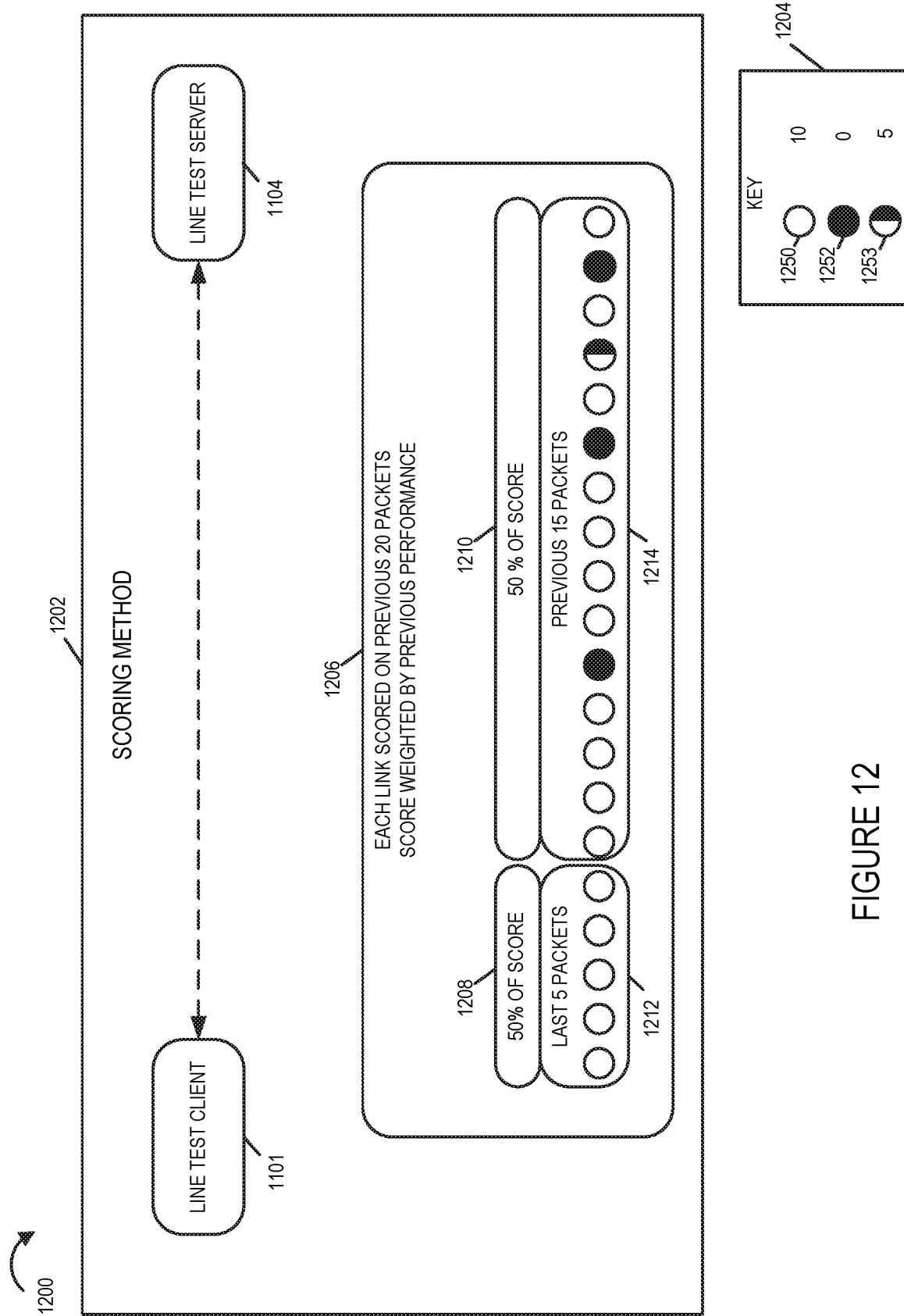
FIG. 12 is a drawing illustrating an exemplary scoring method for scoring a wireless communications connection, e.g., wireless link, in accordance with an exemplary embodiment.

FIG. 12 is a drawing 1200 including block 1202 illustrating an exemplary scoring method for scoring a wireless communications connection, e.g., wireless link, in accordance with an exemplary embodiment, and a corresponding key 1204 for identifying individual packet scores. In some embodiments, test packets are transmitted, e.g., continuously, for a wireless connection being evaluated. In some embodiments, the wireless connection score is based on scores corresponding to a previous predetermined number, e.g., 20, test packets, and is weighted to give more emphasis to the more recent packets. This approach is advantageous to allow traffic to be shifted between alternative wireless connections, e.g., as degradation is detected on a particular wireless connection or improvement is detected on a particular wireless connection.

Key 1204 indicates that a white circle 1250 is used to represent a score of 10 for a test packet, that a black circle 1252 is used to represent a score of 0 for a test packet, and a half white/half black circle 1253 is used to represent a score of 5 for a test packet. The scoring method of block 1202 is used for scoring a wireless communication connection based on scored test packets communicated over a communications connection between line test client 1101, e.g., in wireless terminal 902, and line test server 1104, e.g., in test server 1004, said communications connection including a wireless connection which is being evaluated, e.g., a wireless connection between WT 902 and a wireless access point, e.g., one or AP (904, 906, 908).

Block 1206 indicates that each wireless link is scored based on the previous 20 packets scores, e.g., values in the range of 0 to 10, weighted by previous performance. In this exemplary implementation a generated wireless link score is based on 50% of the score of the last 5 packets as indicated by block 1208 and 50% of the score of the previous 15 packets as indicated by block 1210. Blocks 1212 and 1214 are used to illustrate one example. The last 5 packets are all very successful giving total score of 5×10=50. With regard to the previous 15 packets, 13 were very successful and 3 were total failures and 1 was acceptable, giving a total score of (11×10)+(1×5)+(3×0)=115. The weighed score is: (0.5)(50)/(5)+(0.5)(115)/(15)=8.83.

In some embodiments, test packet transmission rate is controlled to increase with wireless terminal speed. Mobile clients move, but infrastructure remains fixed meaning that network performance is typically static while a client is stationary. To avoid high bandwidth usage the default test packet transmission rate is slow and is increased with client speed based on data available from a PGS and/or accelerometer, e.g., including in an IMU, in the wireless terminal.

In one embodiment, the formula used for determining test packet rate is: PacketRate=0.1 PPS*Speed in meters/sec (up to 30 m/s or approximately 67 MPH). In some such embodiments, where speed is <1 m/s, a value of 1 m/s is used in the packet rate transmission determination equation. This allows adaptation to faster infrastructure changes associated with increased speed. In some embodiments, a technology based cost penalty is reduced at a rate consistent with the speed to improve reliability.

Various aspects and features of wireless communications connection, e.g., wireless link, scoring in some embodiments, will now be described. In some embodiments, a score of 10 is perfect and a score of 5 is acceptable. In some embodiments, cost is assigned to the score, e.g., based on type of network, e.g., such that for a 4G wireless connection, the cost is, e.g., −3, and for a WiFi wireless connection, the cost is 0. Consider the following example, with the costs (0, −3) applied to a WiFi connection with a score of 7 and a 4G network connection with a score of 9, the cost adjusted scores would be 7 for the WiFi connection and 6 for the 4G connection, causing the client to prefer WiFi. In some embodiments, with a score of 5 or below, e.g., for each of the alternative connection being evaluated, the cost is no longer evaluated and the best performing network is used without taking cost into consideration. In some embodiments, cost is decayed linearly with speed, e.g., WT speed, to help ensure reliability during travel. In some embodiments, if fewer than a predetermined number of test packets, e.g., 20 test packets, have been transmitted, the scoring for a wireless connection is based on the number available, e.g., providing a fast start of scoring.

Figure 13:
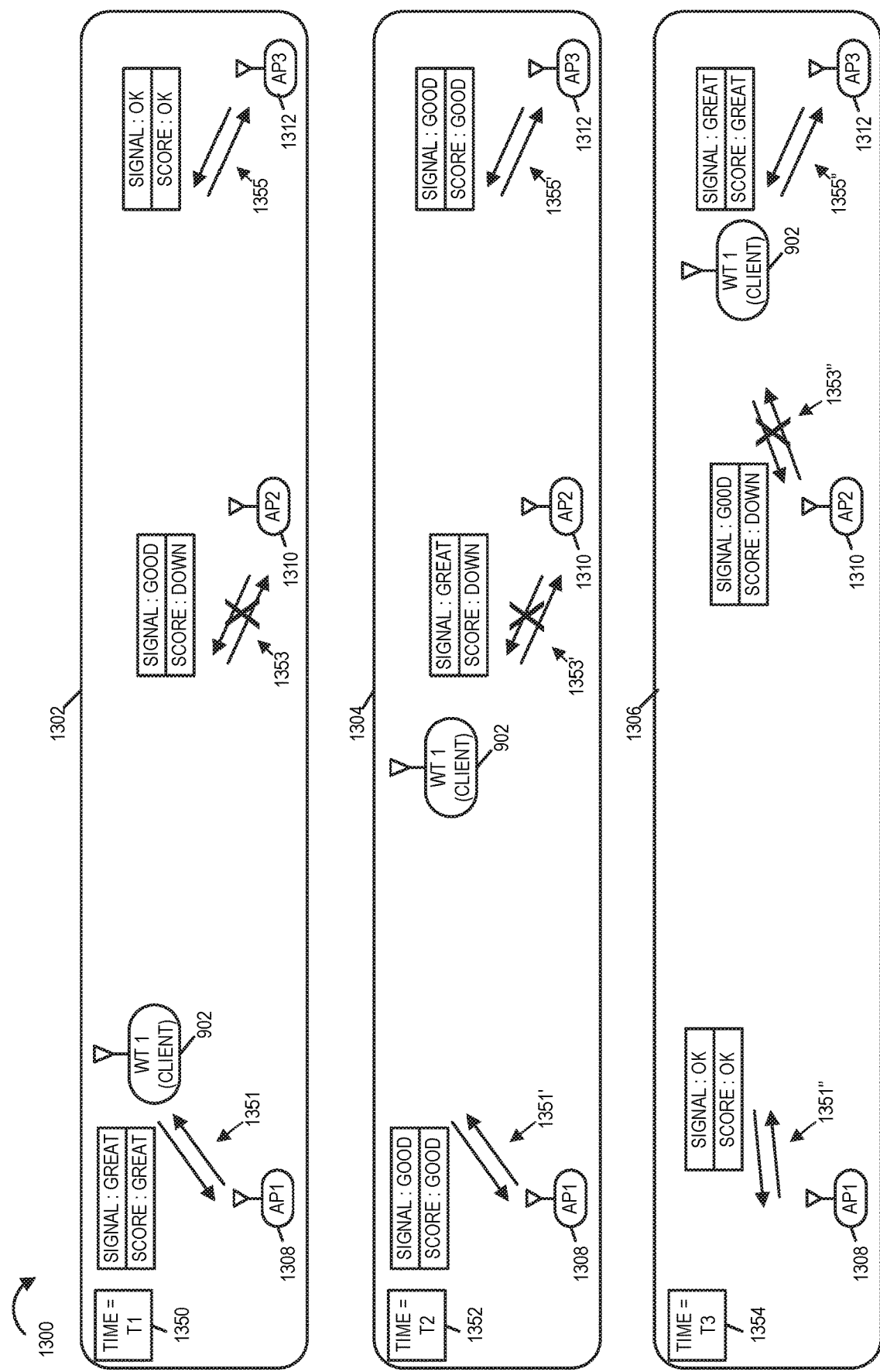
FIG. 13 is a drawing illustrating an example in which wireless communications connection scores shift with client movement, in accordance with an exemplary embodiment.

FIG. 13 is a drawing 1300 illustrating an example in which wireless communications connection scores shift with client movement, in accordance with an exemplary embodiment. Block 1302 corresponds to time T1 1350 during which WT 1 (client) 902 is located in the vicinity to access point 1 (AP 1) 1308. Based on the distance between WT 1 902 and AP 1 the signal quality should be great. In this example, the connection testing for wireless connection 1351 indicates that the connection score is great, e.g., a score value of 9 is obtained. Based on the distance between WT 1 902 and AP 2 1310 the signal quality should be good. In this example, the connection testing for wireless connection 1353 indicates that the connection is down, e.g., a score value of 0 is obtained. Based on the distance between WT 1 902 and AP 3 1312 the signal quality should be OK. In this example, the connection testing for wireless connection 1355 indicates that the connection is OK, e.g., a score value of 5 is obtained.

Block 1304 corresponds to time T2 1352 during which WT 1 (client) 902 is located in the vicinity to access point 2 (AP 2) 1310. Based on the distance between WT 1 902 and AP 1 1308 the signal quality should be good. In this example, the connection testing for wireless connection 1351' indicates that the connection score is good, e.g., a score value of 7 is obtained. Based on the distance between WT 1 902 and AP 2 1310 the signal quality should be great. In this example, the connection testing for wireless connection 1353' indicates that the connection is down, e.g., a score value of 0 is obtained. Based on the distance between WT 1 902 and AP 3 1312 the signal quality should be good. In this example, the connection testing for wireless connection 1355' indicates that the connection is good, e.g., a score value of 6.8 is obtained.

Block 1306 corresponds to time T3 1354 during which WT 1 (client) 902 is located in the vicinity to access point 3 (AP 3) 1312. Based on the distance between WT 1 902 and AP 1 1308 the signal quality should be OK. In this example, the connection testing for wireless connection 1351" indicates that the connection score is ok, e.g., a score value of 5 is obtained. Based on the distance between WT 1 902 and AP 2 1310 the signal quality should be good. In this example, the connection testing for wireless connection 1353" indicates that the connection is down, e.g., a score value of 0 is obtained. Based on the distance between WT 1 902 and AP 3 1312 the signal quality should be great. In this example, the connection testing for wireless connection 1355" indicates that the connection is great, e.g., a score value of 9.5 is obtained.

Consider that each of the APs (1308, 1310, 1312) are WiFi access points and thus no score cost reductions are applied. Based on the testing of block 1302, the WT 1 902 selects the connection to AP 1 1308. Based on the testing of block 1304, the WT 1 902 selects the connection to AP 1 1308. Based on the testing of block 1306, the WT 1 902 selects the connection to AP 3 1312.

Various aspects of conserving resources in some embodiments will now be described. In some embodiments, a WT will not be transmitting data for line testing, e.g., sending test packets, unless a Push notification (phone call) is received. This approach will save battery energy by not using the WT transmitter unnecessarily. In some embodiments when a fixed client, e.g., a stationary WT, has an acceptable WiFi connection there is no need to perform testing and using bandwidth on 4G or 5G radio, and thus testing is not performed on the 4G or 5G radio. In some embodiments, to prevent flaps, a minimum threshold (1) must be crossed before a WT, e.g. client, switches wireless connections, e.g., wireless links, unless the currently used link quality is below 5. In some embodiments, flap dampening is used to prevent a WT, e.g., client, from quickly oscillating between alternative connection with similar connection scores.

In some embodiments, when a WT is moving at 10 m/s (22.3 MPH), the packet test rate, for a wireless connection being tested, is 1 packet per second. In some embodiments, test packets are 32-64 bytes.

By communicating IP data and encapsulating data in a UDP protocol that identifies data by connection ID, in accordance with a feature of various embodiments, the client can gracefully change IP addresses. By using a low bandwidth testing method, in accordance with a feature of various embodiments, the client can place traffic on best performing mobile links preferring less expensive (WiFi) over other more expensive technologies, e.g., 4G cellular or 5G cellular, using a scoring method that shifts with client movement based on moving average of most recent test data. In various embodiments, the testing of alternative wireless connections and selection on a wireless connection to use is performed without utilizing much bandwidth or adversely impacting WT battery performance.

In some embodiments, connection testing is performed when a WiFi connection is deemed to be in an unreliable state or in the case of motions and the device may enter an unreliable state. According a 4G cellular connection may not be tested all of the time. When testing is ongoing a score is generated for each wireless connection being evaluated based on the response to test packets received.

In some embodiments, to conserve power and bandwidth when connection tests are ongoing the rate of transmission of test packets depends on the rate of motion. In some embodiments, connection score generation weights more recently received test packet responses more heavily than old test packet responses.

In some embodiments, packet jitter, round trip time and packet loss on a connection are checked and may contribute to the score for a connection. The service provider can push to the client policy rules to be used in making a connection selection, e.g., WiFi over 4G based on quality link issues. A client selects a wireless link to use at a given time based on per connection scores and policy.

Various aspects and/or features of some embodiments of the present invention related to bandwidth usage will be described. In some embodiments, if a WT, e.g., a mobile UE, is moving a 10 meters/sec, the packet test rate is 1 packet per second. At a maximum MTU of 1500 bytes, which may be overkill, it would represent 12 kbps (bits) or almost 1000× less than streaming 1080p video. In some embodiments, actual test packets are at 32-64 bytes. VoIP codecs also use a small amount of data compared to streaming video.

Figure 14:
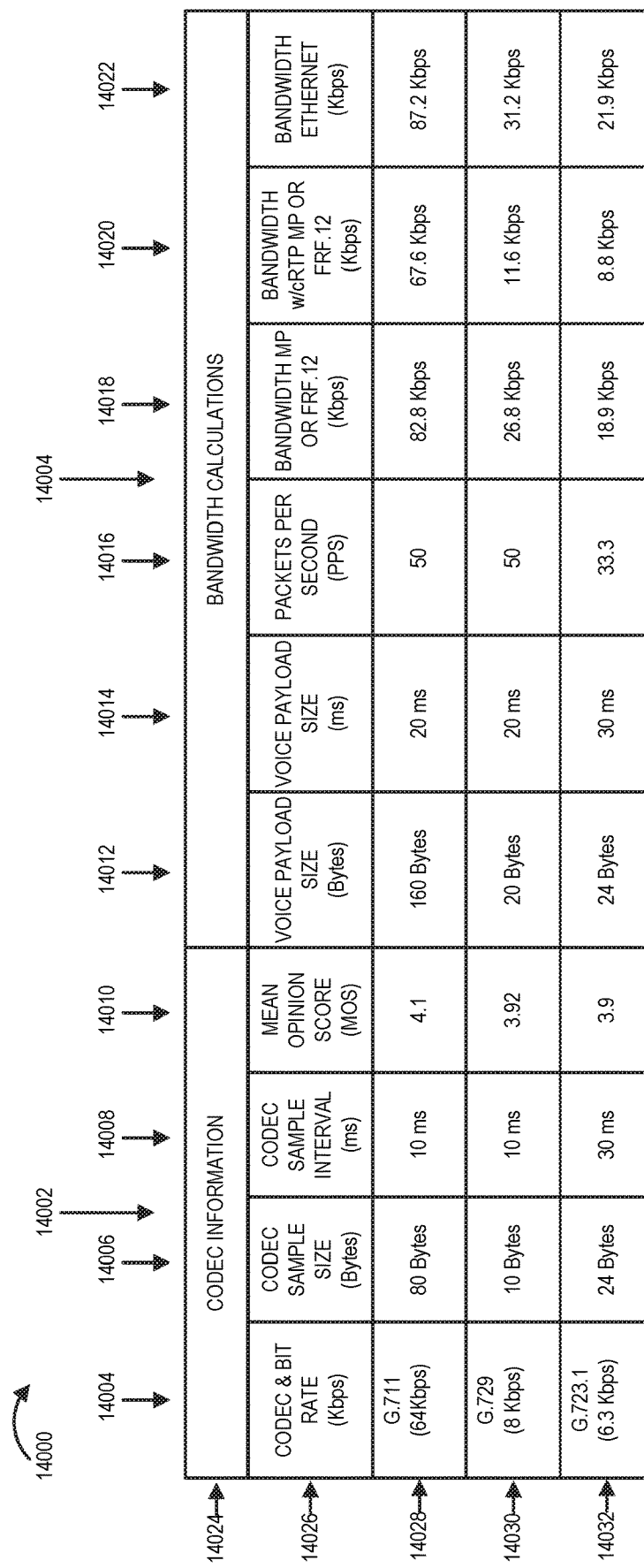
FIG. 14 is a table illustrating codec information and corresponding bandwidth calculation corresponding to a plurality of alternative exemplary codecs.

FIG. 14 is a table 14000 illustrating codec information and corresponding bandwidth calculation corresponding to a plurality of alternative codecs. Section 14002 of table 14000 includes codec information and section 14004 of table 14000 includes bandwidth calculations. First column 14004 includes codec and bit rate information. Second column 14006 includes codec sample size information. Third column 14008 includes codec sample interval information. Fourth column 14010 includes mean opinion score (MOS) information. Fifth column 14012 includes voice payload size information in bytes. Sixth column 14014 includes voice payload size information in milli-seconds (ms). Seventh column 14016 includes packet per second information. Eighth column 14018 includes bandwidth MP or FRF.12 information. Ninth column 14020 includes bandwidth w/cRTP MP or FRF.12 information. Tenth column 14022 includes bandwidth Ethernet information.

First row 14024 identifies columns in which the column information is codec information and columns in which the column information is bandwidth calculation information. Second row 14026 includes information identifying the type of information included in each column. Third row 14028 includes information corresponding to codec G.711 and a bit rate of 64 kbps. Fourth row 14030 includes information corresponding to codec G.729 and a bit rate of 8 kbps. Fifth row 14032 includes information corresponding to codec G.723.1 and a bit rate of 6.3 kbps.

In accordance with a feature of some embodiments, multiplexing+forward error correction (FEC) is used to overcome packet loss. Because VoIP codecs such as G.729 use a small amount of network bandwidth, the bandwidth increase from using a strong FEC or multiplexing (mirroring) is still minimal. In various embodiments, by intelligently monitoring line quality, e.g., in accordance with a feature of some embodiments of the present invention, a connection manager can, and sometimes does, signal to QUIC to multiple data and increase the FEC used to overcome multiple connection or in anticipation of needing to transition between networks. For example, in some embodiments, multiplexing is performed over 4G cellular in anticipation of needing to break before make on the active WiFi connection.

In some embodiments, multiplexing+forward error correction (FEC) is used. In some embodiments, the data to be communicated for a communications session between two end points, e.g., two UEs, is mirrored, e.g., the same data is communicated over a first communications path corresponding to the connection and a second communications path corresponding to the connection. In one example, the first communications path and the second communication path correspond to the same connection, e.g., a QUIC protocol connection having the same connection identifier. In one example the first communications path includes a WiFi wireless link and the second communications path includes a 4G cellular wireless link.

In some embodiments, data to be communicated is replicated, e.g., fully replicated, in each of the communication paths. In some embodiments, by mirroring the data to the other multiplexed session and fully replicating again inside the FEC, there is a temporary 4X increase in bandwidth (over an approach of no data mirroring and no FEC), but up to 75% packet loss can be sustained without data loss.

Figure 15:
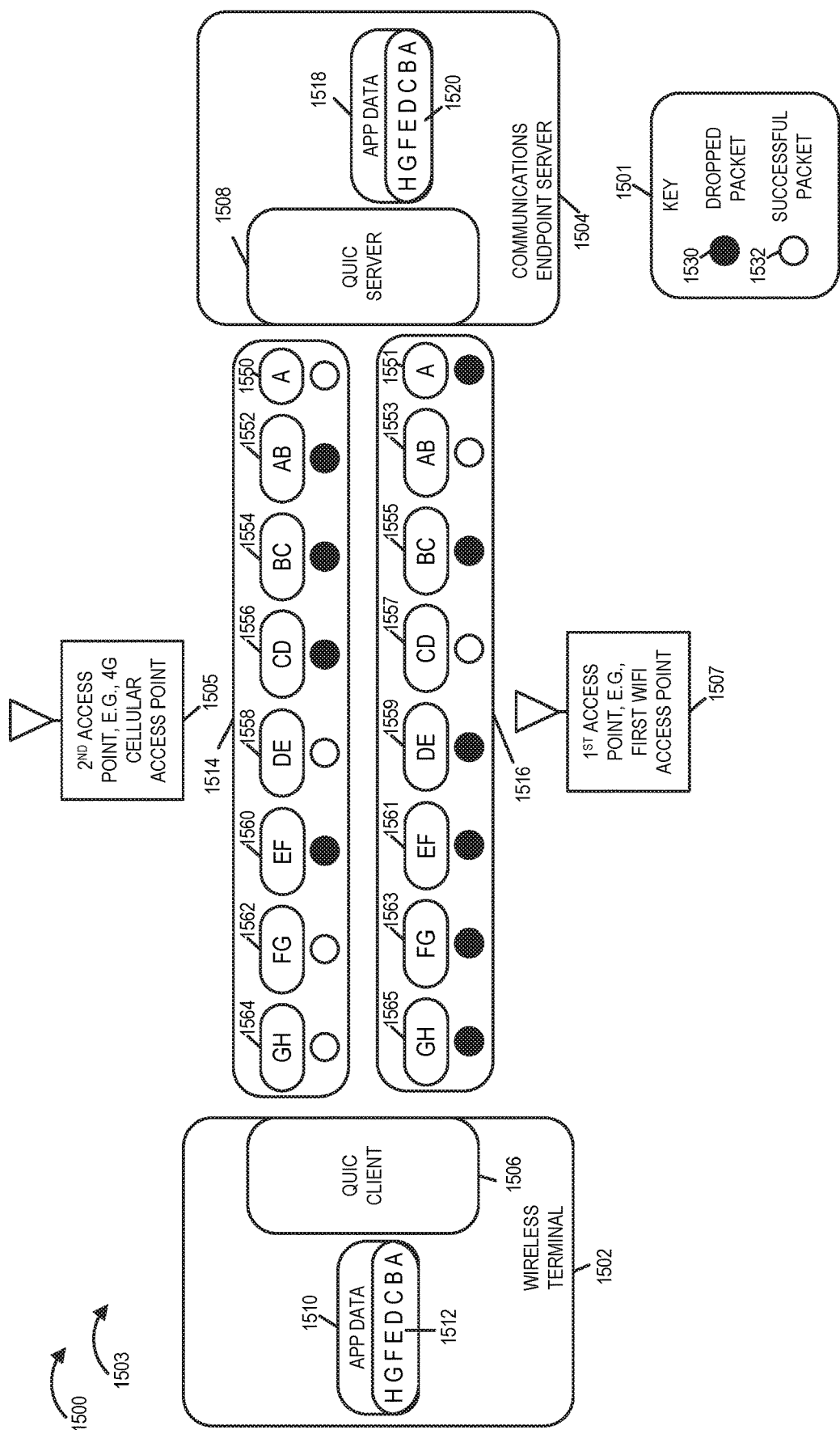
FIG. 15 is a drawing illustrating an example of using multiplexing including data mirroring and forward error correction (FEC) in accordance with an exemplary embodiment.

FIG. 15 is a drawing 1500 illustrating an example of using multiplexing (mirroring) and FEC in accordance with an exemplary embodiment. Drawing 1500 includes diagram 1503 and key 1501. Diagram 1503 includes a wireless terminal 1502, e.g., a mobile UE, a communications session endpoint 1504, e.g., another mobile UE or a server, a 1st access point 1507, e.g., a first WiFi access point, and a second access point 1505, e.g., a 4G cellular access point.

Wireless terminal 1502 includes a QUIC client 1506, and communications endpoint 1504 includes a QUIC server 1508. Wireless terminal 1502 has established a connection, e.g., a QUIC connection with a connection identifier, for a communications session between WT 1502 and communications endpoint 1504. There are two communications paths corresponding to the connection, a first path represented by block 1516 which includes a WiFi wireless link between WT 102 and 1st AP 1507, and a second path represented by block 1518 which includes a 4G cellular wireless link between WT 102 and 2nd AP 1505.

WT 1502 includes application data 1510. Application data 1510 includes a set of data 1512: data A, data B, data C, data D, data E, data F, data G, and data H, to be communicated to communications endpoint 1520. In accordance with a feature of some embodiments, the data will be mirrored, such that the same data is communicated in both of the data streams. In accordance with a feature of some embodiments, FEC is used in each stream such that the same data is communicated twice in a given stream. In some embodiments, QUIC client 1506 performs the mirroring and FEC, e.g., generating packets to be sent over each of the streams 1516, 1514. WT 1502 sends generated first steam packets to endpoint 1504, said sending including transmitting first stream packets to 1st AP 1507, e.g., a WiFi AP. WT 1502 sends generated second steam packets to endpoint 1504, said sending including transmitting first stream packets to 2nd AP 1505, e.g., a 4G cellular AP.

Key 1501 is used to identify which packets are dropped packets and which packets are successful packets in the data streams. In the data stream corresponding to path 1516 which includes the wireless WiFi link, packets 1553 and 1557 are successfully communicated, while packets 1551, 1555, 1559, 1561, 1563, and 1565 are dropped. Thus communications endpoint 1504 recovers data A and data B from packet 1553, and data C and data D from packet 1557.

In the data stream corresponding to path 1514 which includes the wireless 4G cellular link, packets 1550, 1558, 1562 and 1564 are successfully communicated, while packets 1552, 1554, 1556, and 1560 are dropped. Thus communications endpoint 1504 recovers data A from packet 1550, and data D and data E from packet 1558, data F and data G from packet 1562 and data G and data H from packet 1564.

Communications endpoint 1504, e.g., QUIC server 1508 in communications endpoint 1504, recovers communicated data from successful packets from both stream corresponding to the same connection and reassembly the data as recovered data set 1520, which includes data A, data B, data C, data D, data E, data F, data G and data H, and stores the recovered data set 1520 in application data 1518.

Figure 16:
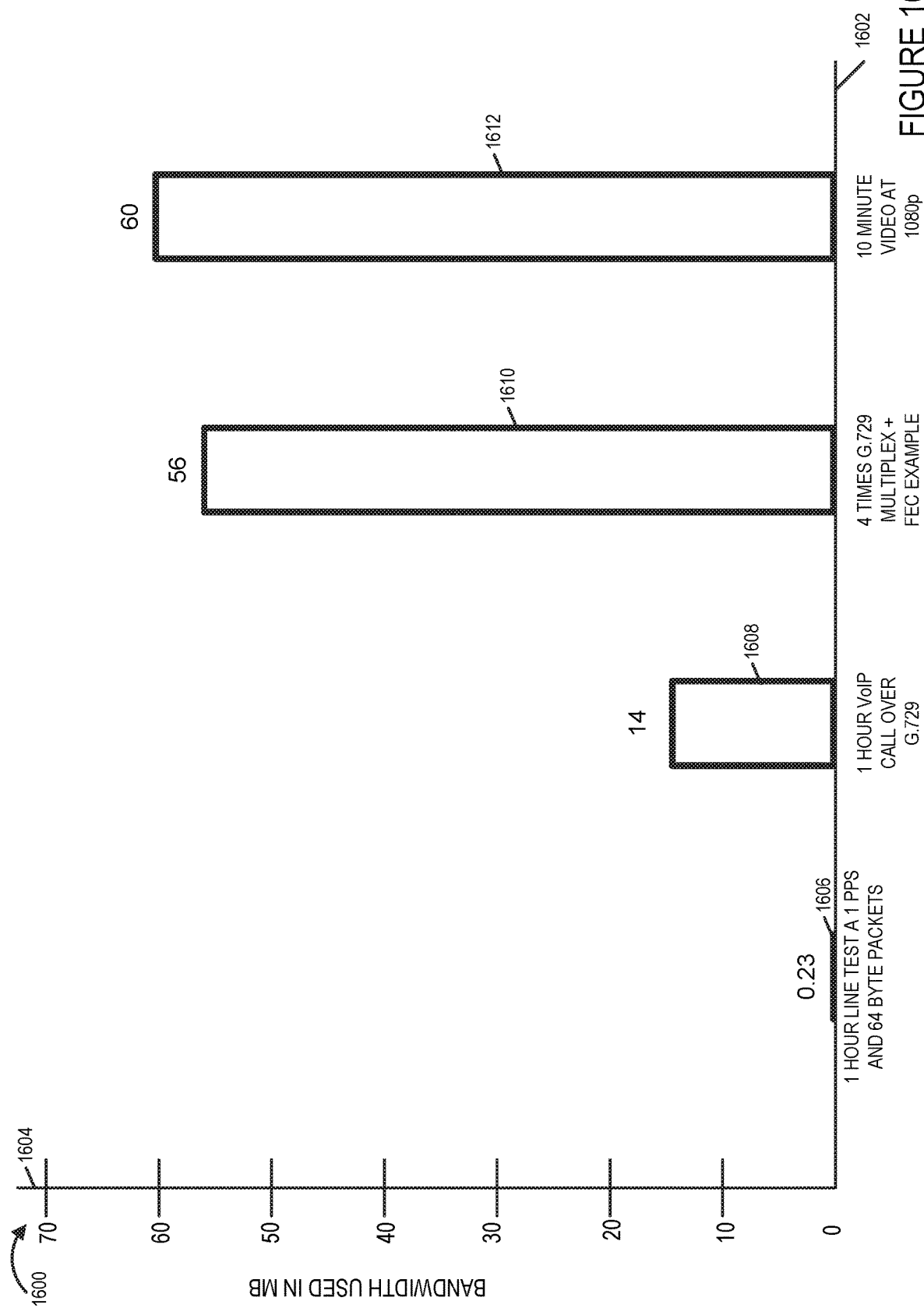
FIG. 16 is a drawing of an exemplary bar chart illustrating comparative amounts of bandwidth for different types of communications including wireless link evaluation testing in accordance with an exemplary embodiment, exemplary VoIP, VoIP including data mirroring and FEC in accordance with an exemplary embodiment, and exemplary video.

FIG. 16 is a drawing of an exemplary bar chart 1600 illustrating bandwidth used in MB on the vertical axis 1604 vs type of communication on the horizontal axis 1602 which illustrates the extremely low amount of bandwidth used to support wireless link testing in accordance with an exemplary embodiment, and the amount of bandwidth used to support multiplexing (data mirroring and FEC) in comparison to video bandwidth. Block 1606 indicates that 0.23 MB of bandwidth is used to communicate 1 hour of line test at 1PPS and using 64 byte packets. Block 1608 indicates that 14 MB of bandwidth is used to communicate 1 hour of VoIP call over G.729. Block 1610 indicates that 56 MB of bandwidth is used to communicate 1 hour of VoIP call over G.729 with multiplex (data mirroring)+FEC. Block 1612 indicates that 60 MB of bandwidth is used to communicate 10 minutes of video at 1080p.

As may be seen in the bandwidth usage comparison bar chart 1600 of FIG. 16, even a full hour call using G7.29 using 2× overhead for mirroring over multiplexed session and 2×FEC overhead is less bandwidth than a 10 minute video at 1080p. In addition, bandwidth (0.23 MB) for the line testing packets hardly registers.

In accordance with a feature of some embodiments, by shifting to predominately or 100% IP data and encapsulating data in a protocol, e.g., a UDP protocol, that identifies data by connection ID, the client, can, and sometimes does, gracefully change IP addresses. In accordance with a feature of some embodiments, by using a low bandwidth line testing method, the client can, and sometime does, place traffic on best performing mobile links preferring less expensive WiFi over more expensive technologies using a scoring method that shifts with client movement based on moving average for most recent data. In accordance with a feature of some embodiments, by using technologies including multiplexing and FEC the client can, and sometimes does, replicate data over multiple paths temporarily allowing packet loss through multiple poor connection or through a break before make transition, e.g., from a first WiFi SSID, corresponding to a first WiFi AP, to a second WiFi SSID, corresponding to a second WiFi AP.

In accordance with one of more features of an exemplary embodiment, by building resiliency into IP and transport layer the physical layer is abstracted making the client agnostic to the particular wireless technology, e.g., WiFi, 4G cellular, 5G cellular, etc., being used and reducing complexity of dealing with future physical layer changes. In various embodiments, in accordance with one or more features of an embodiment of the present invention, this is achieved without much bandwidth and/or without adversely impacting battery performance, e.g., battery performance of the UE.

Figure 17:
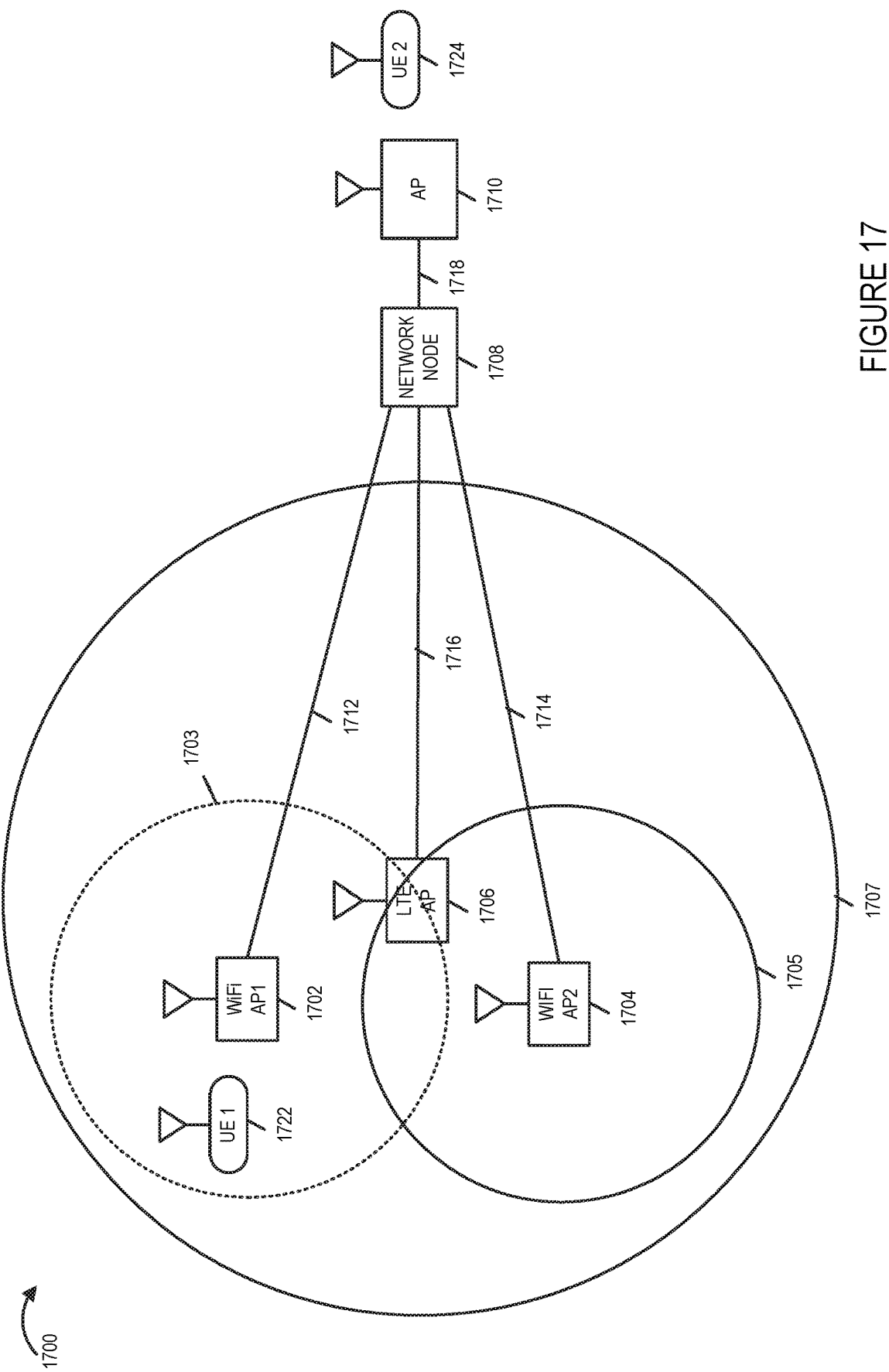
FIG. 17 is a drawing of an exemplary communications system in accordance with an exemplary embodiment.

FIG. 17 is a drawing of an exemplary communications system 1700 in accordance with an exemplary embodiment. Exemplary communications system 1700 includes a first WiFi access point (WiFi AP 1) 1702, a second WiFi access point (WiFi AP 2) 1704, a network node 1708, e.g., a router, and access point 1710, e.g., a WiFi or cellular AP, coupled together as shown in FIG. 17. Exemplary communications 1700 further includes a plurality of user equipment (UE) devices, e.g., multiple wireless terminals supporting communications over a WiFi wireless link and a cellular communications link, said plurality of UE devices including UE 1 1722 and UE 2 1724. UE 1 1722 and UE 2 1724 are, e.g., mobile wireless terminals implemented in accordance with WT 500 of FIG. 5. UE 1 1722 and UE 1724 support end to end connections using a connection based protocol, e.g. QUIC, in which multiple packets streams corresponding to the same connection, with the same connection ID, may correspond to different alternative wireless links.

WiFi AP 1 1702 is coupled to network node 1708 via backhaul link 1712. WiFi AP 2 1704 is coupled to network node 1708 via backhaul link 1714. LTE cellular AP 1706 is coupled to network node 1708 via backhaul link 1716. AP 1710 is coupled to network node 1708 via backhaul link 1718.

UE 1 1722 may, and sometime does, establish and have a first WiFi wireless communications link with WiFi AP 1 1702. UE 1 1722 may, and sometime does, establish and have a second WiFi wireless communications link with WiFi AP 2 1704. UE 1 1722 may, and sometime does, establish and have a LTE cellular wireless communications link with LTE AP 1706. In some embodiments, UE 1 1722 can support one WiFi communications link, e.g., with either WiFi AP 1 1702 or WiFi AP 2, concurrent with a cellular wireless communications link, e.g., with LTE AP 1706. In some such embodiments, UE 1 1722, e.g., due to WiFi interface limitations, cannot support two concurrent WiFi wireless links.

UE 2 1724 may, and sometimes does establish and habe a wireless communications link with AP 1710.

WiFi AP 1 1702 has a corresponding wireless coverage area 1703. WiFi AP 2 1704 has a corresponding wireless coverage area 1705. LTE AP 1706 has a wireless coverage area 1707, which includes coverage areas 1703 and 1705. In some embodiments, a UE 1 1722 handoff of a connection from WiFi AP 1 1702 to WiFi AP2 1704 includes use, e.g., temporary use, of a cellular communications link between UE 1 1722 and LTE AP 1706, in accordance with an exemplary embodiment. In accordance with a feature of various embodiments, the use of a connection based protocol such as, e.g., QUIC, and the use, e.g., temporary use, of a cellular wireless link, facilitates efficient and rapid handovers between different WiFi access points, e.g., without interruption of the data packet stream being communicated between the two endpoints, e.g., UE 1 1722 and UE 2 1724. In various embodiments, the cellular wireless link is more costly than the WiFi wireless links, and therefore it is beneficial to minimize use of the cellular wireless link and perform a rapid and efficient handover between two WiFi APs.

In some embodiments, the communications system 1700 further includes a test server and utilizes methods, e.g., relatively low bandwidth wireless link evaluation testing methods, as described with respect to flowchart 200 of FIG. 2 for evaluating the alternate wireless links. In some such embodiments, decisions during a handover of a connection from a first WiFi link to a second WiFi link, such as, e.g., when to terminate a first WiFi link and when to terminate a cellular link are performed based on link testing scores.

In one exemplary embodiment system 1700 of FIG. 17 is part of the same communications system including system 100 of FIG. 1, e.g., with UE 1 1722 being WT 102, with UE 2 1724 being communications end point 116, with WiFi AP 1 1702 being 1st AP 106, with WiFi AP 2 1704 being Mth AP 112, with LTE AP 1706 being 2nd AP 108, and with network node 1708 and AP 1710 being included in network 118.

Figures 18, 18A, 18B, 18C:
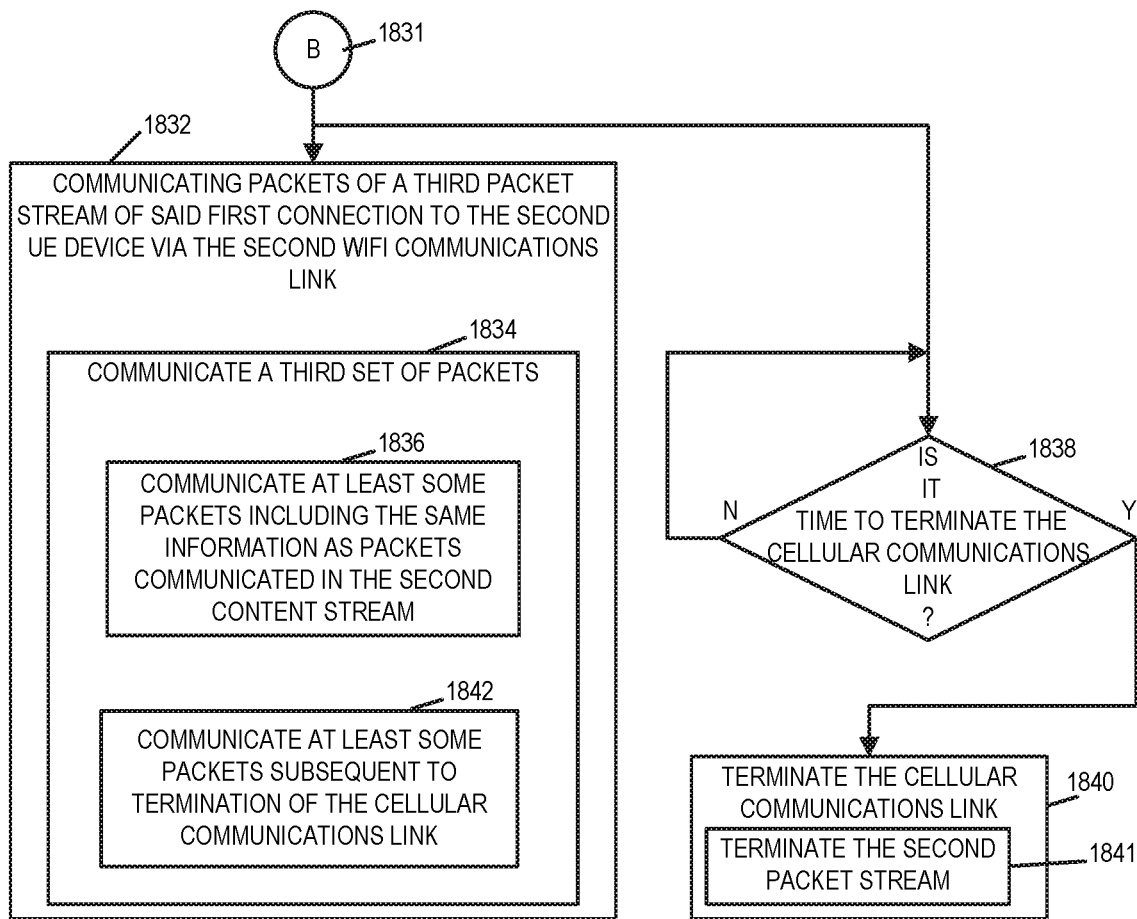
FIG. 18A is a first part of a flowchart of an exemplary method of operating a first user equipment (UE) device in accordance with an exemplary embodiment.
FIG. 18B is a second part of a flowchart of an exemplary method of operating a first user equipment (UE) device in accordance with an exemplary embodiment.
FIG. 18C is a third part of a flowchart of an exemplary method of operating a first user equipment (UE) device in accordance with an exemplary embodiment.
FIG. 18 comprises the combination of FIG. 18A, FIG. 18B and FIG. 18C.
Figure 18A:
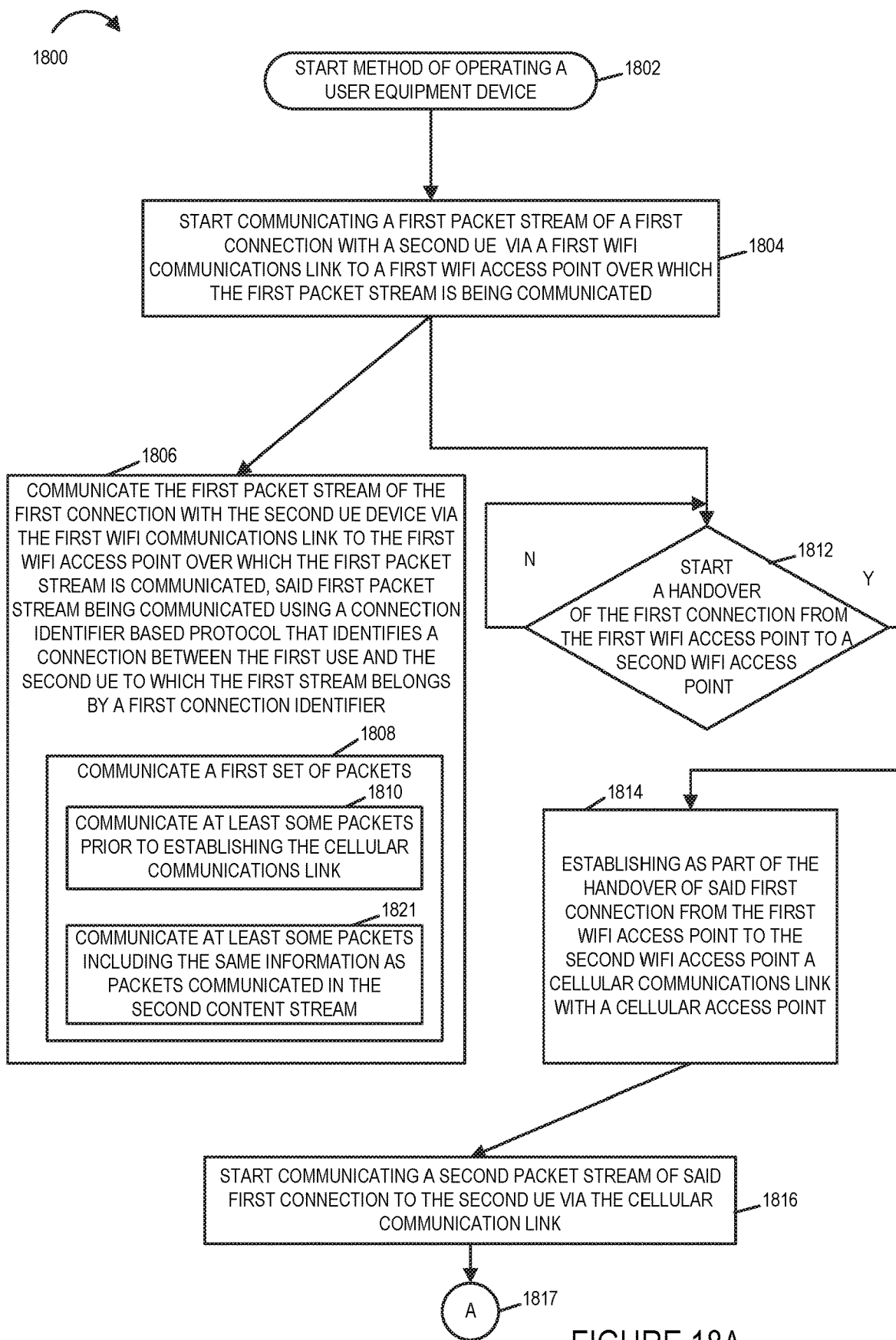
Figure 18B:
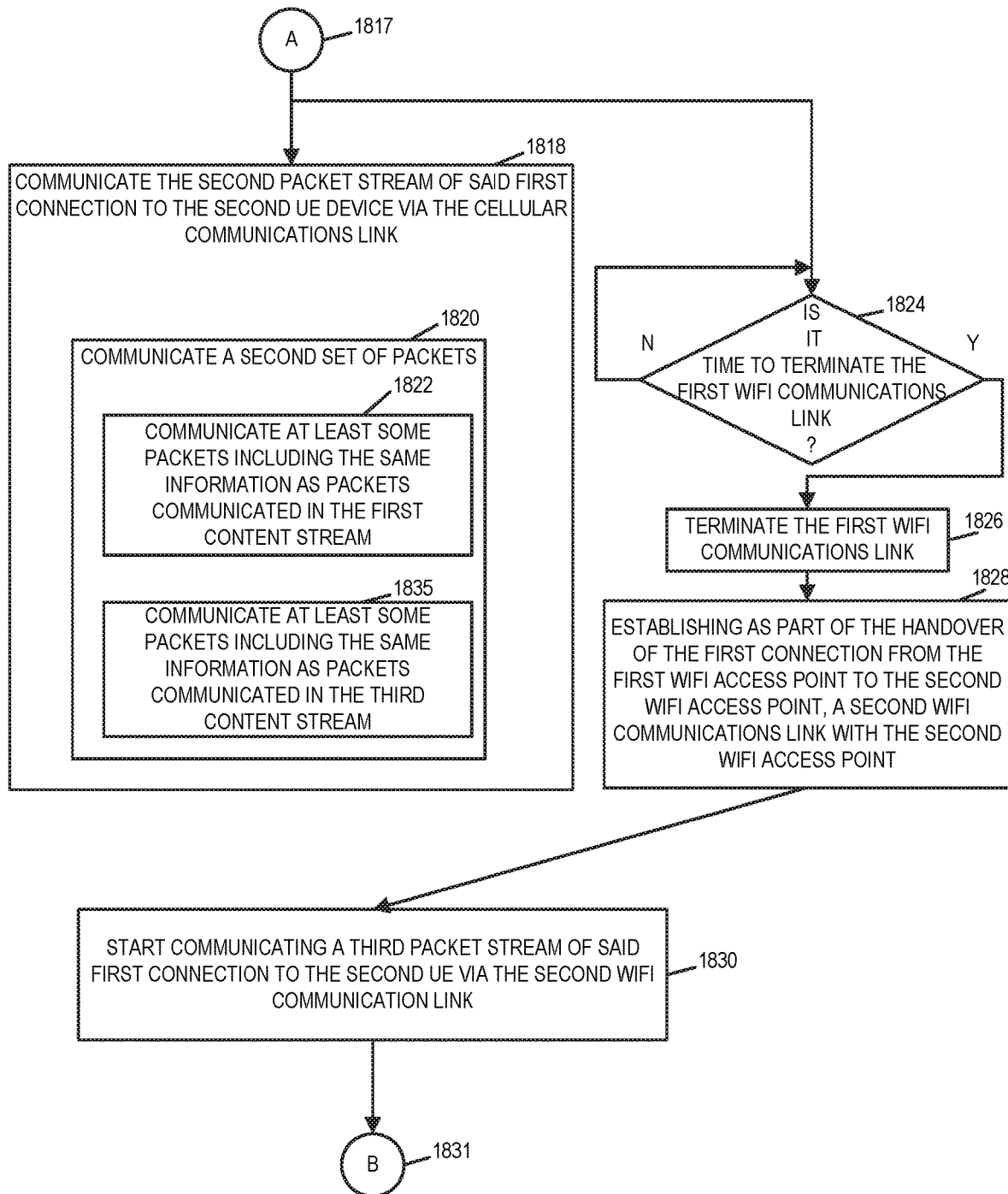

FIG. 18, comprising the combination of FIG. 18A, FIG. 18B and FIG. 18C, is a flowchart 1800, comprising the combination of Part A 1801, Part B 1803 and Part C 1805, of an exemplary method of operating a first user equipment (UE) device in accordance with an exemplary embodiment. Operation starts in step 1802 and proceeds to step 1804.

In step 1804 the first UE device, e.g, UE 1 1722 of FIG. 17, starts communicating a first packet stream of a first connection with a second UE device, e.g., UE 2 1724, via a first WiFi communications link to a first WiFi access point, e.g., WiFi AP 1 1702, e.g., a WiFi router, over which the first packet stream is being communicated. Operation proceeds from step 1804 to step 1806 and step 1812.

In step 1806 the first UE communicates the first packet stream of the first connection with the second UE device via the first WiFi communications link to the first WiFi access point over which the first packet stream is being communicated, said first packet stream being communicated using a connection identifier based protocol, e.g., QUIC, that identifies a connection between the first UE and the second UE to which the first packet stream belongs by a first connection identifier. Step 1806 includes step 1808 in which the first UE device communicates a first set of packets. Step 1808 includes steps 1810 and 1821. In step 1810 the first UE device communicates at least some packets prior to establishing a cellular communications link.

In step 1812 the first UE device checks and determines if the first UE device should start a handover of the first connection from the first WiFi access point to a second WiFi access point, e.g., WiFi AP 2 1704. If the determination of step 1812 is that the first UE device should not start a handover of the first connection from the first WiFi access point to a second WiFi access point, at the present time, then operation proceeds from the output of step 1812 to the input of step 1812 for another check at a later time. However, if the determination of step 1812 is that the first UE device should start a handover of the first connection from the first WiFi access point to a second WiFi access point, then operation proceeds from step 1812 to step 1814.

In step 1814 the first UE device establishes, as part of the handover of the first connection from the first WiFi access point to the second WiFi access point, a cellular communications link with a cellular access point, e.g., an LTE base station, e.g., LTE AP 1706. Operation proceeds from step 1814 to step 1816. In step 1816 the first UE device starts communicating a second packet stream of the first connection to second UE via the cellular communications link. Operation proceeds from step 1816, via connecting node A 1817, to step 1818 and to step 1824.

In step 1818 the first UE device communicates the second packet steam of said first connection to the second UE device via the cellular communications link. Step 1818 includes step 1820 in which the first UE device communicates a second set of packets. Step 1820 includes steps 1822 and 1835.

In step 1821, which is part of step 1808, the first UE device communicates at least some packets including the same information as packets communicated in the second content stream. In step 1822, which is part of step 1820, the first UE device communicates at least some packets including the same information as packets communicated in the first content stream. In some embodiments, the first and second packet streams transmit duplicative content during the initial portion of the handoff but potentially with more redundancy on the less reliable WiFi connection than on the more reliable cellular connection.

In step 1824, the first UE device determines whether or not it is time to terminate the first WiFi communications link, e.g., based on known timing information corresponding to the handover, based on testing information corresponding to the cellular wireless link, e.g., a cellular wireless link score, based packets being successfully communicated over the cellular wireless link and recovered by the second UE device, and/or based on the determined position of the UE in relation to the coverage areas corresponding to the first and/o second WiFi access points. If the determination of step 1824, is that it is not time to terminate the first WiFi connection, then operation proceeds from the output of step 1824 to the input of step 1824, to perform another check at a later point in time. However, if the determination of step 1824, is that it is time to terminate the first WiFi connection, then operation proceeds from the output of step 1824 to step 1826, in which the first UE device terminates the first WiFi communications link prior to establishing the second WiFi communications link. Operation proceeds from step 1826 to step 1828. In step 1828 the first UE device establishes, as part of the handover of the first connection form the first WiFi access point to second WiFi access point, a second WiFi communications link with the second WiFi access point. Operation proceeds from step 1828 to step 1830.

In step 1830, the first UE device starts communicating a third packet stream of said first connection to the second UE device via the second WiFi communications link. Operation proceeds from step 1830, via connecting node B 1831, to step 1832 and to step 1838.

In step 1832 the first UE device communicates packets of a third packet stream of said first connection to second UE device via the second WiFi communications link. Step 1832 includes step 1834 in which the first UE device communicates a third set of packets. Step 1834 includes steps 1836 and step 1842.

In step 1835, which is part of step 1820, the first UE device communicates at least some packets including the same information as packets communicated in the third content stream. In step 1836, which is part of step 1834, the first UE device communicates at least some packets including the same information as packets communicated in the second content stream. In some embodiments, the second and third packets streams transmit duplicative content during the intermediate portion of the handoff but potentially with more redundancy on the less reliable WiFi connection than on the more reliable cellular connection.

In step 1838, the first UE device checks and determines if it is time to terminate the cellular communications link. e.g., based on known timing information corresponding to the handover, based on testing information corresponding to the second WiFi communications link, e.g., a second WiFi communications link score, based packets being successfully communicated over the second WiFi link and recovered by the second UE device, and/or based on the determined position of the UE in relation to the coverage areas corresponding to the second WiFi access point. If the determination of step 1838, is that it is not time to terminate the cellular communications link, then operation proceeds from the output of step 1838 to the input of step 1838, to perform another check at a later point in time. However, if the determination of step 1838, is that it is time to terminate the cellular communications link, then operation proceeds from the output of step 1838 to step 1840, in which the first UE device terminates the cellular communications link subsequent to terminating the first WiFi communications link. In some embodiments, the step 1840 includes step 1841 in which the first UE device terminates the second packet stream. Operation proceeds from step 1840 to step 1842.

In step 1842, which is part of step 1834, the first UE device communicates at least some packets subsequent to the termination of the cellular communications link. Thus in step 1842 the first UE device continues to communicate to the second UE device in the third packet stream following termination of the second packet stream.

In some embodiments, the second packet stream includes lower data redundancy than the first or third packet streams. In some such embodiments, the lower data redundancy is achieved through the use of less error correction codes per unit of transmitted data in second packet stream than in said first or third packet streams.

In some embodiments, the first UE includes a single WiFi transmitter, and the second WiFi communications link is established with the second WiFi access point is established after termination of the first WiFi communications link.

In various embodiments, the first, second and third packet stream correspond to the same connection identified by the first connection identifier, and the second packet stream communicates less than 10 percent of the total number of packets communicated as part of a voice call which is implemented using the first, second and third packet streams to communicate voice data between the first UE and the second UE. For example, the cellular link is used only for handover in some cases so the amount of data sent over the cellular link is less than 10% of the voice call data in this example.

Figures 19, 19B:
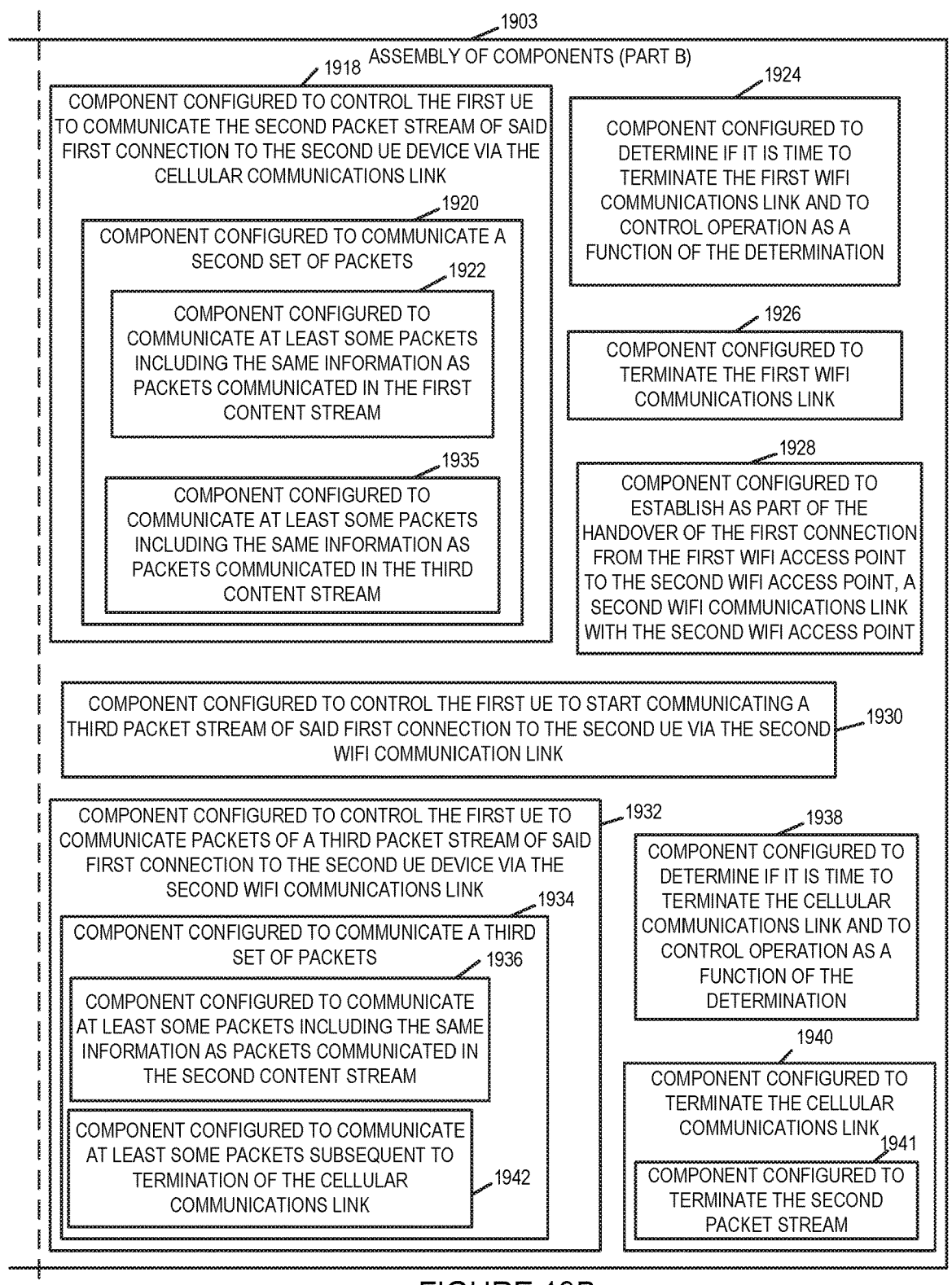
FIG. 19B is a first second part of an assembly of components in accordance with an exemplary embodiment.
FIG. 19 comprises the combination of FIG. 19A and FIG. 19B.
Figure 19A:
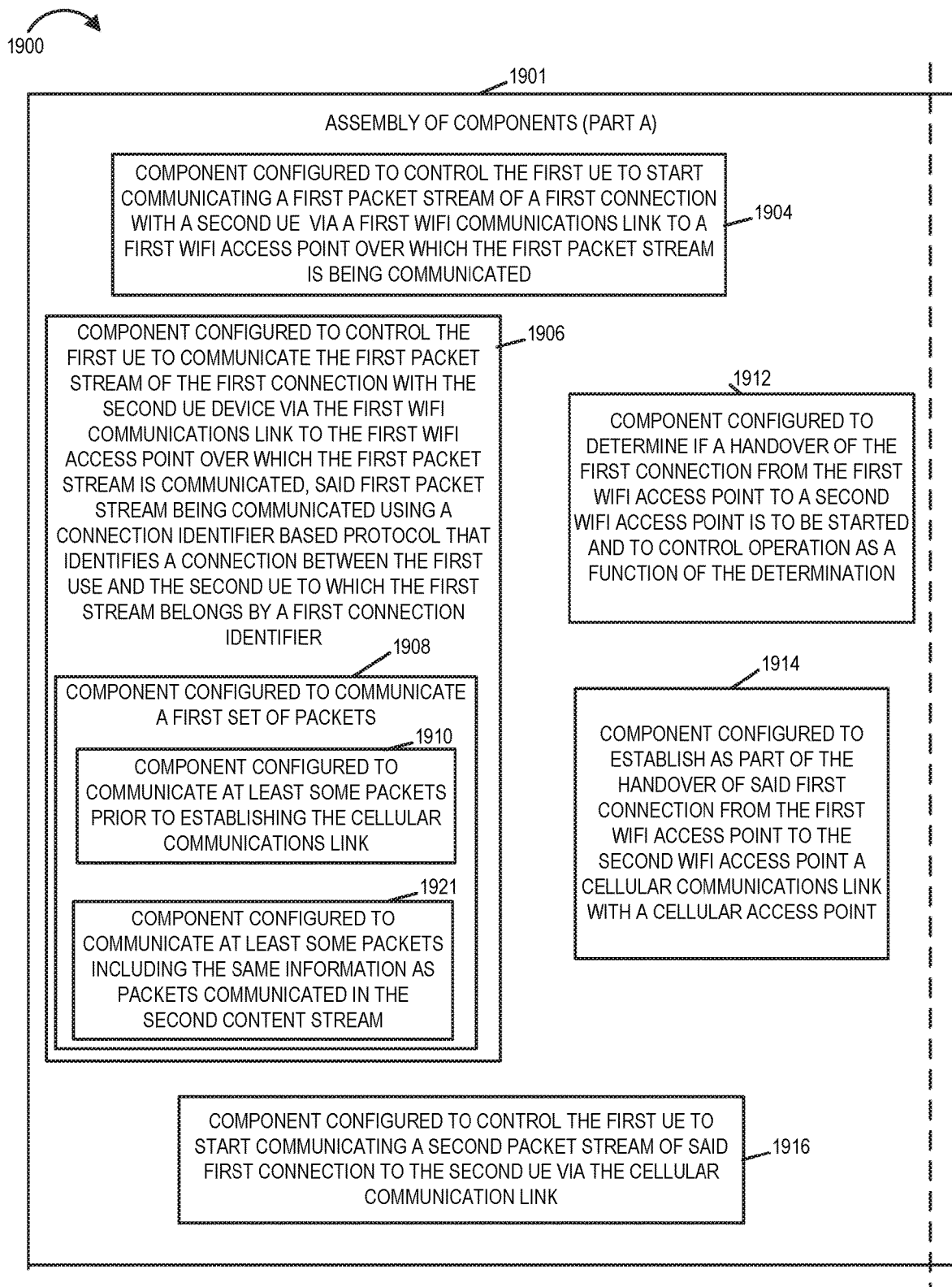
FIG. 19A is a first part of an assembly of components in accordance with an exemplary embodiment.

FIG. 19, comprising the combination of FIG. 19A and FIG. 19B, is drawing of an assembly of components 1900, comprising the combination of Part A 1901 and Part B 1903, in accordance with an exemplary embodiment. FIG. 19 is a drawing of an exemplary assembly of components 1900, which may be included in a wireless terminal 300, e.g., a user equipment (UE) device, in accordance with an exemplary embodiment. Assembly of components 1900 can be, and in some embodiments is, used in WT 500, WT 102, WT 104, WT 902, WT 1502, UE 1718, and/or UE 1720. The components in the assembly of components 1900 can, and in some embodiments are, implemented fully in hardware within the processor 502, e.g., as individual circuits. The components in the assembly of components 1900 can, and in some embodiments are, implemented fully in hardware within the assembly of components 518, e.g., as individual circuits corresponding to the different components. In other embodiments some of the components are implemented, e.g., as circuits, within the processor 502 with other components being implemented, e.g., as circuits within assembly of components 518, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 520 of the WT 500, e.g., a UE device, with the components controlling operation of WT 500, e.g., a UE device, to implement the functions corresponding to the components when the components are executed by a processor, e.g., processor 502. In some such embodiments, the assembly of components 1900 is included in the memory 520 as assembly of components 554. In still other embodiments, various components in assembly of components 1900 are implemented as a combination of hardware and software, e.g., with another circuit external to the processor providing input to the processor 502 which then under software control operates to perform a portion of a component's function. While processor 502 is shown in the FIG. 3 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 1900 is stored in the memory 520, the memory 520 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 19 control and/or configure the WT 500, e.g., a UE device, or elements therein such as the processor 502, to perform the functions of corresponding steps illustrated and/or described in the method of one or more of the flowcharts, signaling diagrams and/or described with respect to any of the Figures. Thus the assembly of components 1900 includes various components that perform functions of corresponding one or more described and/or illustrated steps of an exemplary method, e.g., steps of the method of flowchart 1800 of FIG. 18 and/or described or shown with respect to any of the other figures.

Assembly of components 1900 includes a component 1904 configured to control the first user equipment (UE) device to start communicating a first packet stream of a first connection with a second UE device via a first WiFi communications link to first WiFi access point over which the first packet stream is being communicated, a component 1906 configured to control the first UE device to communicate the first packet stream of the first connection with the second UE device via the first WiFi communications link to the first WiFi access point over which the first packet stream is being communicated, said first packet stream being communicated using a connection identifier based protocol, e.g., QUIC, that identifies a connection between the first UE and the second UE to which the first stream belongs by a first connection identifier. Component 1906 includes a component 1908 configured to communicate a first set of packets. Component 1908 includes a component 1910 configured to communicate at least some packets prior to establishing the cellular communications link and a component 1921 configured to communicate at least some packets including the same information as packets communicated in the second content stream.

Assembly of components 1900 further includes a component 1912 configured to determine if a handover of the first connection from the first WiFi access point to a second WiFi access point is to be started and to control operation as a function of the determination, a component 1914 configured to establish, as par of the handover from the first WiFi access point to the second WiFi access point, a cellular communications link with a cellular access point, e.g., an LTE base station, and a component 1916 configured to control the first UE device to start communicating a second packet stream of said first connection to the second UE via the cellular communications link.

Assembly of components 1900 further includes a component 1918 configured to control the first UE device to communicate the second packet stream of said first connection to the UE device via the cellular communications link. Component 1920 includes a component 1922 configured to communicate at least some packets including the same information as packets communicated in the first content stream and a component 1935 configured to communicate at least some packets including the same information as packets communicated in the third content stream. Assembly of components 1900 further includes a component 1924 configured to determine if it is time to terminate the first WiFi communications link and to control operation as a function of the determination, a component 1926 configured to terminate the first WiFi communications link prior to establishing the second WiFi communications link and a component 1928 configured to establish, as part of the handover of the first connection from the first WiFi access point to the second WiFi access point, a second WiFi communications link with the second WiFi access point.

Assembly of components 1900 further includes a component 1930 configured to control the first UE device to start communicating a third packet stream of said first connection to second UE via the second WiFi communications link, and a component 1932 configured to control the first UE device to communicate packets of a third packet stream of said first connection to the second UE device via the second WiFi communications link. Component 1932 includes a component 1934 configured to communicate a third set of packets. Component 1934 includes a component 1936 configured to communicate at least some packets including the same information as packets communicated in the second content stream and a component 1942 configured to communicate at least some packets subsequent to the termination of the cellular communications link, e.g, a component configured to communicate packets to the second UE in the third packet stream following termination of the second packet stream. Assembly of components 1900 further includes a component 1938 configured to determine if it is time to terminate the cellular communications link and to control operation as a function of the determination, and a component 1940 configured to terminate the cellular communications link subsequent to terminating the first WiFi communications link. Component 1940 includes a component 1941 configured to terminate the second packet stream.

In some embodiments, the second packet stream includes lower data redundancy than the first or third packet streams. In some such embodiments, the lower data redundancy is achieved through the use of less error correction codes per unit of transmitted data in second packet stream than in said first or third packet streams.

In some embodiments, the first UE includes a single WiFi transmitter, and the second WiFi communications link is established with the second WiFi access point is established after termination of the first WiFi communications link.

In various embodiments, the first, second and third packet stream correspond to the same connection identified by the first connection identifier, and the second packet stream communicates less than 10 percent of the total number of packets communicated as part of a voice call which is implemented using the first, second and third packet streams to communicate voice data between the first UE and the second UE. For example, the cellular link is used only for handover in some cases so the amount of data sent over the cellular link is less than 10% of the voice call data in this example.

Figure 20:
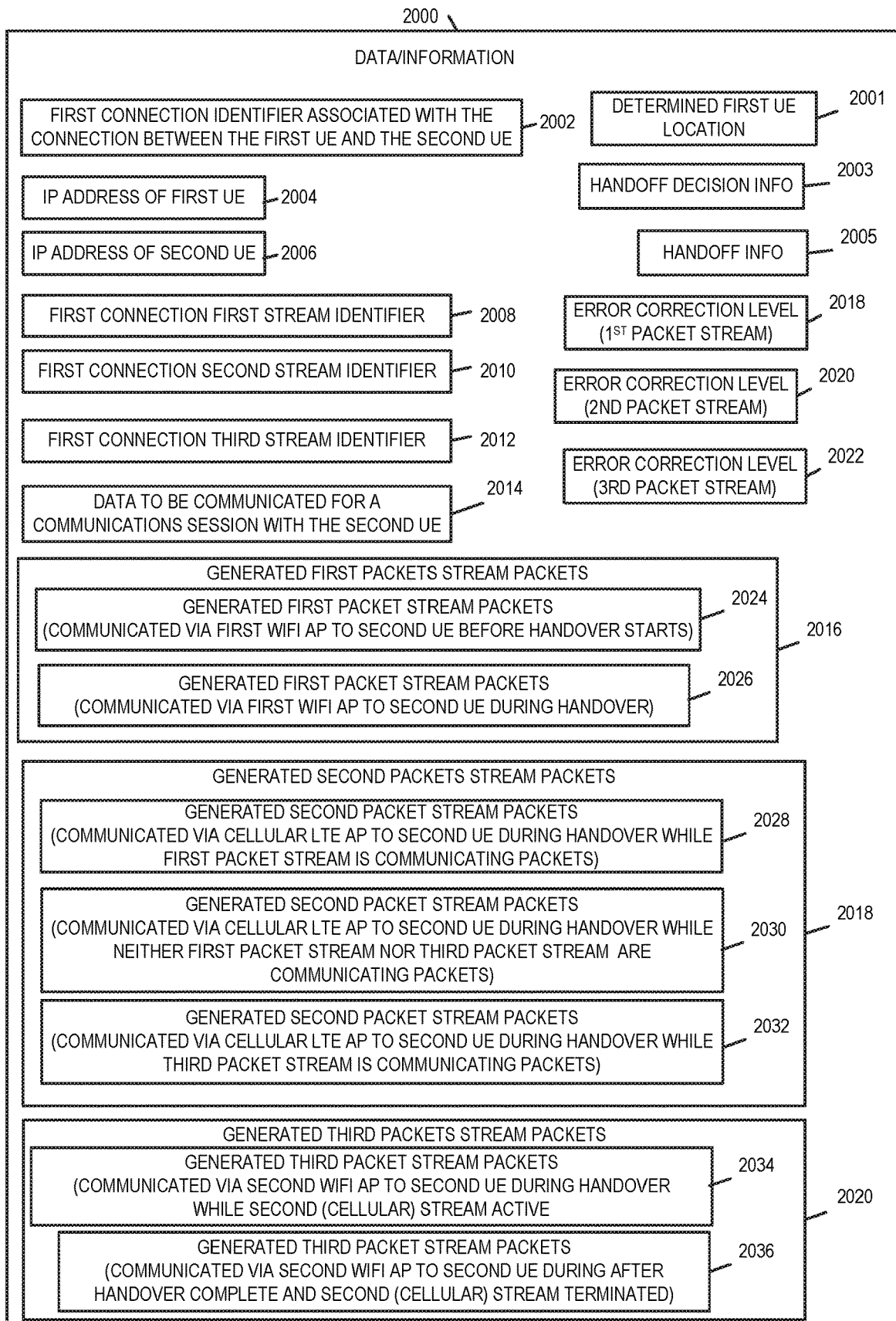
FIG. 20 is a drawing of exemplary data/information included in a user equipment (UE) device in accordance with an exemplary embodiment.

FIG. 20 is a drawing of exemplary data/information 2000 included in a user equipment (UE) device in accordance with an exemplary embodiment. Data/information 2000 is, e.g., included in data/information 556 in memory 520 in WT 500, e.g., UE 500 of FIG. 3.

Data/information 2000 includes a first connection identifier 2002, e.g., a QUIC connection identifier, associated with the connection between the first UE device and the second UE device, an IP address of the first UE 2004, and IP address of the second UE 2006, a first connection first stream identifier 2008, a first connection second stream identifier 2010, and a first connection third stream identifier 2012. Data/information 2000 further includes a determined first UE location 2001, handoff decision information 2003, handoff information 2005, e.g., including timing information related to various operation involved as part of the handoff, a preset or determined error correction level for first packet stream packets 2018, a preset or determined error correction level for second packet stream packets 2020, a preset or determined error correction level for third packet stream packets 2022.

Data/information 2000 further includes data to be communicated for a communication session with the second UE 2014, generated first packet stream packets 2016, generated second packet stream packets 2018, and generated third packet stream packets 2020. Generated first packet stream packets 2016 includes generated first packets stream packets which are to be communicated via the first WiFi wireless link and first WiFi access point to the second UE before handover starts 2024 and generated first packets stream packets which are to be communicated via the first WiFi wireless link and first WiFi access point to the second UE during handover 2026.

Generated second packet stream packets 2018 includes generated second packet stream packets which are to be communicated via the cellular wireless link and LTE cellular access point to the second UE during handover while the first packet stream is communicating packets 2028, generated second packet stream which are to be communicated via the cellular wireless link and LTE cellular access point to the second UE during handover while neither the first packet stream is communicating packets nor the third packet stream is communicating packets 2030, and generated second packet stream packets which are to be communicated via the cellular wireless link and LTE cellular access point to the second UE during handover while the third packet stream is communicating packets 2032. Generated third packet stream packets 2020 includes generated third packets stream packets which are to be communicated via the second WiFi wireless link and second WiFi access point to the second UE during handover while the second (cellular link) stream is active 2034 and generated third packets stream packets which are to be communicated via the second WiFi wireless link and second WiFi access point to the second UE after the handover is complete and the second (cellular) stream is terminated 2036.

FIGS. 21-25 includes a set of drawings used to illustrate an exemplary handover of a first connection from a first WIFI access point, e.g., WiFi AP 1 1702, to a second WiFi access point, e.g., WiFi AP 2 1706, in the system 1700 of FIG. 17, in accordance with an exemplary embodiment.

Figure 21:
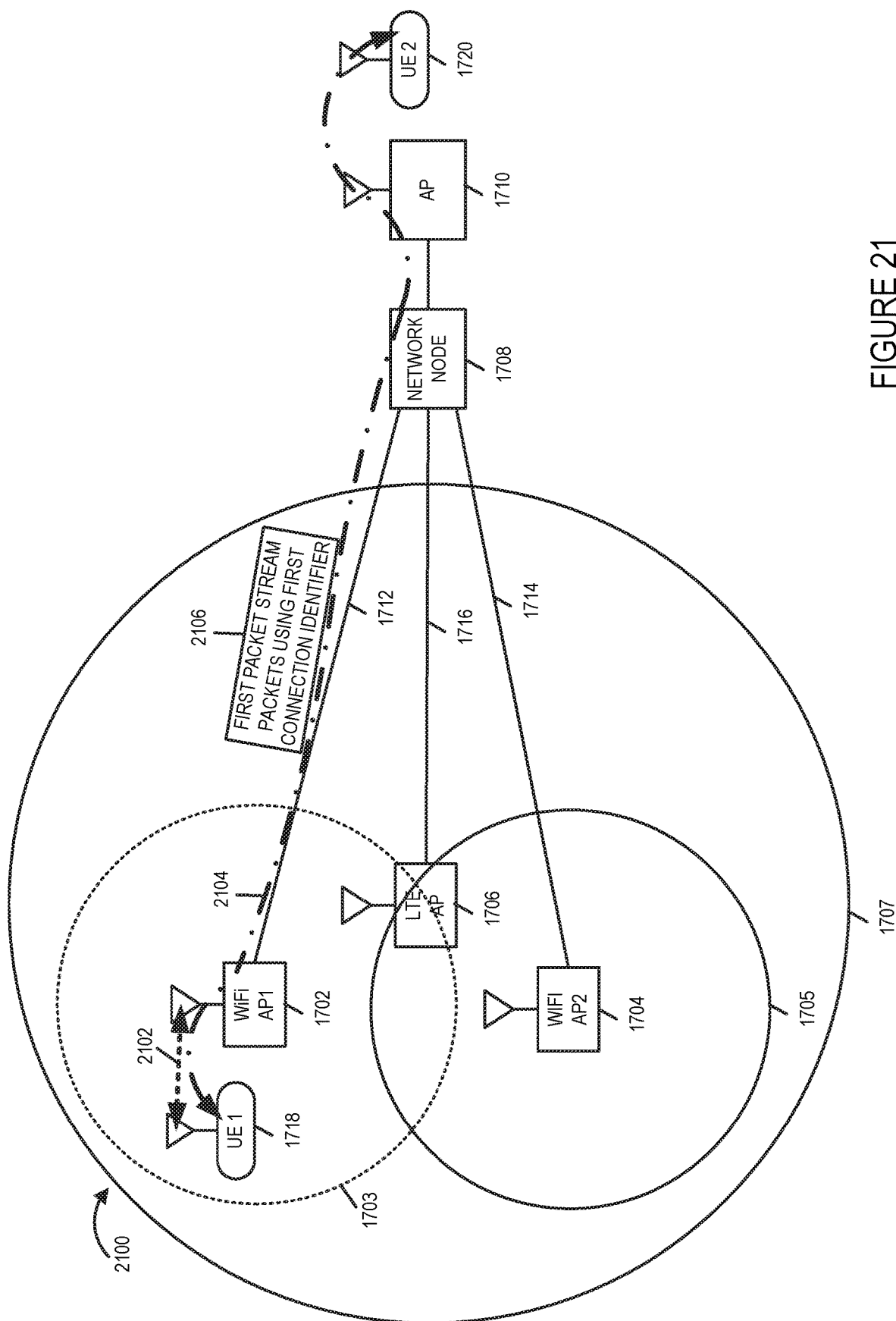
FIG. 21 is a first drawing in a set of drawings used to illustrate an exemplary handover of a first connection from a first WIFI access point to a second WiFi access point in accordance with an exemplary embodiment.

FIG. 21 is drawing 2100 illustrates that UE 1 1718 has established a wireless WiFi link 2102 with WiFi AP 1 1702, and UE 1 1718 has established a first connection with UE 2 1720 using a connection based protocol, e.g., QUIC, and the first connection has a first connection identifier. One path of the first connection is indicated by dot-dash line 2104 which includes the WiFi wireless link 2102. First packet stream packets 2106 are communicated over the communications path 2104.

Figure 22:
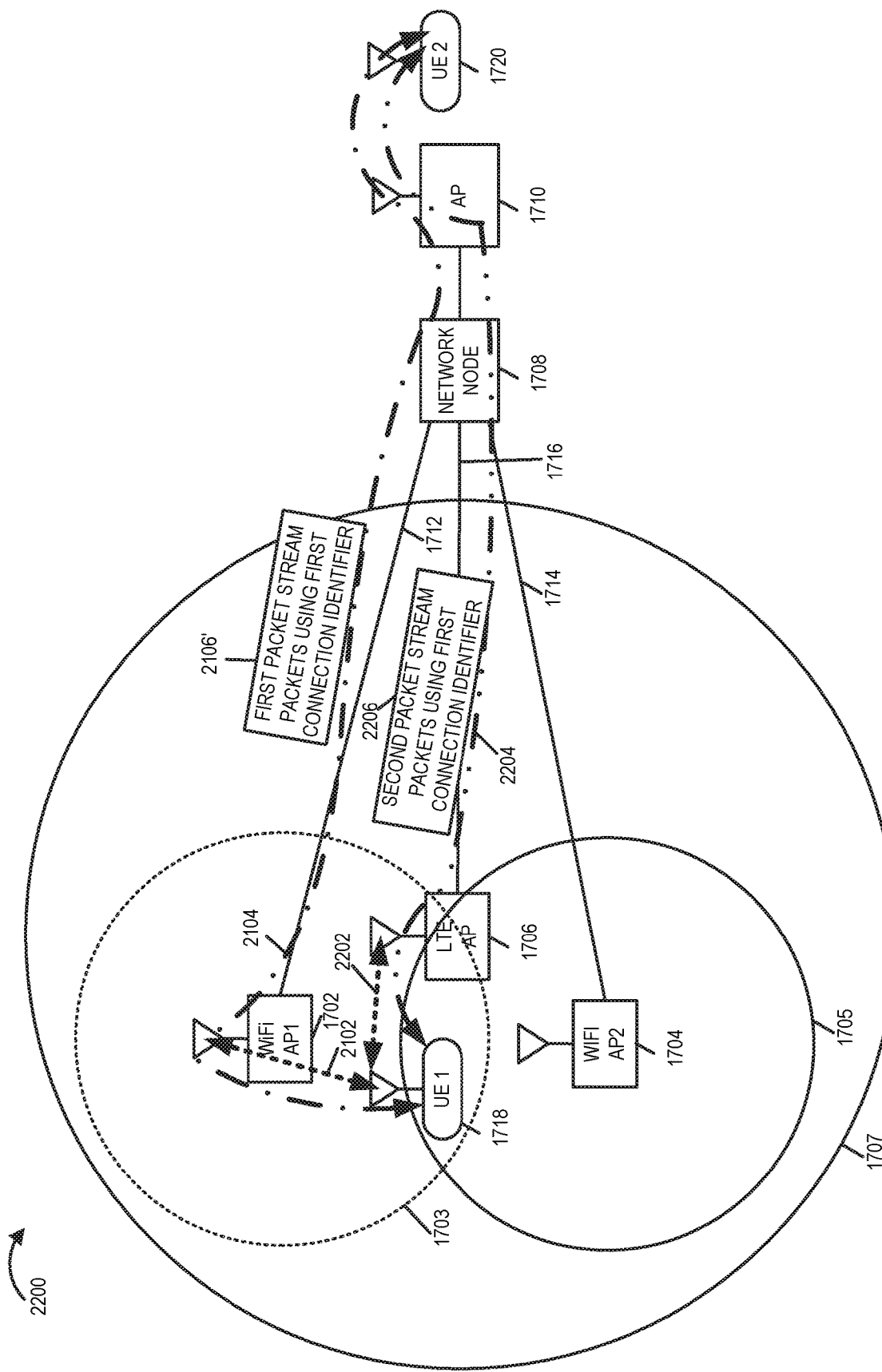
FIG. 22 is a second drawing in a set of drawings used to illustrate an exemplary handover of a first connection from a first WIFI access point to a second WiFi access point in accordance with an exemplary embodiment.

FIG. 22 corresponds to a subsequent time to FIG. 21. FIG. 22 is drawing 2200 which illustrates that UE 1 1718 has maintained the wireless WiFi link 2102 with WiFi AP 1 1702, UE 1 1718 has decided to handover the first connection from WiFi AP1 1702 to WiFi AP 2 1704. As part of the handover, UE 1 1718 establishes a LTE cellular wireless link 2202 with LTE AP 1706, and another path 2204 of the first connection is established. One path of the first connection is indicated by dot dash line 2104 which includes the WiFi wireless link 2102; and another path of the first connection is indicated by dot-dot-dash line 2204 which includes the cellular wireless link 2202. First packet stream packets 2106' are communicated over the communications path 2104. Second packet stream packets 2206 are communicated over the communications path 2204. In various embodiments, at least some of the packets in first packet stream packets 2106' include the same information as packets communicated in second packet stream packets 2206. In various embodiments, at least some of the packets in second packet stream packets 2206 include the same information as packets communicated in first packet stream packets 2106.

Figure 23:
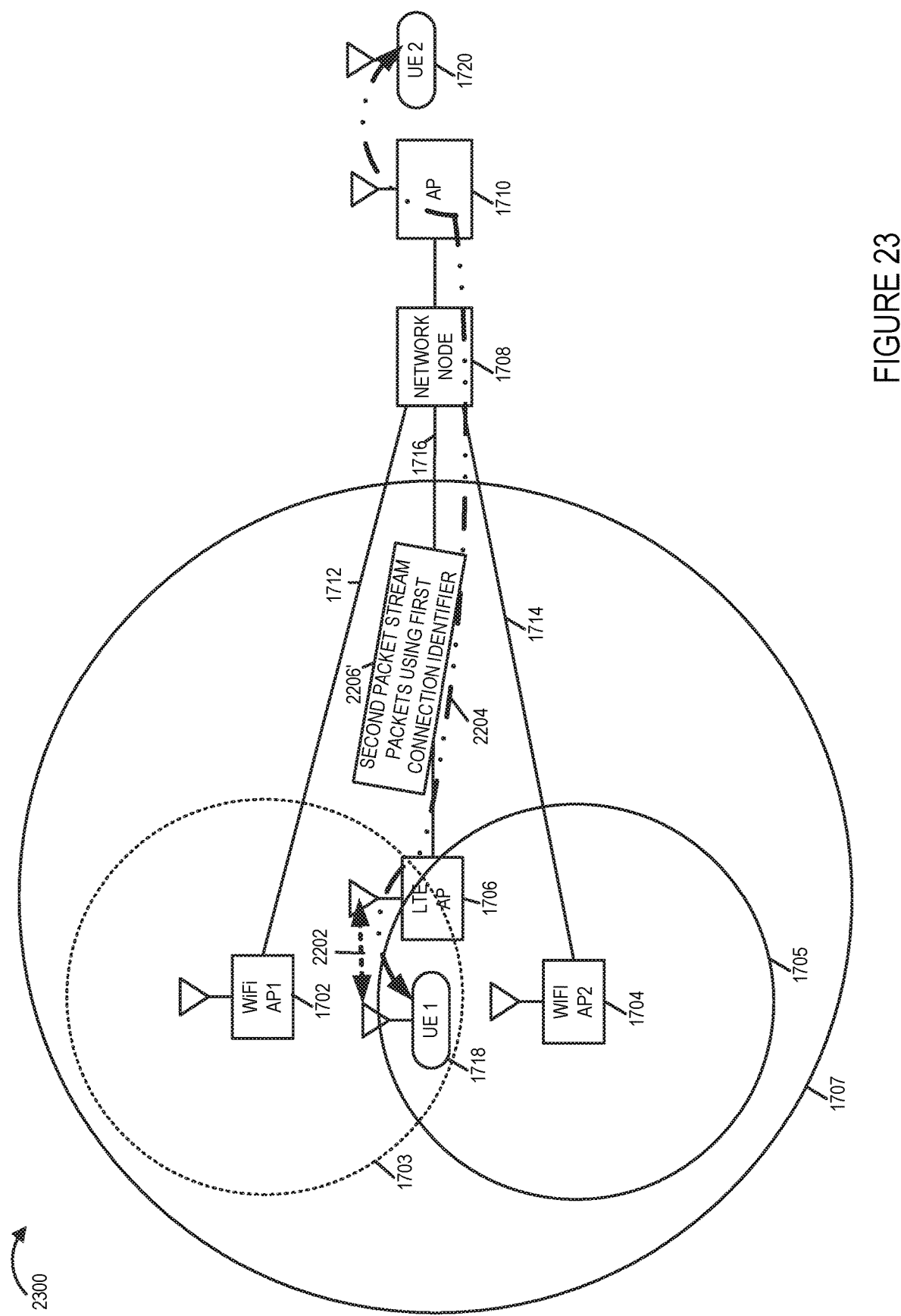
FIG. 23 is a third drawing in a set of drawings used to illustrate an exemplary handover of a first connection from a first WIFI access point to a second WiFi access point in accordance with an exemplary embodiment.

FIG. 23 corresponds to a subsequent time to FIG. 22. FIG. 23 is drawing 2300 which illustrates that UE 1 1718 has terminated the wireless WiFi link 2102 with WiFi AP 1 1702, but has maintained the wireless link 2202 with cellular LTE AP 1706. FIG. 23 corresponds to a period of time, e.g., a relatively short period of time in which UE 1 1718 is unable to send communications session data packets to UE 2 1720 via a WiFi link, e.g., because the UE 1 1718 is in the process of transitioning its single WiFi interface from communicating with WiFi AP 1 1702 to being to communicating with WiFi AP 2 1704.

Path 2204 of the first connection, as indicated by dot-dot-dash line 2204, is still intact. Second packet stream packets 2206' are communicated over the communications path 2204 which includes LTE cellular wireless link 2202.

Figure 24:
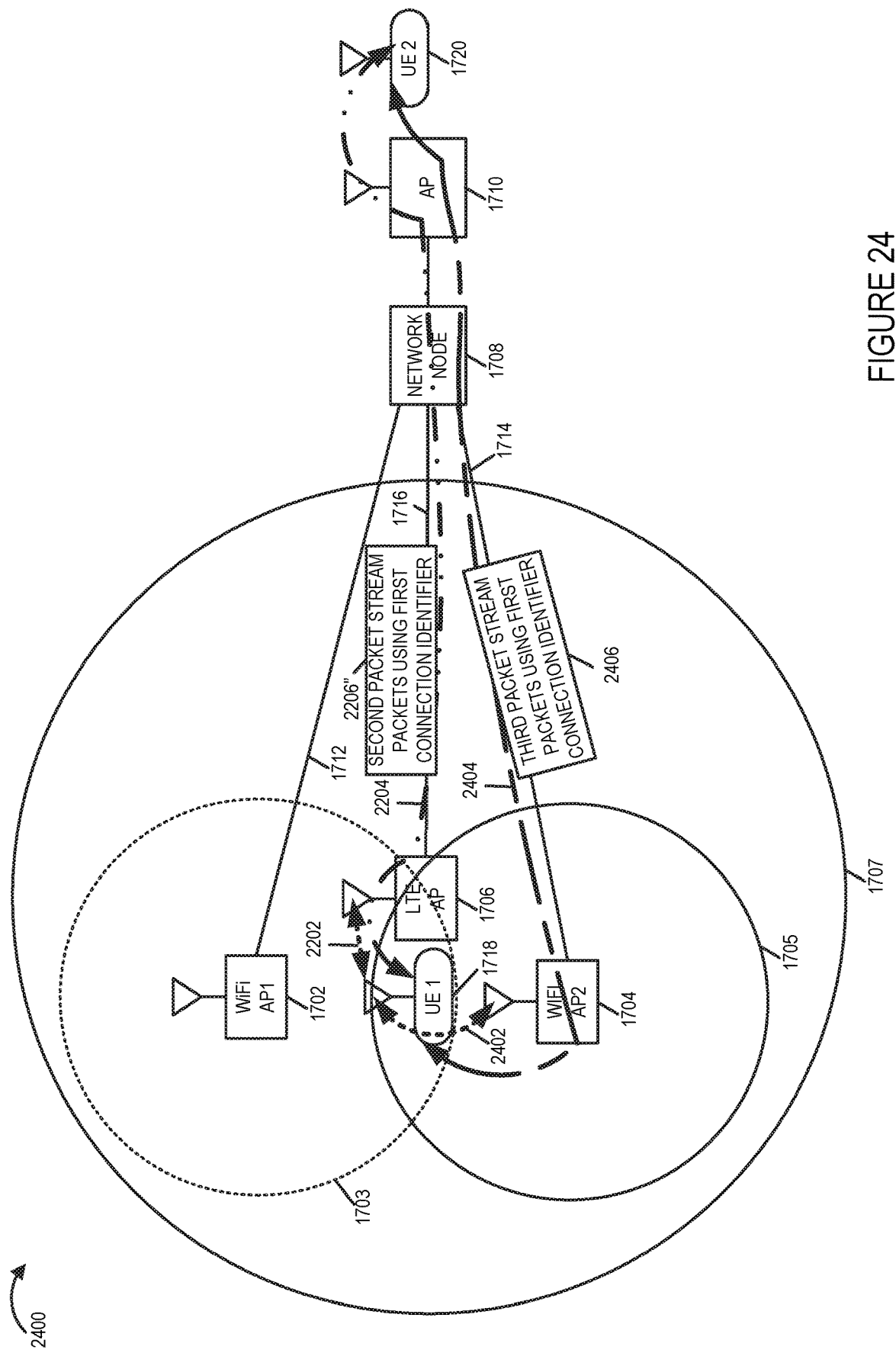
FIG. 24 is a fourth drawing in a set of drawings used to illustrate an exemplary handover of a first connection from a first WIFI access point to a second WiFi access point in accordance with an exemplary embodiment.

FIG. 24 corresponds to a subsequent time to FIG. 23. FIG. 24 is drawing 2400 which illustrates that UE 1 1718 has maintained the wireless cellular communications link 2202 with LTE AP 1706, UE 1 1718 establishes a WiFi wireless link 2402 with WiFi AP 2 1704, and another path 2404 of the first connection is established. One path of the first connection is indicated by dot-dot-dash line 2204 which includes the LTE cellular wireless link 2202; and another path of the first connection is indicated by short dash-long dash line 2404. Second packet stream packets 2206" are communicated over the communications path 2204. Third packet stream packets 2406 are communicated over the communications path 2404. In various embodiments, at least some of the packets in second packet stream packets 2206" include the same information as packets communicated in third packet stream packets 2406. In various embodiments, at least some of the packets in second third stream packets 2406 include the same information as packets communicated in second packet stream packets 2206".

Figure 25:
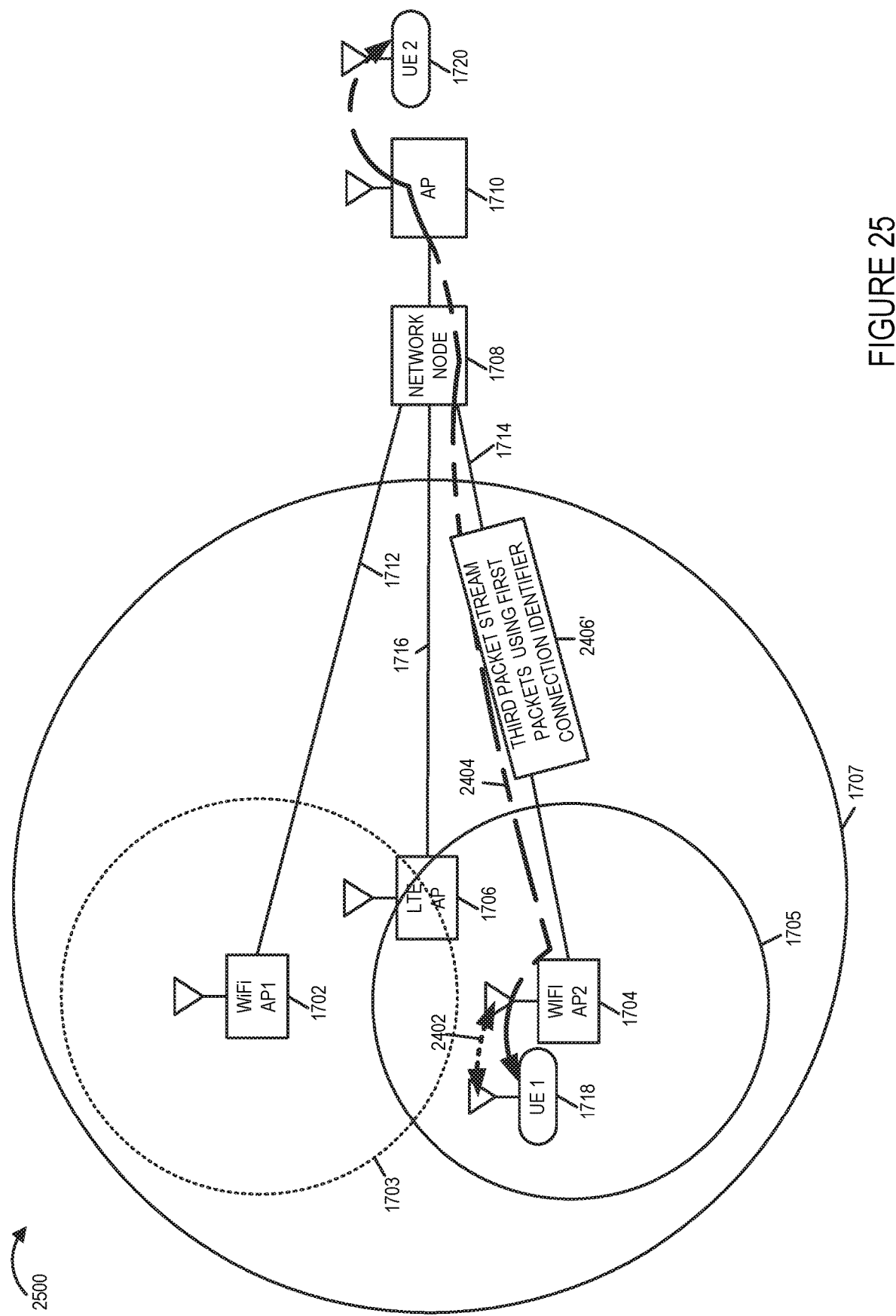
FIG. 25 is a fifth drawing in a set of drawings used to illustrate an exemplary handover of a first connection from a first WIFI access point to a second WiFi access point in accordance with an exemplary embodiment.

FIG. 25 corresponds to a subsequent time to FIG. 24 in which the handover is complete. FIG. 25 is drawing 2500 which illustrates that UE 1 1718 has terminated the cellular wireless link 2202 with LTE AP 1706, but has maintained the wireless link 2402 with WiFi AP 2 1704.

Path 2404 of the first connection, as indicated by long dash-short dash line 2404, is still intact. Third packet stream packets 2406' are communicated over the communications path 2404 which includes WiFi wireless link 2402.

In some embodiments, second data stream packets communicated over the path 2204, which includes the wireless cellular link 2202, include lower data redundancy than first data stream packets transmitted over the over the path 2104 including WiFi link 2102 or third data stream packets transmitted over the over the path 2404 including WiFi link 2402. In some such embodiments, the lower data redundancy is achieved through the use of less error correction codes per unit of transmitted data in said second packet stream than in said first or third packet streams.

First Numbered List of Exemplary Method Embodiments:

Method Embodiment 1

A method of operating a wireless terminal, the method comprising: establishing a first wireless connection with a first access point (WiFi access point using non-licensed spectrum) having network connectivity to a test server and a first communications end point; communicating test packets, via the first wireless connection, to the test server using a communication connection with the test server identified by a first connection identifier, said communicating test packets including using a connection ID based protocol (e.g., QUIC) to communicate to said test server; receiving first test packet communication scores from said test server in response to test packets communicated via the first wireless connection; communicating additional test packets (e.g., second wireless connection test packets since they are used to test connectivity via the second wireless link), via a second wireless connection, to a second access point (e.g., 4G or 5G cellular access point) which has network connectivity to the test server, said communicating of additional test packets to the test server including using said connection ID based protocol (e.g., QUIC) and said first connection identifier to communicate said additional test packets to the test server; and controlling the transmission of test packets over at least one of the first and second wireless connections based on test scores received from the test server in response to test packets communicated via the first wireless connection.

Method Embodiment 2

The method of Method Embodiment 1, further comprising: communicating third wireless connection test packets, via a third wireless connection, to a third access point (e.g., a 5G access point when the second AP is a 4G access point) which has network connectivity to the test server, said communicating of third wireless link test packets to the test server including using said connection ID based protocol (e.g., QUIC) and said first connection identifier to communicate third wireless link test packets to said test server.

Method Embodiment 3

The method of Method Embodiment 1, wherein controlling the transmission of test packets over at least one of the first and second wireless connections based on test scores received from the test server in response to packets communicated via the first wireless connection includes: stopping the transmission of test packets over the second wireless connection when scores received in response to test packets communicated via the first wireless connection indicate that the connection via the first wireless link is above a first quality threshold. (E.g., we only test the second and third links when the scores corresponding to the first connection indicate that the first connection is below a quality threshold which would correspond to utilization of the first link without aid of the second and/or third links to communicate data packets to a communications end point such as a peer device in a communications session with the first wireless terminal that is identified by another connection identifier but which sends packets over the first wireless connection to the first access point.)

Method Embodiment 4

The method of Method Embodiment 2, wherein controlling the transmission of test packets over at least one of the first and second wireless connections is further based on at least one of i) wireless terminal motion; ii) packet jitter (changes in amount of time involved in transmitting packets to the test server and getting answer from test server), iii) round trip time (e.g., time from when test packet is sent to when a corresponding test packet score is received); and iv) packet loss (as indicated by failure to receive a score corresponding to a communicated test packet).

Method Embodiment 5

The method of Method Embodiment 4, wherein controlling the transmission of test packets over at least one of the first and second wireless connections is further based on motion of the wireless terminal, said step of controlling the transmission of test packets over at least one of the first and second wireless connections including: transmitting test packets over the first wireless link, the second wireless link, or both the first wireless link and the second wireless link at a first test packet transmission rate when the wireless terminal is moving at a first rate of motion (e.g., a zero rate of motion or a first non-zero rate of motion); and transmitting test packets over the first wireless link, the second wireless link, or both the first wireless link and the second wireless link at a second test packet transmission rate when the wireless terminal is moving at a second rate of motion which is higher than said first rate of motion, said second packet transmission rate being faster than said first packet transmission rate.

Method Embodiment 6

The method of Method Embodiment 5, wherein said step of controlling the transmission of test packets over at least one of the first and second wireless connections includes: determining first wireless connection packet jitter based on changes in the amount of time to receive test scores in response to test packets sent over the first wireless connection during a first period of time; and modifying the rate at which test packets are sent over the first communications connection to said test server based on the determined amount of first wireless connection packet jitter.

Method Embodiment 7

The method of Method Embodiment 6, further comprising: determining if the first wireless connection jitter indicates an increase in the amount of first wireless connection jitter; and wherein modifying the rate at which test packets are sent over the first communications connection to said test server based on the determined amount of first wireless connection jitter includes increasing the rate at which test packets are sent over the first communications connection to said test server in response to determining that there has been an increase in the amount of first wireless connection jitter.

Method Embodiment 8

The method of Method Embodiment 7, further comprising: determining if the first wireless connection jitter indicates a decrease in the amount of first wireless connection jitter; and wherein modifying the rate at which test packets are sent over the first communications connection to said test server based on the determined amount of first wireless connection jitter includes decreasing the rate at which test packets are sent over the first communications connection to said test server in response to determining that there has been a decrease in the amount of first wireless connection jitter.

Method Embodiment 9

The method of Method Embodiment 7, further comprising: determining if the first wireless connection jitter indicates no change in the amount of first wireless connection jitter; and wherein modifying the rate at which test packets are sent over the first communications connection to said test server based on the determined amount of first wireless connection jitter includes leaving the rate at which test packets are sent over the first communications connection to said test server unchanged in response to determining that there has been no change in the amount of first wireless connection jitter.

Method Embodiment 10

The method of Method Embodiment 5, wherein said step of controlling the transmission of test packets over at least one of the first and second wireless connections includes: determining first wireless connection packet delay based on the amount of time between sending a test packet via the first wireless connection and receiving a test score in response to the transmitted test packet; and modifying the rate at which test packets are sent over the first communications connection to said test server based on the determined amount of first wireless connection packet delay.

Method Embodiment 11

The method of Method Embodiment 10, further comprising: determining if the first wireless connection packet delay indicates an increase in the amount of first wireless connection packet delay; and wherein modifying the rate at which test packets are sent over the first communications connection to said test server based on the determined amount of first wireless connection packet delay includes increasing the rate at which test packets are sent over the first communications connection to said test server in response to determining that there has been an the increase in the amount of first wireless connection packet delay.

Method Embodiment 12

The method of Method Embodiment 11, further comprising: determining if the first wireless connection packet delay indicates a decrease in the amount of first wireless connection packet delay; and wherein modifying the rate at which test packets are sent over the first communications connection to said test server based on the determined amount of first wireless connection packet delay includes decreasing the rate at which test packets are sent over the first communications connection to said test server in response to determining that there has been a decrease in the first wireless connection packet delay.

Method Embodiment 13

The method of Method Embodiment 11, further comprising: determining if the first wireless connection packet delay indicates no change in the amount of first wireless connection packet delay; and wherein modifying the rate at which test packets are sent over the first communications connection to said test server based on the determined amount of first wireless packet delay includes leaving the rate at which test packets are sent over the first communications connection to said test server unchanged in response to determining that there has been no change in the amount of first wireless connection packet delay.

Method Embodiment 14

The method of Method Embodiment 5, wherein said step of controlling the transmission of test packets over at least one of the first and second wireless connections includes: determining a first wireless connection packet loss rate based on the failure to receive one or more test scores in response to test packets transmitted over the first wireless connection; and modifying the rate at which test packets are sent over the first communications connection to said test server based on the determined first wireless connection packet loss rate.

Method Embodiment 15

The method of Method Embodiment 14, further comprising: determining if the first wireless connection packet loss rate indicates an increase in the first wireless connection packet loss rate; and wherein modifying the rate at which test packets are sent over the first communications connection to said test server based on the determined amount of first wireless connection packet loss rate includes increasing the rate at which test packets are sent over the first communications connection to said test server in response to determining that there has been an increase in the first wireless connection packet loss rate.

Method Embodiment 16

The method of Method Embodiment 14, further comprising: determining if the first wireless connection packet loss rate indicates a decrease in the amount first wireless connection packet loss rate; and wherein modifying the rate at which test packets are sent over the first communications connection to said test server based on the determined amount of first wireless connection packet loss rate includes decreasing the rate at which test packets are sent over the first communications connection to said test server in response to determining that there has been a decrease in the first wireless connection packet loss rate.

Method Embodiment 17

The method of Method Embodiment 14, further comprising: determining if the first wireless connection packet loss rate indicates no change in the first wireless connection packet loss rate; and wherein modifying the rate at which test packets are sent over the first communications connection to said test server based on the determined amount of first wireless connection packet loss rate includes leaving the rate at which test packets are sent over the first communications connection to said test server unchanged in response to determining that there has been no change in the first wireless connection packet loss rate.

Method Embodiment 18

The method of Method Embodiment 1, further comprising: establishing a communications session with a communications end point (e.g., a communications peer which may participate in a voice, data or game session in which both the wireless terminal and the communications end point participate) via one of said first, second or third wireless connections; and wherein said communicating test packets via said first wireless connection is performed while said communications session with the communications end point is ongoing.

Method Embodiment 19

The method of Method Embodiment 18, wherein said communicating additional test packets via said second wireless connection is performed while said communications session with the communications end point is ongoing.

Method Embodiment 20

The method of Method Embodiment 19, wherein said communicating third wireless connection test packets via said third wireless connection is performed while said communications session with the communications end point is ongoing.

Method Embodiment 21

The method of Method Embodiment 19, wherein a connection between said wireless terminal and the communications end point is identified by a second connection identifier, said second connection identifier being different from said first connection identifier.

Method Embodiment 22

The method of Method Embodiment 21, wherein said first and second connections are to different end points but share use of a least one common wireless connection between the wireless terminal and one of the first, second and third access points.

Method Embodiment 23

The method of Method Embodiment 22, further comprising: selecting one or more of the first, second and third access points to use to communicate packets corresponding to the communications session with said end point based on scores received from said test server.

Method Embodiment 24

The method of Method Embodiment 23, wherein selecting one or more of the first, second and third access points to use to communicate packets corresponding to the communications session with said end point based on scores received from said test server includes: calculating a score (e.g., a cumulative score) for a wireless connection based on or more received scores corresponding to individual test packets.

Method Embodiment 25

The method of Method Embodiment 24, wherein calculating a score for a wireless connection based on or more received scores corresponding to individual test packets includes: weighting scores corresponding to more recent test packets more heavily than scores from older test packets.

Method Embodiment 26

The method of Method Embodiment 1, wherein each of said received first test packet communication scores from said test server is a score which scores an individual test packet communication.

Method Embodiment 27

The method of Method Embodiment 1, wherein each of said received first test packet communication scores from said test server is a score generated from one or more individual test packets (e.g., the test server generates and sends a cumulative weighted score based on the individual scores of one or more test packets).

Method Embodiment 28

The method of Method Embodiment 23, wherein selecting one or more of the first, second and third access points to use to communicate packets corresponding to the communications session with said end point based on scores received from said test server includes: weighting scores based on type of wireless network.

Method Embodiment 29

The method of Method Embodiment 28, wherein weighting scores based on type of wireless network includes: reducing a score of a high cost network (4G cellular network); and leaving a score of a low cost network (WiFi) unchanged.

First Numbered List of Exemplary Apparatus Embodiments

Apparatus Embodiment 1

A wireless terminal comprising: a processor configured to operate the wireless terminal to: establish a first wireless connection with a first access point (WiFi access point using non-licensed spectrum) having network connectivity to a test server and a first communications end point; communicate test packets, via the first wireless connection, to the test server using a communication connection with the test server identified by a first connection identifier, said communicating test packets including using a connection ID based protocol (e.g., QUIC) to communicate to said test server; receive first test packet communication scores from said test server in response to test packets communicated via the first wireless connection; communicate additional test packets (e.g., second wireless connection test packets since they are used to test connectivity via the second wireless link), via a second wireless connection, to a second access point (e.g., 4G or 5G cellular access point) which has network connectivity to the test server, said communicating of additional test packets to the test server including using said connection ID based protocol (e.g., QUIC) and said first connection identifier to communicate said additional test packets to the test server; and control the transmission of test packets over at least one of the first and second wireless connections based on test scores received from the test server in response to test packets communicated via the first wireless connection.

Apparatus Embodiment 2

The wireless terminal of Apparatus Embodiment 1, wherein said processor is further configured to operate the wireless terminal to: communicate third wireless connection test packets, via a third wireless connection, to a third access point (e.g., a 5G access point when the second AP is a 4G access point) which has network connectivity to the test server, said communicating of third wireless link test packets to the test server including using said connection ID based protocol (e.g., QUIC) and said first connection identifier to communicate third wireless link test packets to said test server.

Apparatus Embodiment 3

The wireless terminal of Apparatus Embodiment 1, wherein said processor is further configured to operate the wireless terminal to: stop the transmission of test packets over the second wireless connection when scores received in response to test packets communicated via the first wireless connection indicate that the connection via the first wireless link is above a first quality threshold, as part of being configured to operate the wireless terminal to control the transmission of test packets over at least one of the first and second wireless connections based on test scores received from the test server in response to packets communicated via the first wireless connection. (E.g., we only test the second and third links when the scores corresponding to the first connection indicate that the first connection is below a quality threshold which would correspond to utilization of the first link without aid of the second and/or third links to communicate data packets to a communications end point such as a peer device in a communications session with the first wireless terminal that is identified by another connection identifier but which sends packets over the first wireless connection to the first access point.)

Apparatus Embodiment 4

The wireless terminal of Apparatus Embodiment 3, wherein said processor is further configured to operate the wireless terminal to: control the transmission of test packets over at least one of the first and second wireless connections based on at least one of i) wireless terminal motion; ii) packet jitter (changes in amount of time involved in transmitting packets to the test server and getting answer from test server), iii) round trip time (e.g., time from when test packet is sent to when corresponding test packet score is received); and iv) packet loss (as indicated by failure to receive a score corresponding to a communicated test packet), as part of being configured to operate the wireless terminal to control the transmission of test packets over at least one of the first and second wireless connections.

Apparatus Embodiment 5

The wireless terminal of Apparatus Embodiment 4, wherein said processor is further configured to operate the wireless terminal to: control the transmission of test packets over at least one of the first and second wireless connections based on motion of the wireless terminal, as part of being configured to operate the wireless terminal to control the transmission of test packets over at least one of the first and second wireless connections, said step of controlling the transmission of test packets over at least one of the first and second wireless connections including: transmitting test packets over the first wireless link, the second wireless link, or both the first wireless link and the second wireless link at a first test packet transmission rate when the wireless terminal is moving at a first rate of motion (e.g., a zero rate of motion or a first non-zero rate of motion); and transmitting test packets over the first wireless link, the second wireless link, or both the first wireless link and the second wireless link at a second test packet transmission rate when the wireless terminal is moving at a second rate of motion which is higher than said first rate of motion, said second packet transmission rate being faster than said first packet transmission rate.

Apparatus Embodiment 6

The wireless terminal of Apparatus Embodiment 5, wherein said processor is further configured to operate the wireless terminal to: determine first wireless connection packet jitter based on changes in the amount of time to receive test scores in response to test packets sent over the first wireless connection during a first period of time; and modify the rate at which test packets are sent over the first communications connection to said test server based on the determined amount of first wireless connection packet jitter, as part of being configured to control the transmission of test packets over at least one of the first and second wireless connections.

Apparatus Embodiment 7

The wireless terminal of Apparatus Embodiment 6, wherein said processor is further configured to operate the wireless terminal to: determine if the first wireless connection jitter indicates an increase in the amount of first wireless connection jitter; and increase the rate at which test packets are sent over the first communications connection to said test server in response to determining that there has been an the increase in the amount of first wireless connection jitter, as part of being configured to operate the wireless terminal to modify the rate at which test packets are sent over the first communications connection to said test server based on the determined amount of first wireless connection jitter.

Apparatus Embodiment 8

The wireless terminal of Apparatus Embodiment 7, wherein said processor is further configured to operate the wireless terminal to: determine if the first wireless connection jitter indicates an decrease in the amount of first wireless connection jitter; and decrease the rate at which test packets are sent over the first communications connection to said test server in response to determining that there has been a decrease in the amount of first wireless connection jitter, as part of being configured to operate the wireless terminal to modify the rate at which test packets are sent over the first communications connection to said test server based on the determined amount of first wireless connection jitter.

Apparatus Embodiment 9

The wireless terminal of Apparatus Embodiment 7, wherein said processor is further configured to operate the wireless terminal to: determine if the first wireless connection jitter indicates no change in the amount of first wireless connection jitter; and leave the rate at which test packets are sent over the first communications connection to said test server unchanged in response to determining that there has been no change in the amount of first wireless connection jitter, as part of being configured to operate the wireless terminal to modify the rate at which test packets are sent over the first communications connection to said test server based on the determined amount of first wireless connection jitter.

Apparatus Embodiment 10

The wireless terminal of Apparatus Embodiment 5, wherein said processor is further configured to operate the wireless terminal to: determine first wireless connection packet delay based on the amount of time between sending a test packet via the first wireless connection and receiving a test score in response to the transmitted test packet; and modify the rate at which test packets are sent over the first communications connection to said test server based on the determined amount of first wireless connection packet delay, as part of being configured to control the transmission of test packets over at least one of the first and second wireless connections.

Apparatus Embodiment 11

The wireless terminal of Apparatus Embodiment 10, wherein said processor is further configured to operate the wireless terminal to: determine if the first wireless connection packet delay indicates an increase in the amount of first wireless connection packet delay; and increase the rate at which test packets are sent over the first communications connection to said test server in response to determining that there has been an the increase in the amount of first wireless connection packet delay, as part of being configured to operate the wireless terminal to modify the rate at which test packets are sent over the first communications connection to said test server based on the determined amount of first wireless connection packet delay.

Apparatus Embodiment 12

The wireless terminal of Apparatus Embodiment 11, wherein said processor is further configured to operate the wireless terminal to: determine if the first wireless connection packet delay indicates a decrease in the amount of first wireless connection packet delay; and decrease the rate at which test packets are sent over the first communications connection to said test server in response to determining that there has been a decrease in the first wireless connection packet delay, as part of being configured to modify the rate at which test packets are sent over the first communications connection to said test server based on the determined amount of first wireless connection packet delay.

Apparatus Embodiment 13

The wireless terminal of Apparatus Embodiment 11, wherein said processor is further configured to operate the wireless terminal to: determine if the first wireless connection packet delay indicates no change in the amount of first wireless connection packet delay; and leave the rate at which test packets are sent over the first communications connection to said test server unchanged in response to determining that there has been no change in the amount of first wireless connection packet delay, as part of being configured to modify the rate at which test packets are sent over the first communications connection to said test server based on the determined amount of first wireless packet delay.

Apparatus Embodiment 14

The wireless terminal of Apparatus Embodiment 5, wherein said processor is further configured to operate the wireless terminal to: determine a first wireless connection packet loss rate based on the failure to receive one or more test scores in response to test packets transmitted over the first wireless connection; and modify the rate at which test packets are sent over the first communications connection to said test server based on the determined first wireless connection packet loss rate, as part of being configured to operate the wireless terminal to control the transmission of test packets over at least one of the first and second wireless connections.

Apparatus Embodiment 15

The wireless terminal of Apparatus Embodiment 14, wherein said processor is further configured to operate the wireless terminal to: determine if the first wireless connection packet loss rate indicates an increase in the first wireless connection packet loss rate; and increase the rate at which test packets are sent over the first communications connection to said test server in response to determining that there has been an increase in the first wireless connection packet loss rate, as part of being configured to operate the wireless terminal to modify the rate at which test packets are sent over the first communications connection to said test server based on the determined amount of first wireless connection packet loss rate.

Apparatus Embodiment 16

The wireless terminal of Apparatus Embodiment 14, wherein said processor is further configured to operate the wireless terminal to: determine if the first wireless connection packet loss rate indicates a decrease in the amount first wireless connection packet loss rate; and decrease the rate at which test packets are sent over the first communications connection to said test server in response to determining that there has been a decrease in the first wireless connection packet loss rate, as part of being configured to operate the wireless terminal to modify the rate at which test packets are sent over the first communications connection to said test server based on the determined amount of first wireless connection packet loss rate.

Apparatus Embodiment 17

The wireless terminal of Apparatus Embodiment 14, wherein said processor is further configured to operate the wireless terminal to: determine if the first wireless connection packet loss rate indicates no change in the first wireless connection packet loss rate; and leave the rate at which test packets are sent over the first communications connection to said test server unchanged in response to determining that there has been no change in the first wireless connection packet loss rate, as part of being configured operate the wireless terminal to modify the rate at which test packets are sent over the first communications connection to said test server based on the determined amount of first wireless connection packet loss rate.

Apparatus Embodiment 18

The wireless terminal of Apparatus Embodiment 1, wherein said processor is further configured to operate the wireless terminal to: establish a communications session with a communications end point (e.g., a communications peer which may participate in a voice, data or game session in which both the wireless terminal and the communications end point participate) via one of said first, second or third wireless connections; and communicate test packets via said first wireless connection while said communications session with the communications end point is ongoing.

Apparatus Embodiment 19

The wireless terminal of Apparatus Embodiment 18, wherein said processor is further configured to operate the wireless terminal to: communicate said additional test packets via said second wireless connection while said communications session with the communications end point is ongoing.

Apparatus Embodiment 20

The wireless terminal of Apparatus Embodiment 19, wherein said processor is further configured to operate the wireless terminal to: communicate said third wireless connection test packets via said third wireless connection while said communications session with the communications end point is ongoing.

Apparatus Embodiment 21

The wireless terminal of Apparatus Embodiment 19, wherein a connection between said wireless terminal and the communications end point is identified by a second connection identifier, said second connection identifier being different from said first connection identifier.

Apparatus Embodiment 22

The wireless terminal of Apparatus Embodiment 21, wherein said first and second connections are to different end points but share use of a least one common wireless connection between the wireless terminal and one of the first, second and third access points.

Apparatus Embodiment 23

The wireless terminal of Apparatus Embodiment 22, wherein said processor is further configured to operate the wireless terminal to: select one or more of the first, second and third access points to use to communicate packets corresponding to the communications session with said end point based on scores received from said test server.

Apparatus Embodiment 24

The wireless terminal of Apparatus Embodiment 23, wherein said processor is further configured to operate the wireless terminal to: calculate a score (e.g., a cumulative score) for a wireless connection based on or more received scores corresponding to individual test packets, as part of being configured to operate the wireless terminal to select one or more of the first, second and third access points to use to communicate packets corresponding to the communications session with said end point based on scores received from said test server.

Apparatus Embodiment 25

The wireless terminal of Apparatus Embodiment 24, wherein said processor is further configured to operate the wireless terminal to: weight scores corresponding to more recent test packets more heavily than scores from older test packets, as part of being configured to calculate a score for a wireless connection based on or more received scores corresponding to individual test packets.

Apparatus Embodiment 26

The wireless terminal of Apparatus Embodiment 1, wherein each of said received first test packet communication scores from said test server is a score which scores an individual test packet communication.

Apparatus Embodiment 27

The wireless terminal of Apparatus Embodiment 1, wherein each of said received first test packet communication scores from said test server is a score generated from one or more individual test packets (e.g., the test server generates and sends a cumulative weighted score based on the individual scores of one or more test packets).

Apparatus Embodiment 28

The wireless terminal of Apparatus Embodiment 23, wherein said processor is further configured to operate the wireless terminal to: weight scores based on type of wireless network, as part of being configured to operate the wireless terminal to select one or more of the first, second and third access points to use to communicate packets corresponding to the communications session with said end point based on scores received from said test server.

Apparatus Embodiment 29

The wireless terminal of Apparatus Embodiment 28, wherein said processor is further configured to operate the wireless terminal to: reduce a score of a high cost network (4G cellular network); and leave a score of a low cost network (WiFi) unchanged, as part of being configured to operate the wireless terminal to weight scores based on type of wireless network.

First Numbered List of Non-Transitory Computer Readable Medium Embodiments

Non-Transitory Computer Readable Medium Embodiment 1 A non-transitory computer readable medium including computer executable instructions which when executed by a processor of a wireless device cause the wireless device to perform the steps of: establishing a first wireless connection with a first access point (WiFi access point using non-licensed spectrum) having network connectivity to a test server and a first communications end point; communicating test packets, via the first wireless connection, to the test server using a communication connection with the test server identified by a first connection identifier, said communicating test packets including using a connection ID based protocol (e.g., QUIC) to communicate to said test server; receiving first test packet communication scores from said test server in response to test packets communicated via the first wireless connection; communicating additional test packets (e.g., second wireless connection test packets since they are used to test connectivity via the second wireless link), via a second wireless connection, to a second access point (e.g., 4G or 5G cellular access point) which has network connectivity to the test server, said communicating of additional test packets to the test server including using said connection ID based protocol (e.g., QUIC) and said first connection identifier to communicate said additional test packets to the test server; and controlling the transmission of test packets over at least one of the first and second wireless connections based on test scores received from the test server in response to test packets communicated via the first wireless connection.

Second Numbered List of Exemplary Method Embodiments

Method Embodiment 1

A method of operating a first user equipment (UE) device, the method comprising: communicating a first packet stream of a first connection with a second UE device via a first WiFi communications link to a first WiFi access point (e.g. WiFi router) over which the first packet stream is communicated, said first packet stream being communicated using a connection identifier based protocol that identifies a connection between the first UE and the second UE to which the first stream belongs by a first connection identifier; establishing as part of a handover of the first connection from the first WiFi access point to a second WiFi access point a cellular communications link with a cellular access point (e.g. LTE base station); communicating a second packet stream of said first connection to the second UE device via the cellular communications link; establishing as part of the handover of the first connection from the first WiFi access point to the second WiFi access point a second WiFi communications link with the second WiFi access point; and communicating packets of a third packet stream of said first connection to the second UE device via the second WiFi communications link.

Method Embodiment 2

The method of Method Embodiment 1, further comprising: terminating the first WiFi communications link prior to establishing the second WiFi communications link.

Method Embodiment 3

The method of Method Embodiment 1, further comprising: terminating the cellular communications link subsequent to terminating the first WiFi communications link.

Method Embodiment 4

The method of Method Embodiment 3, wherein communicating the first packet stream includes communicating a first set of packets; and wherein communicating a second packet stream includes communicating at least some packets including the same information as a packets communicated in said first content stream. (For example, the first and packet streams transmit duplicative content during the initial portion of the handoff but potentially with more redundancy on the less reliable WiFi connection).

Method Embodiment 5

The method of Method Embodiment 4, wherein communicating the third packet stream includes communicating a third set of packets; and wherein communicating a second packet stream includes communicating at least some packets including the same information as a packets communicated in said third packet stream. (For example, the second and third packet streams transmit duplicative content during the intermediate portion of the handoff but potentially with more redundancy on the less reliable WiFi connection).

Method Embodiment 6

The method of Method Embodiment 5, further comprising: terminating the second packet stream; and continuing to communicate packets to the second UE in the third packet stream following termination of the second packet stream.

Method Embodiment 7

The method of Method Embodiment 1, where the second packet stream includes lower data redundancy than the first or third packet streams.

Method Embodiment 8

The method of Method Embodiment 7, wherein the lower data redundancy is achieved through the use of less error correction codes per unit of transmitted data in said second packet stream than in said first or third packet streams.

Method Embodiment 9

The method of Method Embodiment 1, wherein said first UE includes a single WiFi transmitter and wherein said second WiFi communications link with the second WiFi access point is established after termination of the first WiFi communications link.

Method Embodiment 10

The method of Method Embodiment 1, wherein said first, second and third packet streams correspond to the same connection identified by the first connection identifier; and wherein said second packet stream communicates less than 10 percent of the total number of packets communicated as part of a voice call which is implemented using said first, second and third packet streams to communicate voice data between the first UE and the second UE. (For example, in some embodiments, the cellular link is only used for handover in some cases so the amount of data sent over the cellular link is less than 10% of the voice call data in this example).

Second Numbered List of Exemplary Apparatus Embodiments

Apparatus Embodiment 1

A first user equipment (UE) device comprising: a processor configured to operate the first UE device to: communicate a first packet stream of a first connection with a second UE device via a first WiFi communications link to a first WiFi access point (e.g. WiFi router) over which the first packet stream is communicated, said first packet stream being communicated using a connection identifier based protocol that identifies a connection between the first UE and the second UE to which the first stream belongs by a first connection identifier; establish as part of a handover of the first connection from the first WiFi access point to a second WiFi access point a cellular communications link with a cellular access point (e.g. LTE base station); communicate a second packet stream of said first connection to the second UE device via the cellular communications link; establish, as part of the handover of the first connection from the first WiFi access point to the second WiFi access point, a second WiFi communications link with the second WiFi access point; and communicate packets of a third packet stream of said first connection to the second UE device via the second WiFi communications link.

Apparatus Embodiment 2

The first user equipment device of Apparatus Embodiment 1, wherein said processor is further configured to operate the first UE device to: terminate the first WiFi communications link prior to establishing the second WiFi communications link.

Apparatus Embodiment 3

The first UE device of Apparatus Embodiment 1, wherein said processor is further configured to operate the first UE device to: terminate the cellular communications link subsequent to terminating the first WiFi communications link.

Apparatus Embodiment 4

The first UE device of Apparatus Embodiment 2, wherein said processor is further configured to operate the first UE device to: communicate a first set of packets, as part of being configured to operate the first UE device to communicate the first packet stream includes; and communicate at least some packets including the same information as a packets communicated in said first content stream, as part of being configured to operate the first UE device to communicate a second packet stream includes. (For example, the first and packet streams transmit duplicative content during the initial portion of the handoff but potentially with more redundancy on the less reliable WiFi connection).

Apparatus Embodiment 5

The first UE device of Apparatus Embodiment 4, wherein said processor is further configured to operate the first UE device to: communicate a third set of packets, as part of being configured to operate the first UE device to communicate the third packet stream; and communicate at least some packets including the same information as a packets communicated in said third packet stream, as part of being configured to operate the first UE device to communicate a second packet stream. (For example, the second and third packet streams transmit duplicative content during the intermediate portion of the handoff but potentially with more redundancy on the less reliable WiFi connection).

Apparatus Embodiment 6

The first UE device of Apparatus Embodiment 5, wherein said processor is further configured to operate the first UE device to: terminate the second packet stream; and continue to communicate packets to the second UE in the third packet stream following termination of the second packet stream.

Apparatus Embodiment 7

The first UE device of Apparatus Embodiment 1, where the second packet stream includes lower data redundancy than the first or third packet streams.

Apparatus Embodiment 8

The first UE device of Apparatus Embodiment 7, wherein the lower data redundancy is achieved through the use of less error correction codes per unit of transmitted data in said second packet stream than in said first or third packet streams.

Apparatus Embodiment 9

The first UE device of Apparatus Embodiment 1, further comprising: a WiFi transmitter, and wherein said WiFi transmitter is the only WiFi transmitter included in the first UE device; and and wherein said second WiFi communications link with the second WiFi access point is established after termination of the first WiFi communications link.

Apparatus Embodiment 10

The first UE device of Apparatus Embodiment 1, wherein said first, second and third packet streams correspond to the same connection identified by the first connection identifier; and wherein said second packet stream communicates less than 10 percent of the total number of packets communicated as part of a voice call which is implemented using said first, second and third packet streams to communicate voice data between the first UE and the second UE. (For example, the cellular link is only used for handover in some cases so the amount of data sent over the cellular link is less than 10% of the voice call data in this example.)

Second Numbered List of Non-Transitory Computer Readable Medium Embodiments

Non-Transitory Computer Readable Medium Embodiment 1 A non-transitory computer readable medium including computer executable instructions which when executed by a processor of a first user equipment (UE) device cause the first UE device to perform the steps of: communicating a first packet stream of a first connection with a second UE device via a first WiFi communications link to a first WiFi access point (e.g. WiFi router) over which the first packet stream is communicated, said first packet stream being communicated using a connection identifier based protocol that identifies a connection between the first UE and the second UE to which the first stream belongs by a first connection identifier; establishing as part of a handover of the first connection from the first WiFi access point to a second WiFi access point a cellular communications link with a cellular access point (e.g. LTE base station); communicating a second packet stream of said first connection to the second UE device via the cellular communications link; establishing as part of the handover of the first connection from the first WiFi access point to the second WiFi access point a second WiFi communications link with the second WiFi access point; and communicating packets of a third packet stream of said first connection to the second UE device via the second WiFi communications link.

The techniques of various embodiments may be implemented using software, hardware and/or a combination of software and hardware. Various embodiments are directed to apparatus and/or systems, e.g., wireless communications systems, wireless terminals, test servers, access points, e.g., a WiFi wireless access point, a 4G cellular wireless AP, a 5G cellular wireless access point, servers, user equipment (UE) devices, a wireless cellular systems, e.g., a 4G cellular system, a 5G cellular system, WiFi networks, etc. Various embodiments are also directed to methods, e.g., method of controlling and/or operating a system or device, e.g., a communications system, wireless terminal, a UE, an access point, a test server, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

While various features have been explained in the context of an exemplary system including a WiFi network, a 4G cellular system and a 5G cellular system, it should be appreciated that the features and embodiments are not limited to WiFi, 4G and 5G and can be used with other systems, e.g., 3G systems.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments nodes and/or elements described herein are implemented using one or more components to perform the steps corresponding to one or more methods, for example, controlling, establishing, generating a message, message reception, signal processing, sending, communicating, e.g., receiving and transmitting, comparing, making a decision, selecting, making a determination, modifying, controlling determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless terminal supporting multiple wireless interfaces, a Wifi AP, a 4G AP, a 5G AP, a test server, a core device, a server, a communication node, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless terminal, with a processor which includes a component corresponding to each of the steps of the various described methods performed by the device in which the processor is included. In some but not all embodiments a device, e.g., communications node such as a wireless terminal, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless terminal described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first user equipment (UE) device, the method comprising:
communicating a first packet stream of a first connection with a second UE device via a first WiFi communications link to a first WiFi access point over which the first packet stream is communicated, said first packet stream being communicated using a connection identifier based protocol that identifies a connection between the first UE device and the second UE device to which the first packet stream belongs by a first connection identifier;

establishing as part of a handover of the first connection from the first WiFi access point to a second WiFi access point a cellular communications link with a cellular access point;

communicating a second packet stream of said first connection to the second UE device via the cellular communications link;

determining whether or not it is time to terminate the first WiFi communications link based on one or more of: i) known timing information corresponding to the handover, ii) testing information corresponding to the cellular communications link, iii) packets being successfully communicated over the cellular communications link, or iv) a determined position of the first UE device in relation to a coverage area corresponding to the first WiFi access point or a coverage area corresponding to the second WiFi access point;

terminating the first WiFi communications link in response to determining that it is time to terminate the first WiFi communications link;

establishing as part of the handover of the first connection from the first WiFi access point to the second WiFi access point a second WiFi communications link with the second WiFi access point, said second WiFi communications link being established after termination of the first WiFi communications link;

communicating packets of a third packet stream of said first connection to the second UE device via the second WiFi communications link;

determining whether or not it is time to terminate the cellular communications link based on one or more of: i) known timing information corresponding to the handover, ii) testing information corresponding to the second WiFi communications link, iii) packets being successfully communicated over the second WiFi communications link, or iv) a determined position of the first UE device in relation to the coverage area corresponding to the second WiFi access point; and terminating after terminating the first WiFi communications link and in response to determining that it is time to terminate the cellular communications link, the cellular communications link.

2. The method of claim 1, wherein communicating the first packet stream includes communicating a first set of packets; and wherein communicating a second packet stream includes communicating at least some packets including the same information as packets communicated in said first packet stream.

3. The method of claim 1, wherein communicating the third packet stream includes communicating a third set of packets; and wherein communicating a second packet stream includes communicating at least one packet including the same information as a packet communicated in said third packet stream.

4. The method of claim 3, further comprising:

terminating the second packet stream; and continuing to communicate packets to the second UE device in the third packet stream following termination of the second packet stream.

5. The method of claim 1, were the second packet stream includes lower data redundancy than the first or third packet streams.

6. The method of claim 5, wherein the lower data redundancy is achieved through the use of less error correction codes per unit of transmitted data in said second packet stream than in said first or third packet streams.

7. The method of claim 1, wherein said first UE device includes a single WiFi transmitter.

8. The method of claim 1, wherein said first, second and third packet streams correspond to the same connection identified by the first connection identifier; and wherein said second packet stream communicates less than 10 percent of the total number of packets communicated as part of a voice call which is implemented using said first, second and third packet streams to communicate voice data between the first UE device and the second UE device.

9. A first user equipment (UE) device comprising:

a processor configured to operate the first UE device to:

communicate a first packet stream of a first connection with a second UE device via a first WiFi communications link to a first WiFi access point over which the first packet stream is communicated, said first packet stream being communicated using a connection identifier based protocol that identifies a connection between the first UE device and the second UE device to which the first packet stream belongs by a first connection identifier;

establish as part of a handover of the first connection from the first WiFi access point to a second WiFi access point a cellular communications link with a cellular access point;

communicate a second packet stream of said first connection to the second UE device via the cellular communications link;

determine whether or not it is time to terminate the first WiFi communications link based on one or more of: i) known timing information corresponding to the handover, ii) testing information corresponding to the cellular communications link, iii) packets being successfully communicated over the cellular communications link, or iv) a determined position of the first UE device in relation to a coverage area corresponding to the first WiFi access point or a coverage area corresponding to the second WiFi access point terminate the first WiFi communications link in response to determining that it is time to terminate the first WiFi communications link, said second WiFi communications link being established after termination of the first WiFi communications link;

establish, as part of the handover of the first connection from the first WiFi access point to the second WiFi access point, a second WiFi communications link with the second WiFi access point;

communicate packets of a third packet stream of said first connection to the second UE device via the second WiFi communications link;

determine whether or not it is time to terminate the cellular communications link based on one or more of: i) known timing information corresponding to the handover, ii) testing information corresponding to the second WiFi communications link, iii) packets being successfully communicated over the second WiFi communications link, or iv) a determined position of the first UE device in relation to a coverage area corresponding to the second WiFi access point; and terminate, after terminating the first WiFi communications link and in response to determining that it is time to terminate the cellular communications link, the cellular communications link.

10. The first UE device of claim 9, wherein said processor is further configured to operate the first LE device to:
 communicate a first set of packets, as part of being configured to operate the first LIE device to communicate the first packet stream; and
 communicate at least some packets including the same information as packets communicated in said first packet stream, as part of being configured to operate the first UE device to communicate a second packet stream.

11. The first UE device of claim 9, wherein said processor is further configured to operate the first UE device to:
 communicate a third set of packets, as part of being configured to operate the first UE device to communicate the third packet stream; and
 communicate at least some packets including the same information as a packets communicated in said third packet stream, as part of being configured to operate the first UE device to communicate a second packet stream.

12. The first UE device of claim 11, wherein said processor is further configured to operate the first UE device to:
 terminate the second packet stream; and
 continue to communicate packets to the second UE device in the third packet stream following termination of the second packet stream.

13. The first UE device of claim 9, where the second packet stream includes lower data redundancy than the first or third packet streams.

14. The first UE device of claim 13, wherein the lower data redundancy is achieved through the use of less error correction codes per unit of transmitted data in said second packet stream than in said first or third packet streams.

15. The first UE device of claim 9, further comprising:
 a WiFi transmitter, and wherein said WiFi transmitter is the only WiFi transmitter included in the first UE device.

16. A non-transitory computer readable medium including computer executable instructions which when executed by a processor of a first user equipment (UE) device cause the first UE device to perform the steps of:
 communicating a first packet stream of a first connection with a second UE device via a first WiFi communications link to a first WiFi access point over which the first packet stream is communicated, said first packet stream being communicated using a connection identifier based protocol that identifies a connection between the first UE device and the second UE device to which the first packet stream belongs by a first connection identifier;
 establishing as part of a handover of the first connection from the first WiFi access point to a second WiFi access point a cellular communications link with a cellular access point, said second WiFi communications link being established after termination of the first WiFi communications link;
 communicating a second packet stream of said first connection to the second UE device via the cellular communications link;
 determining whether or not it is time to terminate the first WiFi communications link based on one or more of: i) known timing information corresponding to the handover, ii) testing information corresponding to the cellular communications link, iii) packets being successfully communicated over the cellular communications link, or iv) a determined position of the first UE device in relation to a coverage area corresponding to the first WiFi access point or a coverage area corresponding to the second WiFi access point;
 terminating the first WiFi communications link in response to determining that it is time to terminate the first WiFi communications link;
 establishing as part of the handover of the first connection from the first WiFi access point to the second WiFi access point a second WiFi communications link with the second WiFi access point;
 communicating packets of a third packet stream of said first connection to the second UE device via the second WiFi communications link;
 determining whether or not it is time to terminate the cellular communications link based on one or more of: i) known timing information corresponding to the handover, ii) testing information corresponding to the second WiFi communications link, iii) packets being successfully communicated over the second WiFi communications link, or iv) a determined position of the first UE device in relation to the coverage area corresponding to the second WiFi access point; and
 terminating, after terminating the first WiFi communications link and in response to determining that it is time to terminate the cellular communications link, the cellular communications link.

* * * * *